(12) United States Patent
Volkerink et al.

(10) Patent No.: US 12,363,512 B2
(45) Date of Patent: Jul. 15, 2025

(54) MULTI-COMMUNICATION-INTERFACE SYSTEM FOR FINE LOCATIONING

(71) Applicant: Trackonomy Systems, Inc., San Jose, CA (US)

(72) Inventors: Hendrik J. Volkerink, Palo Alto, CA (US); Ajay Khoche, West San Jose, CA (US); Carl M. Skonberg, Long Beach, NY (US); Saurabh Sanghai, Cupertino, CA (US)

(*) Notice: Subject to any disclaimer, the term of this patent is extended or adjusted under 35 U.S.C. 154(b) by 493 days.

(21) Appl. No.: 17/931,518

(22) Filed: Sep. 12, 2022

(65) Prior Publication Data

US 2023/0025103 A1 Jan. 26, 2023

Related U.S. Application Data

(63) Continuation-in-part of application No. 17/873,072, filed on Jul. 25, 2022.

(60) Provisional application No. 63/324,024, filed on Mar. 26, 2022, provisional application No. 63/243,182, (Continued)

(51) Int. Cl.
*H04W 4/33* (2018.01)
*H04W 4/80* (2018.01)
*H04W 52/02* (2009.01)

(52) U.S. Cl.
CPC ............... *H04W 4/33* (2018.02); *H04W 4/80* (2018.02); *H04W 52/0212* (2013.01)

(58) Field of Classification Search
CPC .................................. H04W 4/33; H04W 4/80
See application file for complete search history.

(56) References Cited

U.S. PATENT DOCUMENTS

| 5,495,250 A | 2/1996 | Ghaem et al. |
| 6,375,780 B1 | 4/2002 | Tuttle et al. |
| 6,614,392 B2 | 9/2003 | Howard |

(Continued)

FOREIGN PATENT DOCUMENTS

| AU | 2018204317 A1 | 1/2019 |
| CA | 3008512 A1 | 12/2018 |

(Continued)

OTHER PUBLICATIONS

International Patent Application No. PCT/US2023/016408 International Search Report and Written Opinion dated Aug. 21, 2023, 32 pages.

(Continued)

*Primary Examiner* — David Bilodeau

(57) ABSTRACT

A multi-communication-interface system methods implement fine locationing while conserving battery power. A first wireless-communication interface of a first multi-communication-interface tape node located at a first location in an area detect a first wireless signal from a second tape node at a first time. A first receiver of a second wireless-communication interface of the first multi-communication-interface tape node is activated in response to detecting the first wireless signal and used to receive a first response signal from a first wireless tag in response to an interrogation signal. The first receiver is deactivated to conserve power within an internal battery of the at least one second multi-communication-interface tape node and a location of the first wireless tag at the first time is determined as the first location.

21 Claims, 23 Drawing Sheets

Related U.S. Application Data filed on Sep. 12, 2021, provisional application No. 63/225,550, filed on Jul. 25, 2021.

(56) References Cited

U.S. PATENT DOCUMENTS

| | | |
|---|---|---|
| 6,816,075 B2 | 11/2004 | Grunes et al. |
| 7,048,194 B2 | 5/2006 | Minami et al. |
| 7,177,054 B2 | 2/2007 | Silverbrook et al. |
| 7,299,990 B2 | 11/2007 | Hoshina |
| 7,360,714 B2 | 4/2008 | Sano et al. |
| 7,405,656 B2 | 7/2008 | Olsen |
| 7,511,616 B2 | 3/2009 | Lake |
| 7,540,603 B2 | 6/2009 | Otsuki |
| 7,743,984 B2 | 6/2010 | Olsen et al. |
| 7,838,844 B2 | 11/2010 | Wagner et al. |
| 7,866,555 B2 | 1/2011 | Schmid et al. |
| 8,016,194 B2 | 9/2011 | Hause et al. |
| 8,072,620 B2 | 12/2011 | Yamamoto et al. |
| 8,171,791 B2 | 5/2012 | Sy et al. |
| 8,231,749 B2 | 7/2012 | Dent et al. |
| 8,292,173 B2 | 10/2012 | Yturralde et al. |
| 8,317,230 B2 | 11/2012 | Asay |
| 8,581,701 B2 | 11/2013 | Steinmetz et al. |
| 8,686,685 B2 | 4/2014 | Moshfeghi |
| 8,833,664 B2 | 9/2014 | Choi |
| 9,251,459 B2 | 2/2016 | Simske et al. |
| 9,305,283 B1 | 4/2016 | Lauka et al. |
| 9,643,460 B2 | 5/2017 | Peine et al. |
| 9,644,401 B2 | 5/2017 | Nguyen et al. |
| 10,319,203 B1 | 6/2019 | Testanero et al. |
| 10,819,137 B2 | 10/2020 | Khoche et al. |
| 11,115,732 B2 | 9/2021 | Lucrecio et al. |
| 11,295,190 B2 | 4/2022 | Volkerink et al. |
| 2004/0044493 A1 | 3/2004 | Coulthard |
| 2004/0247016 A1 | 12/2004 | Faries et al. |
| 2005/0099292 A1 | 5/2005 | Sajkowsky |
| 2005/0205673 A1 | 9/2005 | Morris et al. |
| 2006/0065730 A1 | 3/2006 | Quan et al. |
| 2006/0213964 A1 | 9/2006 | Excoffier et al. |
| 2007/0008120 A1 | 1/2007 | Smith et al. |
| 2007/0049291 A1 | 3/2007 | Kim et al. |
| 2007/0182556 A1 | 8/2007 | Rado |
| 2007/0287473 A1 | 8/2007 | Dupray |
| 2007/0207792 A1 | 9/2007 | Loving |
| 2008/0198002 A1 | 8/2008 | Bartholf et al. |
| 2008/0198022 A1 | 8/2008 | Battles et al. |
| 2009/0174600 A1 | 7/2009 | Mazlum et al. |
| 2009/0192709 A1 | 7/2009 | Yonker et al. |
| 2010/0089803 A1 | 4/2010 | Lavi et al. |
| 2010/0201520 A1 | 8/2010 | Stern et al. |
| 2011/0062237 A1 | 3/2011 | Chaves |
| 2011/0139871 A1 | 6/2011 | Yturralde et al. |
| 2011/0173235 A1 | 7/2011 | Aman et al. |
| 2012/0256728 A1 | 10/2012 | Bajic et al. |
| 2012/0278676 A1 | 11/2012 | Teraura |
| 2012/0286939 A1 | 11/2012 | Cote et al. |
| 2012/0326862 A1 | 12/2012 | Kwak |
| 2013/0229263 A1 | 9/2013 | Graczyk et al. |
| 2013/0250357 A1 | 9/2013 | Yu |
| 2013/0282392 A1 | 10/2013 | Wurm |
| 2014/0067313 A1 | 3/2014 | Breed |
| 2014/0159869 A1 | 6/2014 | Zumsteg et al. |
| 2014/0240088 A1 | 8/2014 | Robinette et al. |
| 2014/0263634 A1 | 9/2014 | Iqbal et al. |
| 2015/0097674 A1 | 4/2015 | Mondal et al. |
| 2015/0156253 A1 | 6/2015 | Skaaksrud et al. |
| 2015/0349667 A1 | 12/2015 | Andosca et al. |
| 2015/0349917 A1 | 12/2015 | Skaaksrud |
| 2015/0379860 A1 | 12/2015 | Vardi |
| 2016/0011074 A1 | 1/2016 | Mian et al. |
| 2016/0026213 A1 | 1/2016 | Li et al. |
| 2016/0117458 A1 | 4/2016 | Hermans et al. |
| 2016/0205509 A1 | 7/2016 | Hopcraft et al. |
| 2017/0011606 A1 | 1/2017 | Ceccon et al. |
| 2017/0019754 A1 | 1/2017 | Wilkinson |
| 2017/0083857 A1 | 3/2017 | Barton et al. |
| 2017/0199268 A1 | 7/2017 | Frederick |
| 2017/0286903 A1 | 10/2017 | Elizondo |
| 2017/0337405 A1 | 11/2017 | Schutz |
| 2018/0011074 A1 | 1/2018 | Roman et al. |
| 2018/0163095 A1 | 6/2018 | Khoche |
| 2019/0087702 A1 | 3/2019 | Cotoc |
| 2019/0337342 A1 | 11/2019 | Genheimer et al. |
| 2019/0362215 A1 | 11/2019 | Khoche |
| 2019/0370624 A1 | 12/2019 | Khoche |
| 2019/0373431 A1 | 12/2019 | Gabriele et al. |
| 2020/0234098 A1 | 7/2020 | Volkerink |
| 2020/0275369 A1 | 8/2020 | Foster et al. |
| 2021/0012173 A1 | 1/2021 | Batra |
| 2021/0027122 A1 | 1/2021 | Volkerink |
| 2021/0143902 A1 | 5/2021 | Connolly et al. |
| 2021/0150159 A1 | 5/2021 | Volkerink |
| 2021/0179352 A1 | 6/2021 | Haid |
| 2021/0224721 A1 | 7/2021 | Morgenthau |
| 2022/0277154 A1 | 9/2022 | Joao |
| 2022/0319301 A1* | 10/2022 | Krejcarek .......... G08B 13/2431 |

FOREIGN PATENT DOCUMENTS

| | | |
|---|---|---|
| JP | 2008239282 A | 10/2008 |
| JP | 2011090670 A | 5/2011 |
| JP | 2012141995 A | 7/2012 |
| WO | WO 2011/038018 A1 | 3/2011 |
| WO | 2014145130 A1 | 9/2014 |
| WO | WO 2021/076513 A1 | 4/2021 |

OTHER PUBLICATIONS

U.S. Appl. No. 10/095,898, filed Oct. 9, 2018, Iqbal et al.

International Patent Application No. PCT/2020/061394, International Search Report and Written Opinion dated Feb. 26, 2021, 16 pages.

International Patent Application No. PCT/US20/26475, International Search Report and Written Opinion, dated Jul. 23, 2020, 14 pages.

Roundy et al., Energy Harvester for Rotating Environments Using Offset Pendulum and Nonlinear Dynamics, Smart Materials and Structures, IOP Publishing Ltd, Sep. 9, 2014.

Ku et al., Joint Power Waveforming and Beamforming for Wireless Power Transfer, IEEE Transactions on Signal Processing, vol. 65, No. 24, Dec. 15, 2017, pp. 6409-6422.

U.S. Appl. No. 17/067,608, Ex Parte Quayle Action dated Sep. 24, 2021, 7 pages.

Ruzzeli et al., "On the RFID wake-up impulse for multi-hop sensor networks." The 1st ACM Workshop on Convergence of RFID and Wireless Sensor Networks and their Applications (SenseID) at the 5th ACM International Conference on Embedded Networked Sensor Systems (ACM SenSys 2007), Syndey, Australia, Nov. 4-9, 2007.

Ding, et al., "RFID-based Production Data Analysis in an IoT-enabled Smart Job-shop." IEEE/CAA Journal of Automatics Sinica, vol. 5, No. 1, Jan. 1, 2018.

U.S. Appl. No. 16/839,048, Ex Parte Quayle Action dated Jul. 22, 2021, 6 pages.

U.S. Appl. No. 16/839,048, Notice of Allowance dated Oct. 8, 2021, 14 pages.

Zhai et al. ("A practical wireless charging system based on ultra-wideband retro-reflective beamforming," 2010 IEEE Antennas and Propagation Society International Symposium, 2010, pp. 1-4, doi: 10.1109/APS.2010.5561113) (Year: 2010).

Canadian Examination Report mailed Mar. 6, 2024, for CA 3,158,677, 6 pages.

Non Final Office Action for U.S. Appl. No. 16/359,808, mailed Jan. 22, 2020, 7 pages.

Non Final Office Action for U.S. Appl. No. 17/027,096, mailed Jun. 24, 2021, 6 pages.

Non Final Office Action for U.S. Appl. No. 17/683,738, mailed Feb. 16, 2023, 12 pages.

(56) References Cited

OTHER PUBLICATIONS

Non Final Office Action for U.S. Appl. No. 18/083,550, mailed Jan. 9, 2024, 9 pages.
Non Final Office Action for U.S. Appl. No. 18/083,550, mailed May 23, 2023, 7 pages.
Non-Final Office Action Issued in U.S. Appl. No. 17/679,992, mailed Feb. 15, 2024, 7 pages.
Non-Final Office Action Issued in U.S. Appl. No. 17/679,992, mailed Jan. 25, 2023, 8 pages.
U.S. Appl. No. 16/839,048, Notice of Allowance dated Nov. 29, 2021, 15 pages.
U.S. Appl. No. 17/067,608, Notice of Allowance dated Dec. 1, 2021, 9 pages.
International Patent Application No. PCT/US2022/038238 International Search Report and Written Opinion dated Feb. 2, 2023, 17 pages.
Non Final Office Action for U.S. Appl. No. 17/872,072, mailed Jan. 16, 2024, 28 pages.
International Patent Application No. PCT/US2022/043255 International Search Report and Written Opinion dated Jan. 1, 2023, 11 pages.

\* cited by examiner

MULTI-COMMUNICATION-INTERFACE SYSTEM FOR FINE LOCATIONING

RELATED APPLICATIONS

This application claims priority to U.S. Patent Application No. 63/243,182, titled "Hybrid RFID and Wireless Communication System for Fine Locationing," filed Sep. 12, 2021, to U.S. Patent Application No. 63/324,024, titled "System and Method for Detection and Tracking of Assets in a Vehicle," filed Mar. 26, 2022, and is a Continuation-In-Part of U.S. patent application Ser. No. 17/873,072, titled "Hybrid RFID and Wireless Communication System for Tracking of Assets and People and Method Thereof," filed Jul. 25, 2022, which claims priority to U.S. Patent Application No. 63/225,550, filed Jul. 25, 2021. Each of the above application is incorporated herein by reference in its entirety.

BACKGROUND

Location assets using Bluetooth has low power usage, but has limited resolution (e.g., accuracy of the location) due to the range of Bluetooth wireless signals. RFID readers require a significant amount power and therefore battery powered solutions are difficult.

SUMMARY

One aspect of the present embodiments includes the realization that short-range wireless protocols, such as Bluetooth, when used for locationing, have a resolution that is relatively coarse due to the range of a Bluetooth signal, particularly where that signal is used for establishing a mesh network of devices. That is, any received Bluetooth signal is determined to be within a radius, defined by the Bluetooth signal range, of the receiving device. Radio frequency identification (RFID) has a shorter wireless signal range, and thereby improves the resolution/accuracy of location determined by proximity to an RFID reader; however, RFID readers require more power to operate as compared to Bluetooth, and therefore RFID readers suffer from limited operational lifespan due when powered via a battery power source. Accordingly, RFID readers are typically hard wired to a power source, thereby limiting their practicality for easy deployment and mobility. The present embodiments solve this problem by providing a battery-powered multi-communication-interface tape node that is (a) easily deployed, since it is battery powered and available in many form factors (e.g., stick-on flexible tape, stick-on rigid case, and so on), and (b) employs an event driven power management of a wireless reader to save power. Advantageously, by activating the wireless reader, which may be RFID-based, in response to detecting an event using another wireless-communication interface, which may be Bluetooth-based, the wireless reader remains powered off until needed to read a wireless tag and may be deactivated once the wireless tag has been read. This is an improvement over solutions that periodically activate a higher-power consumption wireless reader to detect wireless tags, since periodic activation misses wireless tags that pass through the range of the wireless reader when deactivated. By activating the wireless reader in response to certain events associated with wireless tag movement, the wireless reader does not miss changes in wireless tag inventory.

Another aspect of the present embodiments includes the realization that multi-communication-interface battery powered tape nodes may be easily deployed within an area to implement fine locationing in that area. These tape nodes are easily attached (e.g., stick-on) to walls, doors, and ceilings of the area (e.g., a room, a vehicle, a loading dock, and so on) since they do not require hard wiring for power or communications. These tape nodes may cooperate to improve locationing within the area by operating with a reduced range that improved locationing accuracy within the area.

Another aspect of the present embodiments includes the realization that the multi-communication-interface battery powered tape nodes may not require RFID transmit capability when a separate RFID illuminator is located within the same area. That is, the multi-communication-interface battery powered tape node may include an RFID receiver to receive and decode RFID signals from RFID tags. The RFID illuminator transmits an RFID interrogation signal to activate any RFID tag within the area, and the multi-communication-interface battery powered tape node receives the RFID tag responses. By using a shorter receiving range than a convention RFID reader, the multi-communication-interface battery powered tape node may improve locationing accuracy of the RFID tag.

Another aspect of the present embodiments includes the realization that when an external RFID reader and/or an external RFID illuminator operate substantially continuously to detect RFID tags, the multi-communication-interface battery powered tape nodes may operate in reverse, whereby an RFID reader substantially continually operates to receive RFID tag response signals and the multi-communication-interface battery powered tape nodes activate another wireless interface (e.g., Bluetooth) when an RFID tag response signal is detected—or changes in RFID response signals are detected.

Similar advantages are achieved using wireless protocols other than RFID and Bluetooth, such as where a first wireless protocol having a first power consumption rate is triggered using a second wireless protocol having a second power consumption less than the first power consumption rate.

In certain embodiments, a method implements fine locationing using a multi-communication-interface system. The method detects, at a first time using a first wireless-communication interface of a first multi-communication-interface tape node located at a first location in an area, a first wireless signal from a second tape node. A first receiver of a second wireless-communication interface of the first multi-communication-interface tape node is activated in response to detecting the first wireless signal and used to receive a first response signal from a first wireless tag in response to an interrogation signal. The first receiver is deactivated and a location of the first wireless tag at the first time is determined as the first location.

In certain embodiments, a method implements fine locationing using a multi-communication-interface system. A first wireless-communication interface of a first multi-communication-interface tape node at a first doorway of a first area is used to detect a first wireless signal transmitted from a second wireless-communication interface of a wearable multi-communication-interface tape node worn by an operator. The first multi-communication-interface tape node sends, via the first wireless-communication interface, a trigger event message. A first reader of at least one second multi-communication-interface tape node positioned within the first area is activated in response to receiving the trigger event message. At least one first response signal from at least one first wireless tag within a coverage area of the first reader is detected and the first reader is deactivated after detecting the at least one first response signal to conserve power within an internal battery of the at least one second multi-communication-interface tape node.

In certain embodiments, a multi-communication-interface tape node powered from an internal battery, includes: a first wireless-communication interface implementing a first wireless protocol; a second wireless-communication interface implementing a second wireless protocol that consumes more power than the first wireless protocol when operational, the second wireless-communication interface having a transmitter and a receiver; a processor; and memory storing machine-readable instructions that, when executed by the processor, cause the processor to: detect a trigger event using the first wireless-communication interface; transition the second wireless-communication interface from an off state to an on state; receive a wireless response signal from a wireless tag via the receiver; decode a wireless identifier from the wireless response signal; and transition the second wireless-communication interface from the on state to the off state to conserve power in the internal battery.

DETAILED DESCRIPTION OF THE EMBODIMENTS

Figure 1:
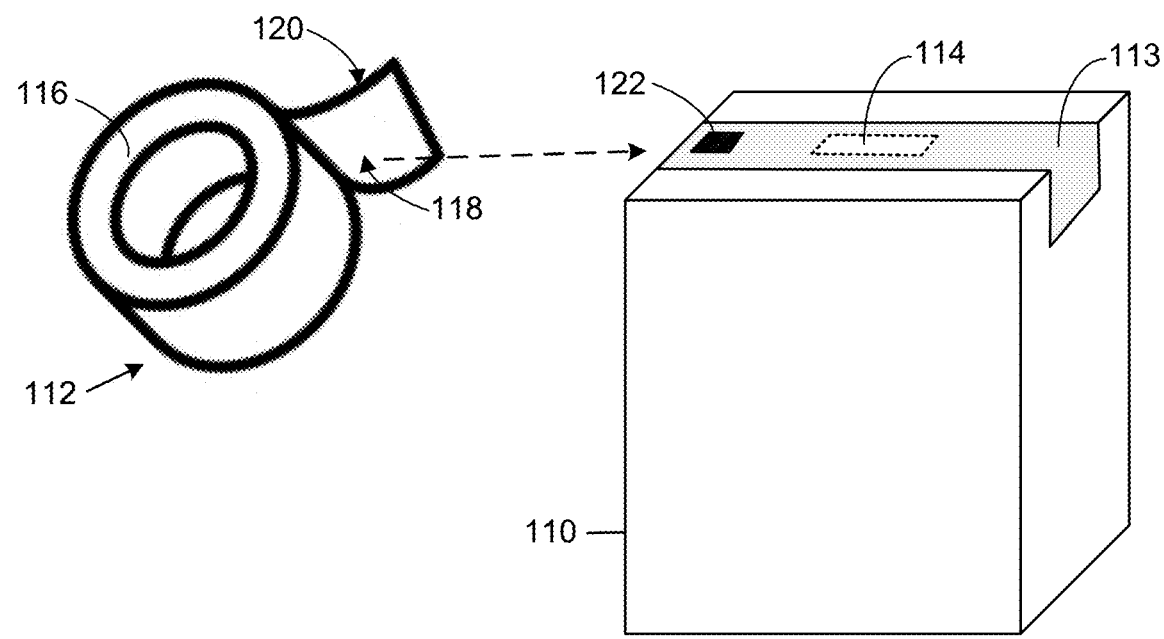
FIG. 1 is a schematic illustrating one example adhesive tape-agent platform used to seal a package for shipment, in embodiments.

The present invention is not limited in any way to the illustrated embodiments. Instead, the illustrated embodiments described below are merely examples of the invention. Therefore, the structural and functional details disclosed herein are not to be construed as limiting the claims. The disclosure merely provides bases for the claims and representative examples that enable one skilled in the art to make and use the claimed inventions. Furthermore, the terms and phrases used herein are intended to provide a comprehensible description of the invention without being limiting.

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements and are not drawn to scale.

In some contexts, the term "agent" may refer to a "node", and an "agent" or "node" may be adhesively applied to a surface and denoted as a "tape node" or "tape agent". These terms may be used interchangeably, depending on the context. Further, the "agent" or "node" may have two forms of hierarchy: one depending on the functionality of the "agent" or "node", such as the range of a wireless-communication interface, and another depending on which "agent" or "node" may control another "agent" or "node". For example, an agent with a low-power wireless-communication interface may be referred to a "master agent".

In some embodiments, a low-power wireless-communication interface may have a first wireless range and be operable to implement one or more protocols including Zigbee, near-field communication (NFC), Bluetooth Low Energy, Bluetooth Classic, Wi-Fi, and ultra-wideband. For example, the low-power wireless-communication interface may have a range of between 0 and 300 meters or farther, depending on the implemented protocol. The communication interface implementation, e.g., Zigbee or Bluetooth Low Energy, may be selected based upon the distance of communication between the low-power wireless-communication interface and the recipient, and/or a remaining battery level of the low-power wireless-communication interface.

An agent with a medium-power wireless communication-interface may be referred to as a "secondary agent". The medium-power wireless-communication interface may have a second wireless range and be operable to implement one or more protocols including Zigbee, Bluetooth Low Energy interface, LoRa. For example, the medium-power wireless-communication interface may have a range of between 0 and 20 kilometers. The communication interface implementation, e.g., Zigbee, Bluetooth Low Energy, or LoRa, may be selected based upon the distance of communication between the medium-power wireless-communication interface and the recipient, and/or a remaining battery level of the medium-power wireless-communication interface.

An agent with a high-power wireless communication-interface may be referred to as a "tertiary agent". The high-power wireless-communication interface may have a third wireless range and be operable to implement one or more protocols including Zigbee, Bluetooth Low Energy, LoRa, Global System for Mobile Communication, General Packet Radio Service, cellular, near-field communication, and radio-frequency identification. For example, the high-power wireless-communication interface may have a global range, where the high-power wireless-communication interface may communicate with any electronic device implementing a similar communication protocol. The communication interface protocol selected may depend on the distance of communication between the high-power wireless-communication interface and a recipient, and/or a remaining battery level of the high-power wireless-communication interface.

In some examples, a secondary agent may also include a low-power wireless-communication interface and a tertiary agent may also include low and medium-power wireless-communication interfaces, as discussed below with reference to FIGS. 6A-C and/or 11A-C. Further continuing the example, a "master agent", a "secondary agent", or a "tertiary agent" may refer to a "master tape node", a "secondary tape node", or a "tertiary tape node".

With regard to the second form of hierarchy, the "agent", "node", "tape agent", and "tape node", may be qualified as a parent, child, or master, depending on whether a specific "agent" or "node" controls another "agent" or "node". For example, a master-parent agent controls the master-child agent and a secondary or tertiary-parent agent controls a master-child agent. The default, without the qualifier of "parent" or "child" is that the master agent controls the secondary or tertiary agent Further, the "master tape node" may control a "secondary tape node" and a "tertiary tape node", regardless of whether the master tape node is a parent node.

Further, each of the "agents", "nodes", "tape nodes", and "tape agents" may be referred to as "intelligent nodes", "intelligent tape nodes", "intelligent tape agents", and/or "intelligent tape agents" or any variant thereof, depending on the context and, for ease, may be used interchangeably.

Further, each of the "agents", "nodes", "tape nodes", and "tape agents" may include flexible or non-flexible form factors unless otherwise specified. Thus, each of the "agents", "nodes", "tape nodes", and "tape agents" include flexible and non-flexible (rigid) form factors, or a combination thereof including flexible components and non-flexible components.

An adhesive tape platform includes a plurality of segments that may be separated from the adhesive product (e.g., by cutting, tearing, peeling, or the like) and adhesively attached to a variety of different surfaces to inconspicuously implement any of a wide variety of different wireless communications-based network communications and transducing (e.g., sensing, actuating, etc.) applications. In certain embodiments, each segment of an adhesive tape platform has an energy source, wireless communication functionality, transducing functionality (e.g., sensor and energy harvesting functionality), and processing functionality that enable the segment to perform one or more transducing functions and report the results to a remote server or other computer system directly or through a network (e.g., formed by tape nodes and/or other network components). The components of the adhesive tape platform are encapsulated within a flexible adhesive structure that protects the components from damage while maintaining the flexibility needed to function as an adhesive tape (e.g., duct tape or a label) for use in various applications and workflows. In addition to single function applications, example embodiments also include multiple transducers (e.g., sensing and/or actuating transducers) that extend the utility of the platform by, for example, providing supplemental information and functionality relating characteristics of the state and/or environment of, for example, an article, object, vehicle, or person, over time.

Systems and processes for fabricating flexible multifunction adhesive tape platforms in efficient and low-cost ways also are described in US Patent Application Publication No. US-2018-0165568-A1. For example, in addition to using roll-to-roll and/or sheet-to-sheet manufacturing techniques, the fabrication systems and processes are configured to optimize the placement and integration of components within the flexible adhesive structure to achieve high flexibility and ruggedness. These fabrication systems and processes are able to create useful and reliable adhesive tape platforms that may provide local sensing, wireless transmitting, and positioning functionalities. Such functionality together with the low cost of production is expected to encourage the ubiquitous deployment of adhesive tape platform segments and thereby alleviate at least some of the problems arising from gaps in conventional infrastructure coverage that prevent continuous monitoring, event detection, security, tracking, and other logistics applications across heterogeneous environments.

As used herein, the term "or" refers an inclusive "or" rather than an exclusive "or." In addition, the articles "a" and "an" as used in the specification and claims mean "one or more" unless specified otherwise or clear from the context to refer the singular form.

The terms "module," "manager," "component", and "unit" refer to hardware, software, or firmware, or a combination thereof. The term "processor" or "computer" or the like includes one or more of: a microprocessor with one or more central processing unit (CPU) cores, a graphics processing unit (GPU), a digital signal processor (DSP), a field-programmable gate array (FPGA), a system-on-chip (SoC), a microcontroller unit (MCU), and an application-specific integrated circuit (ASIC), a memory controller, bus controller, and other components that manage data flow between said processor associated memory, and other components communicably coupled to the system bus. Thus the terms "module," "manager," "component", and "unit" may include computer readable instructions that, when executed by a processor, implement the functionality discussed herein with respect to said "module," "manager," "component", and "unit".

Adhesive Tape Agent Platform

FIG. 1 is a schematic illustrating one example adhesive tape-agent platform 112, including wireless transducing circuit 114, used to seal a package 110 for shipment. In this example, a segment 113 of the adhesive tape-agent platform 112 is dispensed from a roll 116 and affixed to the package 110. The adhesive tape-agent platform 112 includes an adhesive side 118 and a non-adhesive surface 120. The adhesive tape-agent platform 112 may be dispensed from the roll 116 in the same way as any conventional packing tape, shipping tape, or duct tape. For example, the adhesive tape-agent platform 112 may be dispensed from the roll 116 by hand, laid across the seam where the two top flaps of the package 110 meet, and cut to a suitable length either by hand or using a cutting instrument (e.g., scissors or an automated or manual tape dispenser). Examples of such tape agents include tape agents having non-adhesive surface 120 that carry one or more coatings or layers (e.g., colored, light reflective, light absorbing, and/or light emitting coatings or layers). Further, the segment 113 may include an identifier 122 (e.g., a QR code, Radio Frequency Identification (RFID) chip, etc.) that may be used to associate the segment 113 with the package 110, as discussed below.

Figure 2:
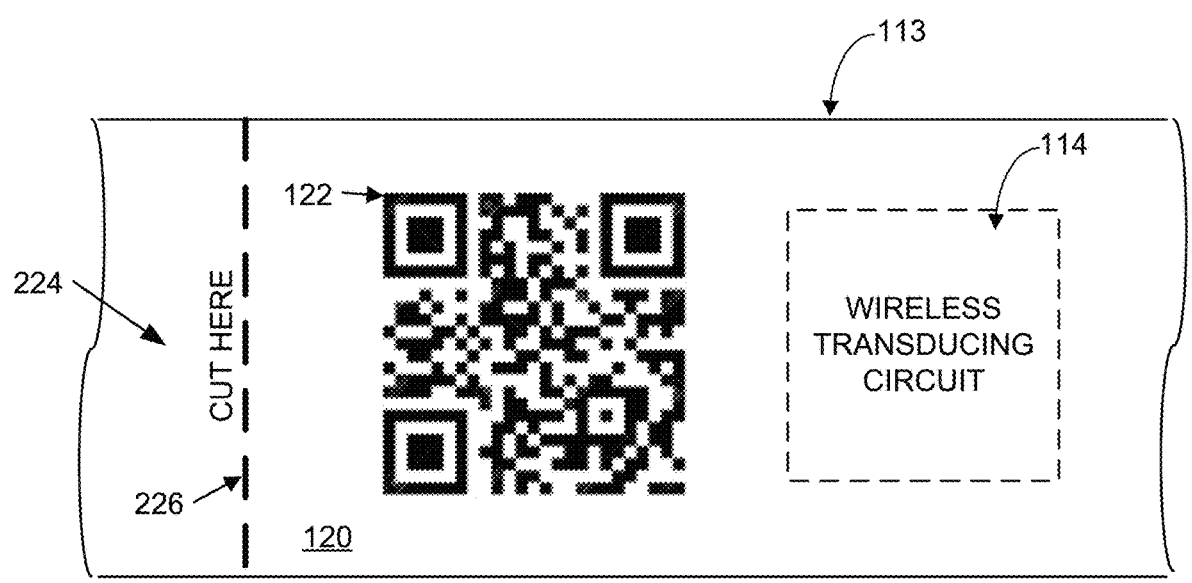
FIG. 2 is a schematic illustrating a non-adhesive surface of a segment of the adhesive tape agent platform of FIG. 1, in embodiments.

FIG. 2 is a schematic illustrating a non-adhesive surface 120 of the segment 113 of the adhesive tape agent platform 112 of FIG. 1 including writing or other markings that convey instructions, warnings, or other information to a person or machine (e.g., a bar code reader), or may simply be decorative and/or entertaining. For example, different types of adhesive tape-agent platforms may be marked with distinctive colorations to distinguish one type of adhesive tape agent platform from another. In the illustrated example of FIG. 2, the segment 113 of the adhesive tape agent platform 112 includes an identifier 122 (e.g., a two-dimensional bar code, such as a QR Code), written instructions 224 (e.g., "Cut Here"), and an associated cut line 226 that indicates where the user should cut the adhesive tape agent platform 112. The written instructions 224 and the cut line 226 typically are printed or otherwise marked on the top non-adhesive surface 120 of the adhesive tape agent platform 112 during manufacture. The identifier 122 (e.g., a two-dimensional bar code), on the other hand, may be marked on the non-adhesive surface 120 of the adhesive tape agent platform 112 during the manufacture of the adhesive tape agent platform 112 or, alternatively, may be marked on the non-adhesive surface 120 of the adhesive tape agent platform 112 as needed using, for example, a printer or other marking device.

To avoid damaging the functionality of the segments of the adhesive tape agent platform 112, the cut lines 226 may demarcate the boundaries between adjacent segments at locations that are free of any active components of the wireless transducing circuit 114. The spacing between the wireless transducing circuit 114 and the cut lines 226 may vary depending on the intended communication, transducing and/or adhesive taping application. In the example illustrated in FIG. 1, the length of the adhesive tape-agent platform 112 that is dispensed to seal the package 110 corresponds to a single segment of the adhesive tape-agent platform 112. In other examples, the length of the adhesive tape-agent platform 112 needed to seal a package or otherwise serve the adhesive function for which the adhesive tape-agent platform 112 is being applied may include multiple segments 113 of the adhesive tape-agent platform 112, one or more of which segments 113 may be activated upon cutting the length of the adhesive tape-agent platform 112 from the roll 116 and/or applying the segment 113 of the adhesive tape agent platform to the package 110.

In some examples, the wireless transducing circuits 114 embedded in one or more segments 113 of the adhesive tape-agent platform 112 are activated when the adhesive tape agent platform 112 is cut along the cut line 226. In these examples, the adhesive tape-agent platform 112 includes one or more embedded energy sources (e.g., thin film batteries, which may be printed, or conventional cell batteries, such as conventional watch style batteries, rechargeable batteries, or other energy storage device, such as a super capacitor or charge pump) that supply power to the wireless transducing circuit 114 in one or more segments of the adhesive tape-agent platform 112 in response to being separated from the adhesive tape-agent platform 112 (e.g., along the cut line 226).

In some examples, each segment 113 of the adhesive tape agent platform 112 includes its own respective energy source. In some embodiments, the energy source is a battery of a type described above, an energy harvesting component or system that harvests energy from the environment, or both. In some of these examples, each energy source is configured to only supply power to the components in its respective adhesive tape platform segment regardless of the number of contiguous segments that are in a given length of the adhesive tape-agent platform 112. In other examples, when a given length of the adhesive tape agent platform 112 includes multiple segments 113, the energy sources in the respective segments 113 are configured to supply power to the wireless transducing circuit 114 in all of the segments 113 in the given length of the adhesive tape agent platform 112. In some of these examples, the energy sources are connected in parallel and concurrently activated to power the wireless transducing circuit 114 in all of the segments 113 at the same time. In other examples, the energy sources are connected in parallel and alternately activated to power the wireless transducing circuit 114 in respective ones of the segments 113 at different time periods, which may or may not overlap.

Figure 3:
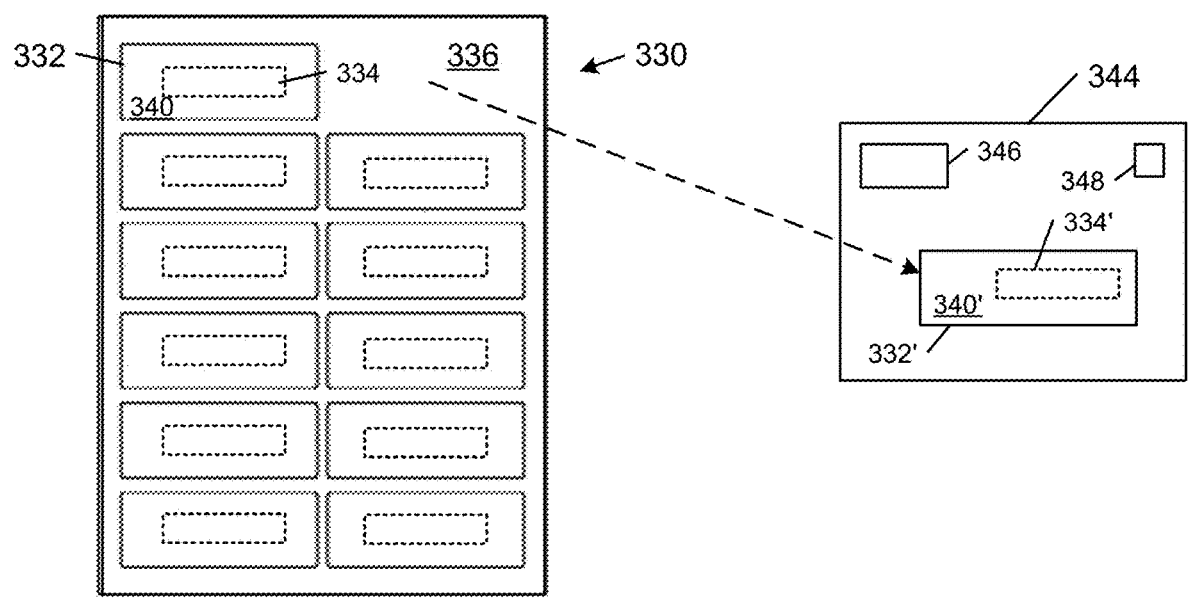
FIG. 3 shows one example adhesive tape platform that includes a set of adhesive tape platform segments on a backing sheet, in embodiments.

FIG. 3 shows an example adhesive tape platform 330 that includes a set of adhesive tape platform segments 332 each of which includes a respective set of embedded wireless transducing circuit components 334, and a backing sheet 336 with a release coating that prevents the adhesive segments 332 from adhering strongly to the backing sheet 336. Adhesive tape platform 330 may represent adhesive tape platform 112 of FIG. 1. Each adhesive tape platform segment 332 includes an adhesive side facing the backing sheet 336, and an opposing non-adhesive side 340. In this example, a particular segment 332 of the adhesive tape platform 330 has been removed from the backing sheet 336 and affixed to an envelope 344. Each segment 332 of the adhesive tape platform 330 can be removed from the backing sheet 336 in the same way that adhesive labels can be removed from a conventional sheet of adhesive labels (e.g., by manually peeling a segment 332 from the backing sheet 336). In general, the non-adhesive side 340 of the segment 332 may include any type of writing, markings, decorative designs, or other ornamentation. In the illustrated example, the non-adhesive side 340 of the segment 332 includes writing or other markings that correspond to a destination address for the envelope 344. The envelope 44 also includes a return address 346 and, optionally, a postage stamp or mark 348.

In some examples, segments of the adhesive tape platform 330 are deployed by a human operator. The human operator may be equipped with a mobile phone or other device that allows the operator to authenticate and initialize the adhesive tape platform 330. In addition, the operator can take a picture of a parcel including the adhesive tape platform and any barcodes associated with the parcel and, thereby, create a persistent record that links the adhesive tape platform 330 to the parcel. In addition, the human operator typically will send the picture to a network service and/or transmit the picture to the adhesive tape platform 330 for storage in a memory component of the adhesive tape platform 330.

In some examples, the wireless transducing circuit components 334 that are embedded in a segment 332 of the adhesive tape platform 330 are activated when the segment 332 is removed from the backing sheet 336. In some of these examples, each segment 332 includes an embedded capacitive sensing system that can sense a change in capacitance when the segment 332 is removed from the backing sheet 336. As explained in detail below, a segment 332 of the adhesive tape platform 330 includes one or more embedded energy sources (e.g., thin film batteries, common disk-shaped cell batteries, or rechargeable batteries or other energy storage devices, such as a super capacitor or charge pump) that can be configured to supply power to the wireless transducing circuit components 334 in the segment 332 in response to the detection of a change in capacitance between the segment 332 and the backing sheet 336 as a result of removing the segment 332 from the backing sheet 336.

Figure 4:
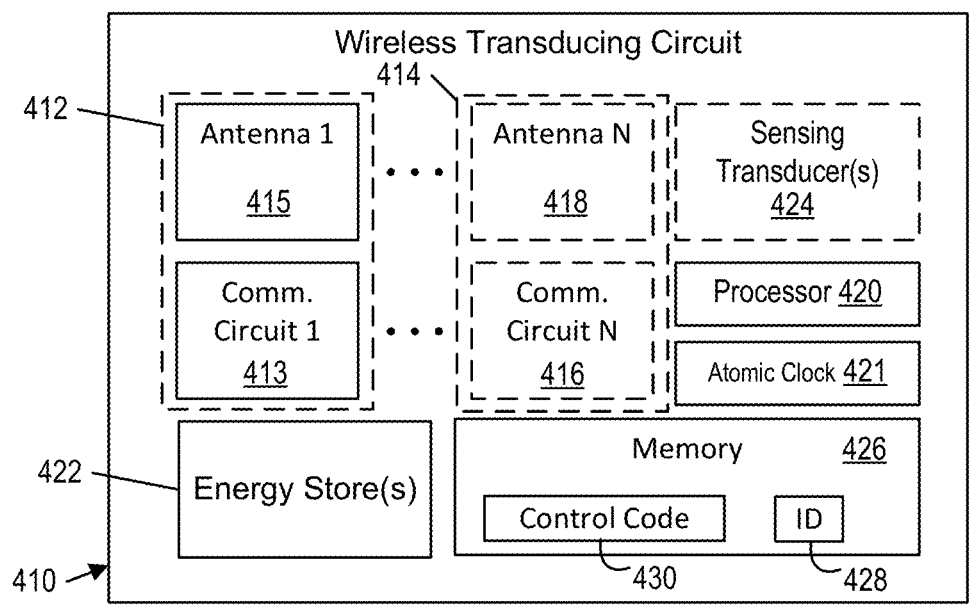
FIG. 4 is a block diagram illustrating components of an example wireless transducing circuit that includes one or more wireless communication modules, in embodiments.

FIG. 4 shows a block diagram of the components of an example wireless transducing circuit 410 (e.g., an agent) that includes one or more wireless communication modules 412, 414. Each wireless communication module 412, 414 includes a wireless communication circuit 413, 416, and an antenna 415, 418, respectively. Each wireless communication circuit 413, 416 may represent a receiver or transceiver integrated circuit that implements one or more of GSM/GPRS, Wi-Fi, LoRa, Bluetooth, Bluetooth Low Energy, Z-wave, and ZigBee. The wireless transducing circuit 410 also includes a processor 420 (e.g., a microcontroller or microprocessor), a solid-state atomic clock 421, at least one energy store 422 (e.g., non-rechargeable or rechargeable printed flexible battery, conventional single or multiple cell battery, and/or a super capacitor or charge pump), one or more sensing transducers 424 (e.g., sensors and/or actuators, and, optionally, one or more energy harvesting transducers). In some examples, the conventional single or multiple cell battery may be a watch style disk or button cell battery that is in an associated electrical connection apparatus (e.g., a metal clip) that electrically connects the electrodes of the battery to contact pads on the wireless transducing circuit 410.

Sensing transducers 424 may represent one or more of a capacitive sensor, an altimeter, a gyroscope, an accelerometer, a temperature sensor, a strain sensor, a pressure sensor, a piezoelectric sensor, a weight sensor, an optical or light sensor (e.g., a photodiode or a camera), an acoustic or sound sensor (e.g., a microphone), a smoke detector, a radioactivity sensor, a chemical sensor (e.g., an explosives detector), a biosensor (e.g., a blood glucose biosensor, odor detectors, antibody based pathogen, food, and water contaminant and toxin detectors, DNA detectors, microbial detectors, pregnancy detectors, and ozone detectors), a magnetic sensor, an electromagnetic field sensor, a humidity sensor, a light emitting units (e.g., light emitting diodes and displays), electro-acoustic transducers (e.g., audio speakers), electric motors, and thermal radiators (e.g., an electrical resistor or a thermoelectric cooler).

Wireless transducing circuit 410 includes a memory 426 for storing data, such as profile data, state data, event data, sensor data, localization data, security data, and/or at least one unique identifier (ID) 428 associated with the wireless transducing circuit 410, such as one or more of a product ID, a type ID, and a media access control (MAC) ID. Memory 426 may also store control code 430 that includes machine-readable instructions that, when executed by the processor 420, cause processor 420 to perform one or more autonomous agent tasks. In certain embodiments, the memory 426 is incorporated into one or more of the processor 420 or sensing transducers 424. In other embodiments, memory 426 is integrated in the wireless transducing circuit 410 as shown in FIG. 4. The control code 430 may implement programmatic functions or program modules that control operation of the wireless transducing circuit 410, including implementation of an agent communication manager that manages the manner and timing of tape agent communications, a node-power manager that manages power consumption, and a tape agent connection manager that controls whether connections with other nodes are secure connections (e.g., connections secured by public key cryptography) or unsecure connections, and an agent storage manager that securely manages the local data storage on the wireless transducing circuit 410. In certain embodiments, a node connection manager ensures the level of security required by the end application and supports various encryption mechanisms. In some examples, a tape agent power manager and communication manager work together to optimize the battery consumption for data communication. In some examples, execution of the control code by the different types of nodes described herein may result in the performance of similar or different functions.

Figure 5:
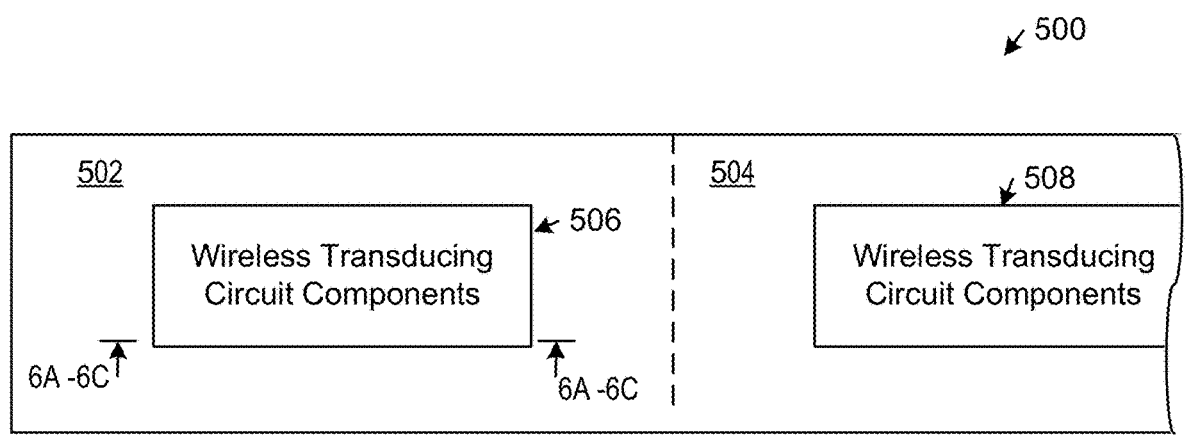
FIG. 5 is a top view of a portion of an example flexible adhesive tape platform illustrating a first segment and a portion of a second segment, in embodiments.

FIG. 5 is a top view of a portion of an example flexible adhesive tape platform 500 that shows a first segment 502 and a portion of a second segment 504. Each segment 502, 504 of the flexible adhesive tape platform 500 includes a respective set 506, 508 of the components of the wireless transducing circuit 410 of FIG. 4. The segments 502, 504 and their respective sets of components 506, 508 typically are identical and configured in the same way. In some other embodiments, however, the segments 502, 504 and/or their respective sets of components 506, 508 are different and/or configured in different ways. For example, in some examples, different sets of the segments of the flexible adhesive tape platform 500 have different sets or configurations of tracking and/or transducing components that are designed and/or optimized for different applications, or different sets of segments of the flexible adhesive tape platform may have different ornamentations (e.g., markings on the exterior surface of the platform) and/or different (e.g., alternating) lengths.

Figure 6A:
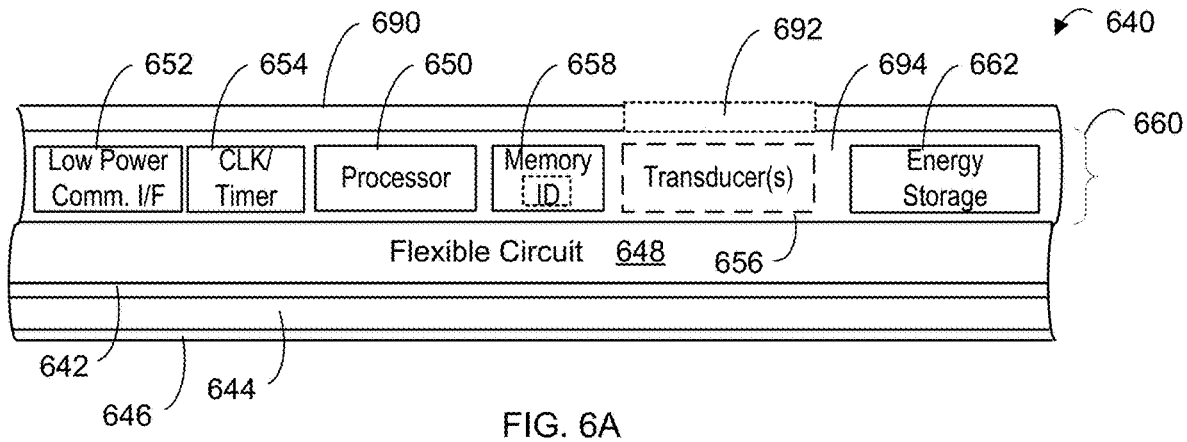
FIGS. 6A-C are schematic diagrams illustrating cross-sectional side views of portions of example segments of three types of flexible adhesive tape agent platforms, in embodiments.
Figure 6B:
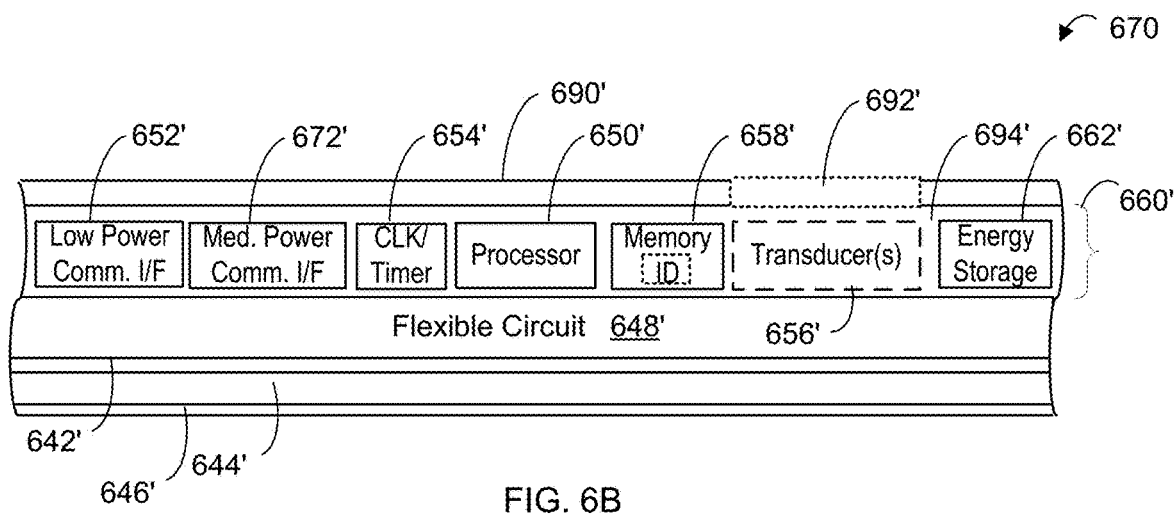
Figure 6C:
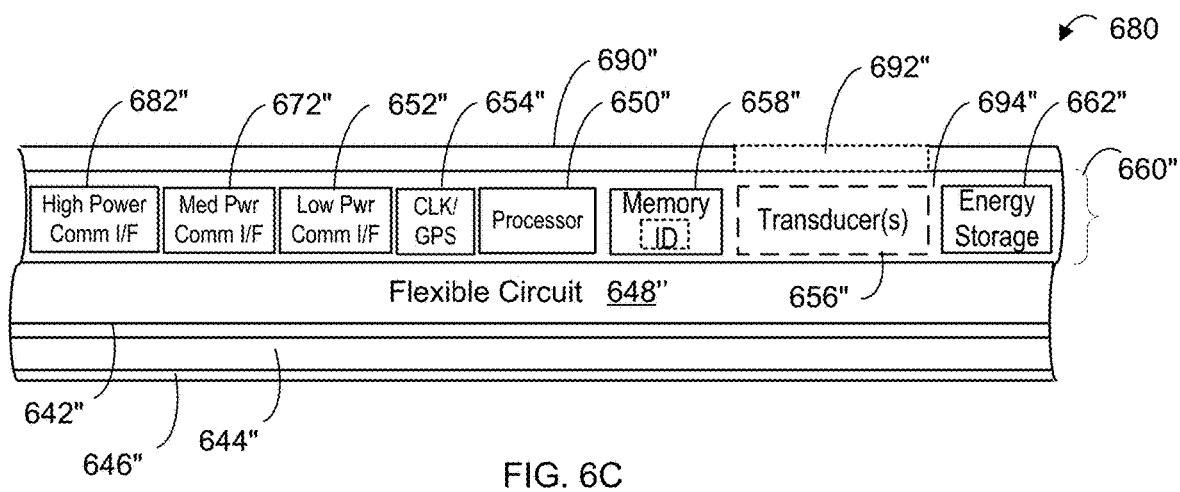
Figure 7A:
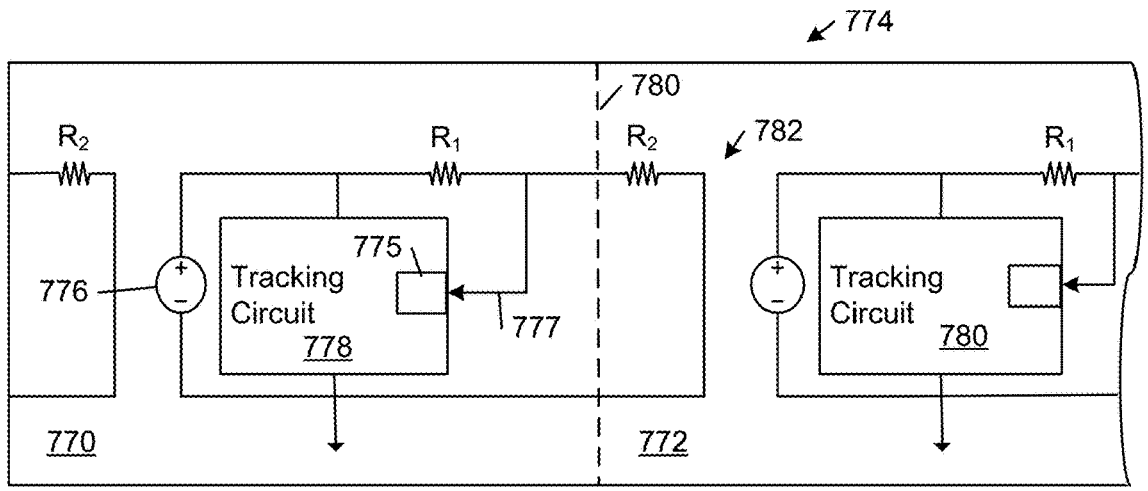
FIG. 7A is a schematic diagram illustrating an adhesive tracking product with a first example wake circuit that delivers power from an energy source to the tracking circuit in response to an event, in embodiments.
Figure 7B:
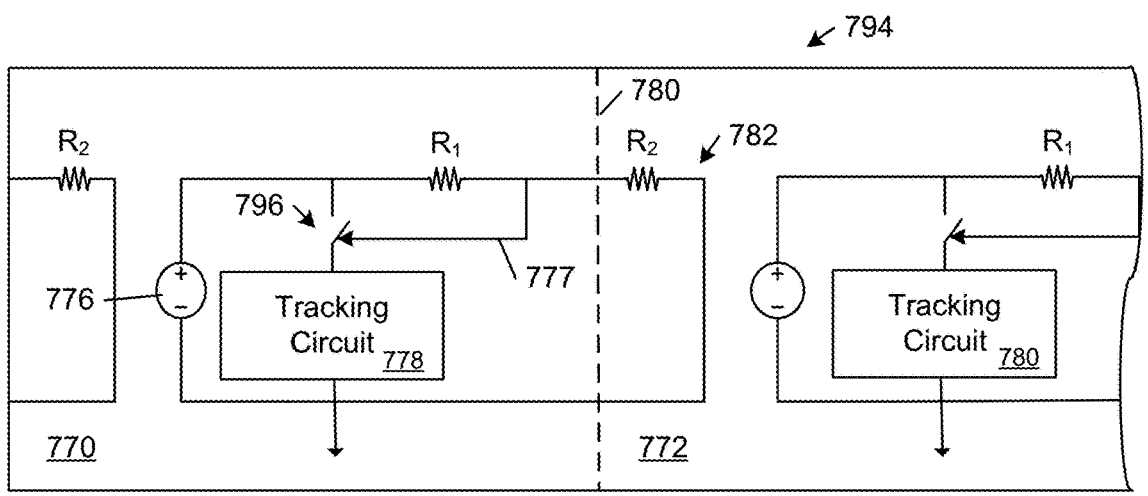
FIG. 7B is a schematic diagram illustrating an adhesive tracking product with a second example wake circuit that delivers power from an energy source to the tracking circuit in response to an event.

An example method of fabricating the adhesive tape platform 500 according to a roll-to-roll fabrication process is described in connection with FIGS. 6A-6C and as shown in FIGS. 7A and 7B of U.S. patent application Ser. No. 15/842,861, filed Dec. 14, 2017, the entirety of which is incorporated herein by reference.

The instant specification describes an example system of adhesive tape platforms (also referred to herein as "tape nodes") that can be used to implement a low-cost wireless network infrastructure for performing monitoring, tracking, and other asset management functions relating to, for example, parcels, persons, tools, equipment and other physical assets and objects. The example system includes a set of three different types of tape nodes that have different respective functionalities and different respective cover markings that visually distinguish the different tape node types from one another. In one non-limiting example, the covers of the different tape node types are marked with different colors (e.g., white, green, and black). In the illustrated examples, the different tape node types are distinguishable from one another by their respective wireless communications capabilities and their respective sensing capabilities.

FIG. 6A is a schematic illustrating a cross-sectional side view of a portion of an example segment 640 of a flexible adhesive tape agent platform (e.g., platform 500 of FIG. 5) that includes a respective set of the components of the wireless transducing circuit 410 corresponding to the first tape-agent type (e.g., white). The segment 640 includes an adhesive layer 642, an optional flexible substrate 644, and an optional adhesive layer 646 on the bottom surface of the flexible substrate 644. When the bottom adhesive layer 646 is present, a release liner (not shown) may be (weakly) adhered to the bottom surface of the adhesive layer 646. In certain embodiments where adhesive layer 646 is included, the adhesive layer 646 is an adhesive (e.g., an acrylic foam adhesive) with a high-bond strength that is sufficient to prevent removal of the segment 640 from a surface on which the adhesive layer 646 is adhered to without destroying the physical or mechanical integrity of the segment 640 and/or one or more of its constituent components.

In certain embodiments including the optional flexible substrate 644, the optional flexible substrate 644 is a pre-fabricated adhesive tape that includes the adhesive layers 642 and 646 and the optional release liner. In other embodiments including the optional flexible substrate 644, the adhesive layers 642, 646 are applied to the top and bottom surfaces of the flexible substrate 644 during the fabrication of the adhesive tape platform. The adhesive layer 642 may bond the flexible substrate 644 to a bottom surface of a flexible circuit 648, that includes one or more wiring layers (not shown) that connect the processor 650, a low-power wireless-communication interface 652 (e.g., a Zigbee, Bluetooth® Low Energy (BLE) interface, or other low power communication interface), a clock and/or a timer circuit 654, transducing and/or transducer(s) 656 (if present), the memory 658, and other components in a device layer 660 to each other and to the energy storage device 662 and, thereby, enable the transducing, tracking and other functionalities of the segment 640. The low-power wireless-communication interface 652 typically includes one or more of the antennas 415, 418 and one or more of the wireless communication circuits 413, 416 of FIG. 4. The segment 640 may further include a flexible cover 690, an interfacial region 692, and a flexible polymer layer 694.

FIG. 6B shows a cross-sectional side-view of a portion of an example segment 670 of a flexible adhesive tape agent platform (e.g., platform 500 of FIG. 5) that includes a respective set of the components of the wireless transducing circuit 410 corresponding to a second tape-agent type (e.g., green). The segment 670 is similar to the segment 640 shown in FIG. 6A but further includes a medium-power communication-interface 672' (e.g., a LoRa interface) in addition to the low-power communications-interface 652. The medium-power communication-interface 672' has a longer communication range than the low-power communication-interface 652'. In certain embodiments, one or more other components of the segment 670 differ from the segment 640 in functionality or capacity (e.g., larger energy source). The segment 670 may include further components, as discussed above and below with reference to FIGS. 6A, and 6C.

FIG. 6C shows a cross-sectional side view of a portion of an example segment 680 of the flexible adhesive tape-agent platform that includes a respective set of the components of the wireless transducing circuit 410 corresponding to the third tape-node type (e.g., black). The segment 680 is similar to the segment 670 of FIG. 6B, but further includes a high-power communications-interface 682" (e.g., a cellular interface; e.g., GSM/GPRS) in addition to a low-power communications-interface 652" and may include a medium-power communications-interface 672". The high-power communications-interface 682" has a range that provides global coverage to available infrastructure (e.g., the cellular network). In certain embodiments, one or more other components of the segment 680 differ from the segment 670 in functionality or capacity (e.g., larger energy source).

FIGS. 6A-6C show embodiments in which the flexible covers 690, 690', 690" of the respective segments 640, 670, and 680 include one or more interfacial regions 692, 692', 692" positioned over one or more of the transducers 656, 656', 656". In certain embodiments, one or more of the interfacial regions 692, 692', 692" have features, properties, compositions, dimensions, and/or characteristics that are designed to improve the operating performance of the platform for specific applications. In certain embodiments, the flexible adhesive tape platform includes multiple interfacial regions 692, 692', 692" over respective transducers 656, 656', 656", which may be the same or different depending on the target applications. Interfacial regions may represent one or more of an opening, an optically transparent window, and/or a membrane located in the interfacial regions 692, 692', 692" of the flexible covers 690, 690', 690" that is positioned over the one or more transducers and/or transducers 656, 656', 656". Additional details regarding the structure and operation of example interfacial regions 692, 692', 692" are described in U.S. Provisional Patent Application No. 62/680,716, filed Jun. 5, 2018, and US Provisional Patent Application No. 62/670,712, filed May 11, 2018.

In certain embodiments, a planarizing polymer 694, 694', 694" encapsulates the respective device layers 660, 660', 660" and thereby reduces the risk of damage that may result from the intrusion of contaminants and/or liquids (e.g., water) into the device layer 660, 660', 660". The flexible polymer layers 694, 694', 694" may also planarize the device layers 660, 660', 660". This facilitates optional stacking of additional layers on the device layers 660, 660', 660" and also distributes forces generated in, on, or across the segments 640, 670, 680 so as to reduce potentially damaging asymmetric stresses that might be caused by the application of bending, torquing, pressing, or other forces that may be applied to the segments 640, 670, 680 during use. In the illustrated example, a flexible cover 690, 690', 690" is bonded to the planarizing polymer 694, 694', 694" by an adhesive layer (not shown).

The flexible cover 690, 690', 690" and the flexible substrate 644, 644', 644" may have the same or different compositions depending on the intended application. In some examples, one or both of the flexible cover 690, 690', 690" and the flexible substrate 644, 644', 644" include flexible film layers and/or paper substrates, where the film layers may have reflective surfaces or reflective surface coatings. Compositions for the flexible film layers may represent one or more of polymer films, such as polyester, polyimide, polyethylene terephthalate (PET), and other plastics. The optional adhesive layer on the bottom surface of the flexible cover 690, 690', 690" and the adhesive layers 642, 642', 642", 646, 646', 646" on the top and bottom surfaces of the flexible substrate 644, 644', 644" typically include a pressure-sensitive adhesive (e.g., a silicon-based adhesive). In some examples, the adhesive layers are applied to the flexible cover 690, 690', 690" and the flexible substrate 644, 644', 644" during manufacture of the adhesive tape-agent platform (e.g., during a roll-to-roll or sheet-to-sheet fabrication process). In other examples, the flexible cover 690, 690', 690" may be implemented by a prefabricated single-sided pressure-sensitive adhesive tape and the flexible substrate 644, 644', 644" may be implemented by a prefabricated double-sided pressure-sensitive adhesive tape; both kinds of tape may be readily incorporated into a roll-to-roll or sheet-to-sheet fabrication process. In some examples, the flexible substrate 644, 644', 644" is composed of a flexible epoxy (e.g., silicone).

In certain embodiments, the energy storage device 662, 662', 662" is a flexible battery that includes a printed electrochemical cell, which includes a planar arrangement of an anode and a cathode and battery contact pads. In some examples, the flexible battery may include lithium-ion cells or nickel-cadmium electro-chemical cells. The flexible battery typically is formed by a process that includes printing or laminating the electro-chemical cells on a flexible substrate (e.g., a polymer film layer). In some examples, other components may be integrated on the same substrate as the flexible battery. For example, the low-power wireless-communication interface 652, 652', 652" and/or the processor(s) 650, 650', 650" may be integrated on the flexible battery substrate. In some examples, one or more of such components also (e.g., the flexible antennas and the flexible interconnect circuits) may be printed on the flexible battery substrate.

In examples of manufacture, the flexible circuit 648, 648', 648" is formed on a flexible substrate by one or more of printing, etching, or laminating circuit patterns on the flexible substrate. In certain embodiments, the flexible circuit 648, 648', 648" is implemented by one or more of a single-sided flex circuit, a double access or back-bared flex circuit, a sculpted flex circuit, a double-sided flex circuit, a multi-layer flex circuit, a rigid flex circuit, and a polymer-thick film flex circuit. A single-sided flexible circuit has a single conductor layer made of, for example, a metal or conductive (e.g., metal filled) polymer on a flexible dielectric film. A double access or back bared flexible circuit has a single conductor layer but is processed so as to allow access to selected features of the conductor pattern from both sides. A sculpted flex circuit is formed using a multi-step etching process that produces a flex circuit that has finished copper conductors that vary in thickness along their respective lengths. A multilayer flex circuit has three of more layers of conductors, where the layers typically are interconnected using plated through holes. Rigid flex circuits are a hybrid construction of flex circuit consisting of rigid and flexible substrates that are laminated together into a single structure, where the layers typically are electrically interconnected via plated through holes. In polymer thick film (PTF) flex circuits, the circuit conductors are printed onto a polymer base film, where there may be a single conductor layer or multiple conductor layers that are insulated from one another by respective printed insulating layers.

In the example segments 640, 670, 680 shown in FIGS. 6A-6C, the flexible circuit 648, 648', 648" represents a single-access flex-circuit that interconnects the components of the adhesive tape platform on a single side of the flexible circuit 648, 648', 648". However, in other embodiments, the flexible circuit 648, 648', 648" represents a double access flex circuit that includes a front-side conductive pattern that interconnects the low-power communications interface 652, 652', 652", the timer circuit 654, 654', 654", the processor 650, 650', 650", the one or more sensor transducers 656, 656', 656" (if present), and the memory 658, 658', 658", and allows through-hole access (not shown) to a back-side conductive pattern that is connected to the flexible battery (not shown). In these embodiments, the front-side conductive pattern of the flexible circuit 648, 648', 648" connects the communications circuits 652, 652', 652", 672', 672", 682" (e.g., receivers, transmitters, and transceivers) to their respective antennas and to the processor 650, 650', 650" and also connects the processor 650, 650', 650" to the one or more sensors and the memory 658, 658', and 658". The backside conductive pattern connects the active electronics (e.g., the processor 650, 650', 650", the communications circuits 652, 652', 652", 672', 672", 682" and the transducers) on the front-side of the flexible circuit 648, 648', 648" to the electrodes of the energy storage device 662, 662', 662" via one or more through holes in the substrate of the flexible circuit 648, 648', 648".

The various units of the segments 640, 670, 680 shown in FIGS. 6A-6C may be arranged to accommodate different objects or structures (e.g., trash bins, fire extinguishers, etc.) and sensors may be added to, or subtracted from, the segments 640, 670, and 680, according to a particular task.

Depending on the target application, the wireless transducing circuit 410 is distributed across the flexible adhesive tape platform 500 according to a specified sampling density, which is the number of wireless transducing circuits 410 for a given unit size (e.g., length or area) of the flexible adhesive tape platform 500. In some examples, a set of multiple flexible adhesive tape platforms 500 are provided that include different respective sampling densities in order to seal different asset sizes with a desired number of wireless transducing circuits 410. In particular, the number of wireless transducing circuits per asset size is given by the product of the sampling density specified for the adhesive tape platform and the respective size of the adhesive tape platform 500 needed to seal the asset. This allows an automated packaging system to select the appropriate type of flexible adhesive tape platform 500 to use for sealing a given asset with the desired redundancy (if any) in the number of wireless transducer circuits 410. In some example applications (e.g., shipping low value goods), only one wireless transducing circuit 410 is used per asset, whereas in other applications (e.g., shipping high value goods) multiple wireless transducing circuits 410 are used per asset. Thus, a flexible adhesive tape platform 500 with a lower sampling density of wireless transducing circuits 410 can be used for the former application, and a flexible adhesive tape platform 500 with a higher sampling density of wireless transducing circuits 410 can be used for the latter application. In some examples, the flexible adhesive tape platforms 500 are color-coded or otherwise marked to indicate the respective sampling densities with which the wireless transducing circuits 410 are distributed across the different types of adhesive tape platforms 500.

Referring to FIG. 7A, in some examples, each of one or more of the segments 770, 772 of a tracking adhesive product 774 includes a respective circuit 775 that delivers power from the respective energy source 776 to the respective tracking circuit 778 (e.g., a processor and one or more wireless communications circuits) in response to an event. In some of these examples, the wake circuit 775 is configured to transition from an off-state to an on-state when the voltage on the wake node 777 exceeds a threshold level, at which point the wake circuit transitions to an on-state to power-on the segment 770. In the illustrated example, this occurs when the user separates the segment from the tracking adhesive product 774, for example, by cutting across the tracking adhesive product 774 at a designated location (e.g., along a designated cut-line 780). In particular, in its initial, un-cut state, a minimal amount of current flows through the resistors R1 and R2. As a result, the voltage on the wake node 777 remains below the threshold turn-on level. After the user cuts across the tracking adhesive product 774 along the designated cut-line 780, the user creates an open circuit in the loop 782, which pulls the voltage of the wake node above the threshold level and turns on the wake circuit 775. As a result, the voltage across the energy source 776 will appear across the tracking circuit 778 and, thereby, turn on the segment 770. In particular embodiments, the resistance value of resistor R1 is greater than the resistance value of R2. In some examples, the resistance values of resistors R1 and R2 are selected based on the overall design of the adhesive product system (e.g., the target wake voltage level and a target leakage current).

In some examples, each of one or more of the segments of a tracking adhesive product includes a respective sensor and a respective wake circuit that delivers power from the respective energy source to the respective one or more components of the respective tracking circuit 778 in response to an output of the sensor. In some examples, the respective sensor is a strain sensor that produces a wake signal based on a change in strain in the respective segment. In some of these examples, the strain sensor is affixed to a tracking adhesive product and configured to detect the stretching of the tracking adhesive product segment as the segment is being peeled off a roll or a sheet of the tracking adhesive product. In some examples, the respective sensor is a capacitive sensor that produces a wake signal based on a change in capacitance in the respective segment. In some of these examples, the capacitive sensor is affixed to a tracking adhesive product and configured to detect the separation of the tracking adhesive product segment from a roll or a sheet of the tracking adhesive product. In some examples, the respective sensor is a flex sensor that produces a wake signal based on a change in curvature in the respective segment. In some of these examples, the flex sensor is affixed to a tracking adhesive product and configured to detect bending of the tracking adhesive product segment as the segment is being peeled off a roll or a sheet of the tracking adhesive product. In some examples, the respective sensor is a near field communications sensor that produces a wake signal based on a change in inductance in the respective segment.

FIG. 7B shows another example of a tracking adhesive product 794 that delivers power from the respective energy source 776 to the respective tracking circuit 778 (e.g., a processor and one or more wireless communications circuits) in response to an event. This example is similar in structure and operation as the tracking adhesive product 794 shown in FIG. 7A, except that the wake circuit 775 is replaced by a switch 796 that is configured to transition from an open state to a closed state when the voltage on the switch node 777 exceeds a threshold level. In the initial state of the tracking adhesive product 794, the voltage on the switch node is below the threshold level as a result of the low current level flowing through the resistors R1 and R2. After the user cuts across the tracking adhesive product 794 along the designated cut-line 780, the user creates an open circuit in the loop 782, which pulls up the voltage on the switch node above the threshold level to close the switch 796 and turn on the tracking circuit 778.

A wireless sensing system includes a plurality of wireless nodes configured to detect tampering in assets. Tampering may include, but is not limited to, opening assets such as boxes, containers, storage, or doors, moving the asset without authorization, moving the asset to an unintended location, moving the asset in an unintended way, damaging the asset, shaking the asset in an unintended way, orienting an asset in a way that it is not meant to be oriented. In many cases, these actions may compromise the integrity or safety of assets. Wireless nodes associated with the asset are configured to detect a tampering event. In an embodiment, a tampering event is associated with an action, a time, and a location. In an embodiment, the wireless nodes communicate the tampering event to the wireless sensing system. The wireless sensing system is configured to provide a notification or alert to a user of the wireless sensing system. In some embodiments, a wireless node may directly transmit the notification or alert to the user. In other embodiments, a wireless node may include a display that indicates whether or not a tampering event has occurred (e.g., the display may be an indicator light or LED).

Alerts may be transmitted to server/cloud, other wireless nodes, a client device, or some combination thereof. For example, in an embodiment, a wireless node of the wireless sensing system captures sensor data, detects a tampering event, and transmits an alarm to a user of the wireless sensing system (e.g., without communicating with a server or cloud of the wireless sensing system). In another embodiment, a wireless node of the wireless sensing system captures sensor data and transmits the sensor data to a gateway, parent node (e.g., black tape), or client device. The gateway, parent node, or client device detects a tampering event based on the received sensor data and transmits an alarm to a user of the wireless sensing system. In another embodiment, the wireless node of the wireless sensing system captures sensor data, detects a tampering event, and transmits information describing the tampering event to a server or cloud of the wireless sensing system. The server or cloud of the wireless sensing system transmits an alarm to a user of the wireless sensing system.

Figure 7C:
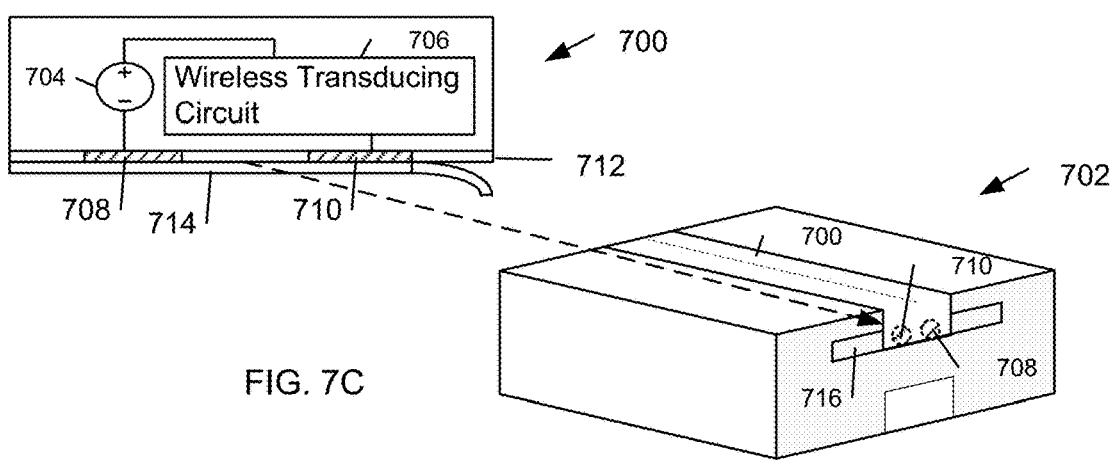
FIG. 7C is a diagrammatic cross-sectional front view of an example adhesive tape platform and a perspective view of an example asset, in embodiments.

FIG. 7C shows a diagrammatic cross-sectional front view of an example adhesive tape platform 700 and a perspective view of an example asset 702. Instead of activating the adhesive tape platform in response to separating a segment of the adhesive tape platform from a roll or a sheet of the adhesive tape platform, this example is configured to supply power from the energy source 704 to turn on the wireless transducing circuit 706 in response to establishing an electrical connection between two power terminals 708, 710 that are integrated into the adhesive tape platform. In particular, each segment of the adhesive tape platform 700 includes a respective set of embedded tracking components, an adhesive layer 712, and an optional backing sheet 714 with a release coating that prevents the segments from adhering strongly to the backing sheet 714. In some examples, the power terminals 708, 710 are composed of an electrically conductive material (e.g., a metal, such as copper) that may be printed or otherwise patterned and/or deposited on the backside of the adhesive tape platform 700. In operation, the adhesive tape platform can be activated by removing the backing sheet 714 and applying the exposed adhesive layer 712 to a surface that includes an electrically conductive region 716. In the illustrated embodiment, the electrically conductive region 716 is disposed on a portion of the asset 702. When the adhesive backside of the adhesive tape platform 700 is adhered to the asset with the exposed terminals 708, 710 aligned and in contact with the electrically conductive region 716 on the asset 702, an electrical connection is created through the electrically conductive region 716 between the exposed terminals 708, 710 that completes the circuit and turns on the wireless transducing circuit 706. In particular embodiments, the power terminals 708, 710 are electrically connected to any respective nodes of the wireless transducing circuit 706 that would result in the activation of the tracking circuit 706 in response to the creation of an electrical connection between the power terminals 708, 710.

In some examples, after a tape node is turned on, it will communicate with the network service to confirm that the user/operator who is associated with the tape node is an authorized user who has authenticated himself or herself to the network service. In these examples, if the tape node cannot confirm that the user/operator is an authorized user, the tape node will turn itself off.

Figure 8:
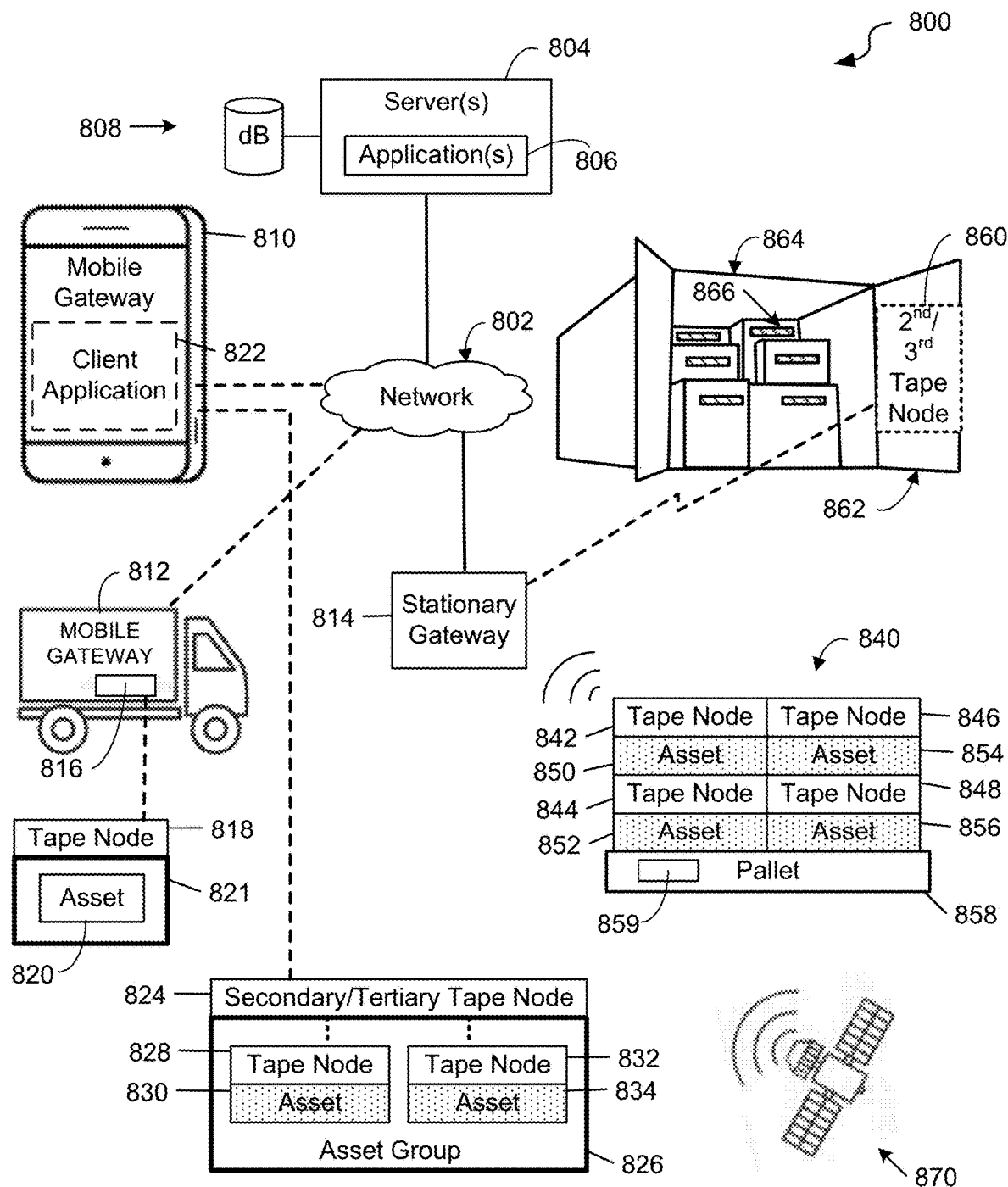
FIG. 8 is a schematic illustrating an example network communications environment that includes a network supporting communications between servers, mobile gateways, a stationary gateway, and various types of tape nodes associated with various assets, in embodiments.

FIG. 8 shows an example network communications environment 800 that includes a network 802 that supports communications between one or more servers 804 executing one or more applications of a network service 808, mobile gateways 810 (a smart device mobile gateway), 812 (a vehicle mobile gateway), a stationary gateway 814, and various types of tape nodes that are associated with various assets (e.g., parcels, equipment, tools, persons, and other things). Hereinafter "tape nodes" may be used interchangeably with the "agents", as described above, with reference to FIGS. 1-7; the "agents" are in the form of a "tape node" attached to different objects, e.g., an asset, storage container, vehicle, equipment, etc.; the master agent may be referred to as a master tape node, a secondary agent may be referred to as a secondary tape node; and a tertiary agent may be referred to as a tertiary tape node.

In some examples, the network 802 (e.g., a wireless network) includes one or more network communication systems and technologies, including any one or more of wide area networks, local area networks, public networks (e.g., the internet), private networks (e.g., intranets and extranets), wired networks, and wireless networks. For example, the network 802 includes communications infrastructure equipment, such as a geolocation satellite system 870 (e.g., GPS, GLONASS, and NAVSTAR), cellular communication systems (e.g., GSM/GPRS), Wi-Fi communication systems, RF communication systems (e.g., LoRa), Bluetooth communication systems (e.g., a Bluetooth Low Energy system), Z-wave communication systems, and ZigBee communication systems.

In some examples, the one or more network service applications leverage the above-mentioned communications technologies to create a hierarchical wireless network of tape nodes improves asset management operations by reducing costs and improving efficiency in a wide range of processes, from asset packaging, asset transporting, asset tracking, asset condition monitoring, asset inventorying, and asset security verification. Communication across the network is secured by a variety of different security mechanisms. In the case of existing infrastructure, a communication link uses the infrastructure security mechanisms. In the case of communications among tapes nodes, the communication is secured through a custom security mechanism. In certain cases, tape nodes may also be configured to support block chain to protect the transmitted and stored data.

A network of tape nodes may be configured by the network service to create hierarchical communications network. The hierarchy may be defined in terms of one or more factors, including functionality (e.g., wireless transmission range or power), role (e.g., master-tape node vs. peripheral-tape node), or cost (e.g., a tape node equipped with a cellular transceiver vs. a peripheral tape node equipped with a Bluetooth LE transceiver). As described above with reference to the agents, tape nodes may be assigned to different levels of a hierarchical network according to one or more of the above-mentioned factors. For example, the hierarchy may be defined in terms of communication range or power, where tape nodes with higher-power or longer-communication range transceivers are arranged at a higher level of the hierarchy than tape nodes with lower-power or lower-range power or lower range transceivers. In another example, the hierarchy is defined in terms of role, where, e.g., a master tape node is programmed to bridge communications between a designated group of peripheral tape nodes and a gateway node or server node. The problem of finding an optimal hierarchical structure may be formulated as an optimization problem with battery capacity of nodes, power consumption in various modes of operation, desired latency, external environment, etc. and may be solved using modern optimization methods e.g. neural networks, artificial intelligence, and other machine learning computing systems that take expected and historical data to create an optimal solution and may create algorithms for modifying the system's behavior adaptively in the field.

The tape nodes may be deployed by automated equipment or manually. In this process, a tape node typically is separated from a roll or sheet and adhered to a parcel (e.g., asset 820) or other stationary (e.g., stationary gateway 814) or mobile object (e.g., a, such as a delivery truck, such as mobile gateway 812) or stationary object (e.g., a structural element of a building). This process activates the tape node (e.g., the tape node 818) and causes the tape node 818 to communicate with the one or more servers 804 of the network service 808. In this process, the tape node 418 may communicate through one or more other tape nodes (e.g., the tape nodes 842, 844, 846, 848) in the communication hierarchy. In this process, the one or more servers 804 executes the network service application 806 to programmatically configure tape nodes 818, 824, 828, 832, 842, 844, 846, 848, that are deployed in the network communications environment 800. In some examples, there are multiple classes or types of tape nodes (e.g., a master agent, a secondary agent, or tertiary agent), where each tape node class has a different respective set of functionalities and/or capacities, as described herein with respect to the "agents" in FIGS. 1-7. For example, the master agents have a lower-power wireless-communication interface (e.g., the low-power wireless-communication interface 652, with reference to FIG. 6), in comparison to the secondary and tertiary agents.

In some examples, the one or more servers 804 communicate over the network 802 with one or more gateways 810, 812, 814 that are configured to send, transmit, forward, or relay messages to the network 802 in response to transmissions from the tape nodes 818, 824, 828, 832, 842, 844, 846, 848 that are associated with respective assets and within communication range. Example gateways include mobile gateways 810, 812 and a stationary gateway 814. In some examples, the mobile gateways 810, 812, and the stationary gateway 814 are able to communicate with the network 802 and with designated sets or groups of tape nodes.

In some examples, the mobile gateway 812 is a vehicle (e.g., a delivery truck or other mobile hub) that includes a wireless communications unit 816 that is configured by the network service 808 to communicate with a designated network of tape nodes, including tape node 818 (e.g., a master tape node) in the form of a label that is adhered to a parcel 821 (e.g., an envelope) that contains an asset 820, and is further configured to communicate with the network service 808 over the network 802. In some examples, the tape node 818 includes a lower-power wireless-communications interface of the type used in, e.g., segment 640 (shown in FIG. 6A), and the wireless communications unit 816 may be implemented by a secondary or tertiary tape node (e.g., one of segment 670 or segment 680, respectively shown in FIGS. 6B and 6C) that includes a lower-power communications interfaces for communicating with tape nodes within range of the mobile gateway 812 and a higher-power communications-interface for communicating with the network 802. In this way, the tape node 818 and wireless communications unit 816 create a hierarchical wireless network of tape nodes for transmitting, forwarding, bridging, relaying, or otherwise communicating wireless messages to, between, or on behalf of the tape node 818 in a power-efficient and cost-effective way.

In some examples, a mobile gateway 810 is a mobile phone that is operated by a human operator and executes a client application 822 that is configured by a network service to communicate with a designated set of tape nodes, including a secondary or tertiary tape node 824 that is adhered to a parcel 826 (e.g., a box), and is further configured to communicate with a server 804 over the network 802. In the illustrated example, the parcel 826 contains a first parcel labeled or sealed by a master tape node 828 and containing a first asset 830, and a second parcel labeled or sealed by a master tape node 832 and containing a second asset 834. The secondary or tertiary tape node 824 communicates with each of the master tape nodes 828, 832 and also communicates with the mobile gateway 810. In some examples, each of the master tape nodes 828, 832 includes a lower-power wireless-communications interface of the type used in, e.g., segment 640 (shown in FIG. 6A), and the secondary/tertiary tape node 824 is implemented by a tape node (e.g., segment 670 or segment 680, shown in FIGS. 6B and 6C) that includes a low-power communications interface for communicating with the master tape nodes 828, 832 contained within the parcel 826, and a higher-power communications interface for communicating with the mobile gateway 810. The secondary or tertiary tape node 824 is operable to relay wireless communications between the master tape nodes 828, 832 contained within the parcel 826 and the mobile gateway 810, and the mobile gateway 810 is operable to relay wireless communications between the secondary or tertiary tape node 824 and the server 804 over the network 802. In this way, the master tape nodes 828 and 832 and the secondary or tertiary tape node 824 create a wireless network of nodes for transmitting, forwarding, relaying, or otherwise communicating wireless messages to, between, or on behalf of the master tape nodes 828, 832, the secondary or tertiary tape node 824, and the network service (not shown) in a power-efficient and cost-effective way.

In some embodiments, the client application 822 is installed on a mobile device (e.g., smartphone) that may also operate as mobile gateway 810. The client application 822 may cause the mobile device to function as a mobile gateway 810. For example, the client application 822 runs in the background to allow the mobile device to bridge communications between tape nodes that are communicating on one protocol to other tape nodes that are communicating on another protocol. For example, a tape node transmits data to the mobile device through Bluetooth, and the mobile device (running the client application 822) relays that data to the server 804 via cellular (2G, 3G, 4G, 5G) or Wi-Fi. Further, the client application 822 may cause the mobile device to establish a connection with, and receive pings (e.g., alerts to nearby assets that an environmental profile threshold has been exceeded), from the tape nodes or from the server 804. The tape nodes or server may request services (e.g., to display alert messages within a graphical user interface of the mobile device, relay messages to nearby tape nodes or mobile or stationary gateways, delegate tasks to the mobile device, such as determining the location of the tape node, etc.) from the mobile device. For example, the mobile device running the client application 822 may share location data with the tape node, allowing the tape node to pinpoint its location.

In some examples, the stationary gateway 814 is implemented by a server 804 executing a network service application 806 that is configured by the network service 808 to communicate with a designated set 840 of master tape nodes 842, 844, 846, 848 that are adhered to respective parcels containing respective assets 850, 852, 854, 856 on a pallet 858. In other examples, the stationary gateway 814 is implemented by a secondary or tertiary tape node 860 (e.g., segments 670 or 680, respectively shown in FIGS. 6B and 6C) that is adhered to, for example, a wall, column or other infrastructure component of the physical premise's environment 800, and includes a low-power communications interface for communicating with nodes within range of the stationary gateway 814 and a higher-power communications interface for communicating with the network 802.

In one embodiment, each of the master tape nodes 842-848 is a master tape node and is configured by the network service 808 to communicate individually with the stationary gateway 814, which relays communications from the master tape nodes 842-848 to the network service 808 through the stationary gateway 814 and over the network 802. In another embodiment, one of the master tape nodes 842-848 at a time is configured to transmit, forward, relay, or otherwise communicate wireless messages to, between, or on behalf of the other master nodes on the pallet 858. In this embodiment, the master tape node may be determined by the master tape nodes 842-848 or designated by the network service 808. In some examples, the master tape nodes 842-848 with the longest range or highest remaining power level is determined to be the master tape node. In some examples, when the power level of the current master tape node drops below a certain level (e.g., a fixed power threshold level or a threshold level relative to the power levels of one or more of the other master tape nodes), another one of the master tape nodes assumes the role of the master tape node. In some examples, a master tape node 859 is adhered to the pallet 858 and is configured to perform the role of a master node for the other master tape nodes 842-848. In these ways, the master tape nodes 842-848, 859 are configurable to create different wireless networks of nodes for transmitting, forwarding, relaying, bridging, or otherwise communicating wireless messages with the network service 408 through the stationary gateway 814 and over the network 802 in a power-efficient and cost-effective way.

In the illustrated example, the stationary gateway 814 also is configured by the network service 808 to communicate with a designated network of tape nodes, including the secondary or tertiary tape node 860 that is adhered to the inside of a door 862 of a shipping container 864, and is further configured to communicate with the network service 808 over the network 802. In the illustrated example, the shipping container 864 contains a number of parcels labeled or sealed by respective master tape nodes 866 and containing respective assets. The secondary or tertiary tape node 860 communicates with each of the master tape nodes 866 within the shipping container 864 and communicates with the stationary gateway 814. In some examples, each of the master tape nodes 866 includes a low-power wireless communications-interface (e.g., the low-power wireless-communication interface 652, 652', 652", with reference to FIGS. 6A-6C), and the secondary or tertiary tape node 860 includes a low-power wireless-communications interface (low-power wireless-communication interfaces 652', 652", with reference to FIGS. 6B-6C) for communicating with the master tape nodes 866 contained within the shipping container 864, and a higher-power wireless-communications interface (e.g., medium-power wireless-communication interface 672', medium-power wireless-communication interface 672", high-power wireless-communication interface 682", with reference to FIGS. 6B-6C) for communicating with the stationary gateway 814. In some examples, either a secondary or tertiary tape node, or both, may be used, depending on whether a high-power wireless-communication interface is necessary for sufficient communication.

In some examples, when the doors of the shipping container 864 are closed, the secondary or tertiary tape node 860 is operable to communicate wirelessly with the master tape nodes 866 contained within the shipping container 864. In some embodiments, both a secondary and a tertiary node are attached to the shipping container 864. Whether a secondary and a tertiary node are used may depend on the range requirements of the wireless-communications interface. For example, if out at sea a node will be required to transmit and receive signals from a server located outside the range of a medium-power wireless-communications interface, a tertiary node will be used because the tertiary node includes a high-power wireless-communications interface.

In an example, the secondary or tertiary tape node 860 is configured to collect sensor data from master tape nodes 866 and, in some embodiments, process the collected data to generate, for example, statistics from the collected data. When the doors of the shipping container 864 are open, the secondary or tertiary tape node 860 is programmed to detect the door opening (e.g., using a photodetector or an accelerometer component of the secondary or tertiary tape node 860) and, in addition to reporting the door opening event to the network service 808, the secondary or tertiary tape node 860 is further programmed to transmit the collected data and/or the processed data in one or more wireless messages to the stationary gateway 814. The stationary gateway 814, in turn, is operable to transmit the wireless messages received from the secondary or tertiary tape node 860 to the network service 808 over the network 802. Alternatively, in some examples, the stationary gateway 814 also is operable to perform operations on the data received from the secondary or tertiary tape node 860 with the same type of data produced by the secondary or tertiary tape node 860 based on sensor data collected from the master tape nodes 842-848. In this way, the secondary or tertiary tape node 860 and master tape node 866 create a wireless network of nodes for transmitting, forwarding, relaying, or otherwise communicating wireless messages to, between, or on behalf of the master tape node 866, the secondary or tertiary tape nodes 860, and the network service 808 in a power-efficient and cost-effective way.

In an example of the embodiment shown in FIG. 8, there are three types of backward compatible tape nodes: a short-range master tape node (e.g., segment 640), a medium-range secondary tape node (e.g., segment 670), and a long-range tertiary tape node (e.g. segment 680), as respectively shown in FIGS. 6A-6C (here, "tape node" is used interchangeably with "agent", as described with reference to FIGS. 1-7). The short-range master tape nodes typically are adhered directly to parcels containing assets. In the illustrated example, the master tape nodes 818, 828, 832, 842-848, 866 are short-range tape nodes. The short-range tape nodes typically communicate with a low-power wireless-communication protocol (e.g., Bluetooth LE, Zigbee, or Z-wave). The segments 670 are typically adhered to objects (e.g., a parcel 826 and a shipping container 864) that are associated with multiple parcels that are separated from the medium-range tape nodes by a barrier or a long distance. In the illustrated example, the secondary and/or tertiary tape nodes 824 and 860 are medium-range tape nodes. The medium-range tape nodes typically communicate with low and medium-power wireless-communication protocols (e.g., Bluetooth, LoRa, or Wi-Fi). The segments 680 typically are adhered to mobile or stationary infrastructure of the network communications environment 800.

In the illustrated example, the mobile gateway 812 and the stationary gateway 814 are implemented by, e.g., segment 680. The segments 680 typically communicate with other nodes using a high-power wireless-communication protocol (e.g., a cellular data communication protocol). In some examples, the wireless communications unit 416 (a secondary or tertiary tape node) is adhered to a mobile gateway 812 (e.g., a truck). In these examples, the wireless communications unit 816 may be moved to different locations in the network communications environment 800 to assist in connecting other tape nodes to the wireless communications unit 816. In some examples, the stationary gateway 814 is a tape node that may be attached to a stationary structure (e.g., a wall) in the network communications environment 800 with a known geographic location (e.g., GPS coordinates). In these examples, other tape nodes in the environment may determine their geographic location by querying the stationary gateway 814.

In some examples, in order to conserve power, the tape nodes typically communicate according to a schedule promulgated by the network service 808. The schedule usually dictates all aspects of the communication, including the times when particular tape nodes should communicate, the mode of communication, and the contents of the communication. In one example, the server (not shown) transmits programmatic Global Scheduling Description Language (GSDL) code to the master tape node and each of the secondary and tertiary tape nodes in the designated set. In this example, execution of the GSDL code causes each of the tape nodes in the designated set to connect to the master tape node at a different respective time that is specified in the GSDL code, and to communicate a respective set of one or more data packets of one or more specified types of information over the respective connection. In some examples, the master tape node simply forwards the data packets to the server 804, either directly or indirectly through a gateway tape node (e.g., the long-range tape node, such as wireless communication unit 816, adhered to the mobile gateway 812, or a long-range tape node, such as stationary gateway 814, that is adhered to an infrastructure component of the network communications environment 800). In other examples, the master tape node processes the information contained in the received data packets and transmits the processed information to the server 804.

Figure 9:
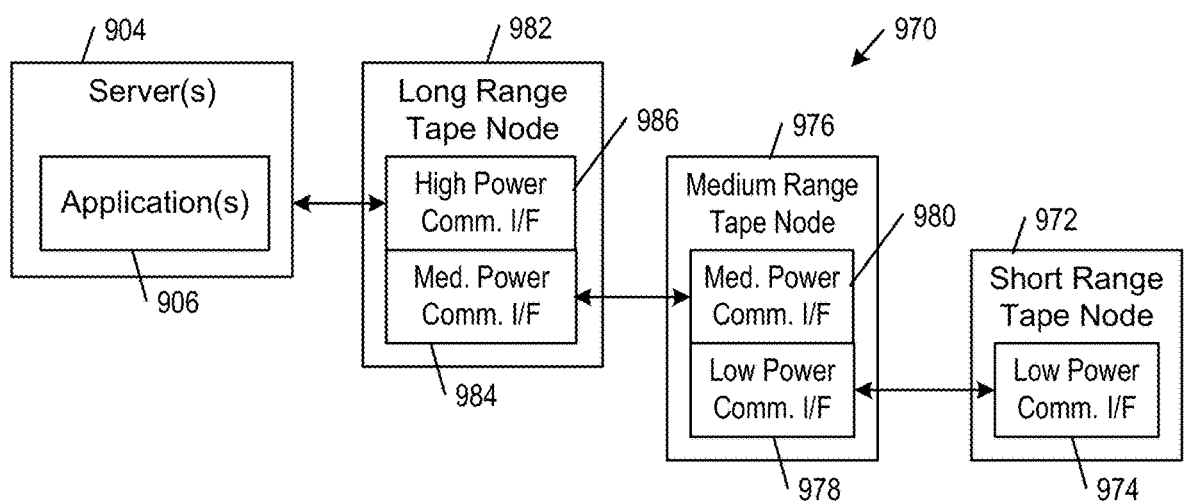
FIG. 9 is a schematic illustrating one example hierarchical wireless communications network of tape nodes, in embodiments.

FIG. 9 is a schematic illustrating one example hierarchical wireless communications network of tape nodes 970. In this example, the short-range tape node 972 and the medium range tape node 976 communicate with one another over their respective low power wireless-communication interfaces 974, 978. The medium range tape node 976 and the long-range tape node 982 communicate with one another over their respective medium power wireless-communication interfaces 980, 984. The long-range tape node 982 and the one or more network service servers 904 (e.g., server(s) 804, FIG. 8) running application(s) 906 (e.g., application(s) 806) communicate with one another over the high-power communication interface 986. In some examples, the low power communication interfaces 974, 978 establish wireless communications with one another in accordance with the Bluetooth LE protocol, the medium power communication interfaces 980, 984 establish wireless communications with one another in accordance with the LoRa communications protocol, and the high-power communication interface 986 establishes wireless communications with the one or more network service servers 904 in accordance with a cellular communications protocol.

In some examples, the different types of tape nodes are deployed at different levels in the communications hierarchy according to their respective communications ranges, with the long-range tape nodes generally at the top of the hierarchy, the medium range tape nodes generally in the middle of the hierarchy, and the short-range tape nodes generally at the bottom of the hierarchy. In some examples, the different types of tape nodes are implemented with different feature sets that are associated with component costs and operational costs that vary according to their respective levels in the hierarchy. This allows system administrators flexibility to optimize the deployment of the tape nodes to achieve various objectives, including cost minimization, asset tracking, asset localization, and power conservation.

In some examples, one or more network service servers 904 designates a tape node at a higher level in a hierarchical communications network as a master node of a designated set of tape nodes at a lower level in the hierarchical communications network. For example, the designated master tape node may be adhered to a parcel (e.g., a box, pallet, or shipping container) that contains one or more tape nodes that are adhered to one or more packages containing respective assets. In order to conserve power, the tape nodes typically communicate according to a schedule promulgated by the one or more network service servers 904. The schedule usually dictates all aspects of the communication, including the times when particular tape nodes should communicate, the mode of communication, and the contents of the communication. In one example, the one or more network service servers 904 transmits programmatic Global Scheduling Description Language (GSDL) code to the master tape node and each of the lower-level tape nodes in the designated set. In this example, execution of the GSDL code causes each of the tape nodes in the designated set to connect to the master tape node at a different respective time that is specified in the GSDL code, and to communicate a respective set of one or more data packets of one or more specified types of information over the respective connection. In some examples, the master tape node simply forwards the data packets to the one or more network service servers 904, either directly or indirectly through a gateway tape node (e.g., the long-range wireless communication unit 816 adhered to the mobile gateway 812 (which could be a vehicle, ship, plane, etc.) or the stationary gateway 814 is a long-range tape node adhered to an infrastructure component of the environment 800). In other examples, the master tape node processes the information contained in the received data packets and transmits the processed information to the one or more network service servers 904/804.

Figure 10:
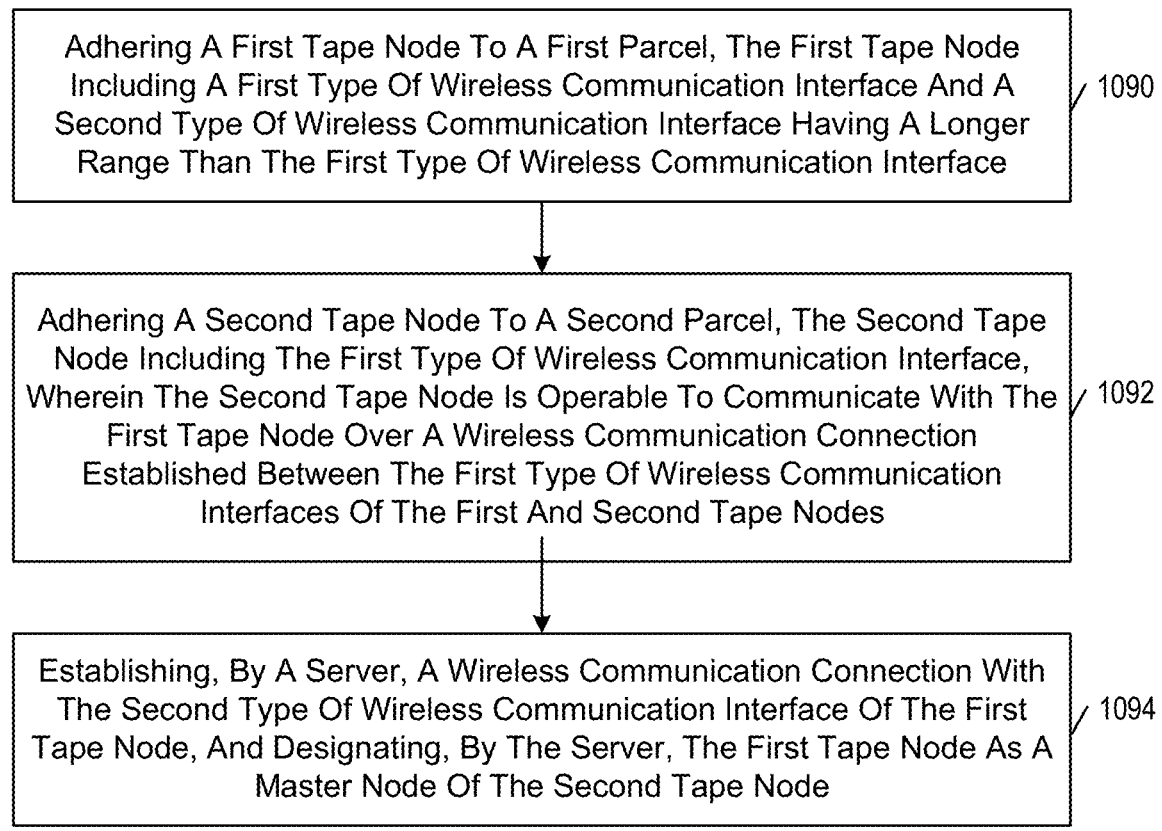
FIG. 10 is a flowchart illustrating one example method of creating a hierarchical communications network, in embodiments.

FIG. 10 is a flowchart illustrating one example method of creating a hierarchical communications network. In accordance with this method, a first tape node is adhered to a first parcel in a set of associated parcels, the first tape node including a first type of wireless-communication interface and a second type of wireless-communication interface having a longer range than the first type of wireless-communication interface (FIG. 10, block 1090). A second tape node is adhered to a second parcel in the set, the second tape node including the first type of wireless-communication interface, wherein the second tape node is operable to communicate with the first tape node over a wireless communication connection established between the first type of wireless-communication interfaces of the first and second tape nodes (FIG. 10, block 1092). An application executing on a computer system (e.g., the one or more network service servers 904 of a network service 908) establishes a wireless communication connection with the second type of wireless-communication interface of the first tape node, and the application transmits programmatic code executable by the first tape node to function as a master tape node with respect to the second tape node (FIG. 10, block 1094).

As used herein, the term "node" refers to both a tape node and a non-tape node unless the node is explicitly designated as a "tape node" or a "non-tape node." In some embodiments, a non-tape node may have the same or similar communication, sensing, processing and other functionalities and capabilities as the tape nodes described herein, except without being integrated into a tape platform. In some embodiments, non-tape nodes can interact seamlessly with tape nodes. Each node is assigned a respective unique identifier.

Embodiments of the present disclosure further describe a distributed software operating system that is implemented by distributed hardware nodes executing intelligent agent software to perform various tasks or algorithms. In some embodiments, the operating system distributes functionalities (e.g., performing analytics on data or statistics collected or generated by nodes) geographically across multiple intelligent agents that are bound to logistic items (e.g., parcels, containers, packages, boxes, pallets, a loading dock, a door, a light switch, a vehicle such as a delivery truck, a shipping facility, a port, a hub, etc.). In addition, the operating system dynamically allocates the hierarchical roles (e.g., master and slave roles) that nodes perform over time in order to improve system performance, such as optimizing battery life across nodes, improving responsiveness, and achieving overall objectives. In some embodiments, optimization is achieved using a simulation environment for optimizing key performance indicators (PKIs).

In some embodiments, the nodes are programmed to operate individually or collectively as autonomous intelligent agents. In some embodiments, nodes are configured to communicate and coordinate actions and respond to events. In some embodiments, a node is characterized by its identity, its mission, and the services that it can provide to other nodes. A node's identity is defined by its capabilities (e.g., battery life, sensing capabilities, and communications interfaces). A node may be defined by the respective program code, instructions, or directives it receives from another node (e.g., a server or a master node) and the actions or tasks that it performs in accordance with that program code, instructions, or directives (e.g., sense temperature every hour and send temperature data to a master node to upload to a server). A node's services may be defined by the functions or tasks that it is permitted to perform for other nodes (e.g., retrieve temperature data from a peripheral node and send the received temperature data to the server). At least for certain tasks, once programmed and configured with their identities, missions, and services, nodes can communicate with one another and request services from and provide services to one another independently of the server.

Thus, in accordance with the runtime operating system every agent knows its objectives (programmed). Every agent knows which capabilities/resources it needs to fulfill objective. Every agent communicates with every other node in proximity to see if it can offer the capability. Examples include communicate data to the server, authorize going to lower-power level, temperature reading, send an alert to local hub, send location data, triangulate location, any boxes in same group that already completed group objectives.

Nodes can be associated with logistic items. Examples of a logistic item includes, for example, a package, a box, pallet, a container, a truck or other conveyance, infrastructure such as a door, a conveyor belt, a light switch, a road, or any other thing that can be tracked, monitored, sensed, etc. or that can transmit data concerning its state or environment. In some examples, a server or a master node may associate the unique node identifiers with the logistic items.

Communication paths between tape and/or non-tape nodes may be represented by a graph of edges between the corresponding logistic items (e.g., a storage unit, truck, or hub). In some embodiments, each node in the graph has a unique identifier. A set of connected edges between nodes is represented by a sequence of the node identifiers that defines a communication path between a set of nodes.

Figure 11A:
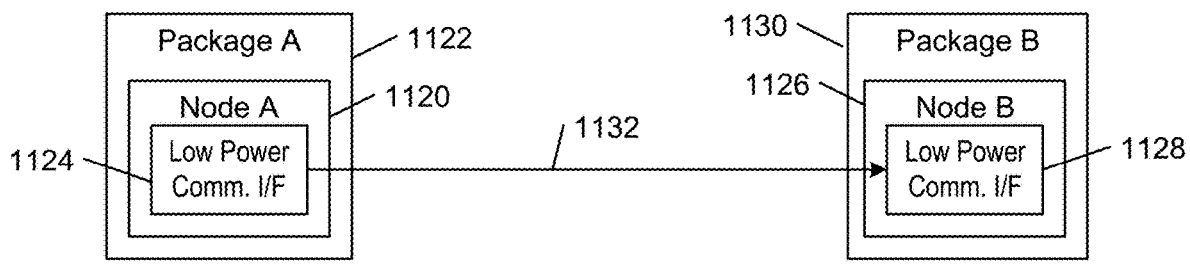
FIG. 11A shows a node (Node A) associated with a package (Package A), in embodiments.

Referring to FIG. 11A, a node 1120 (Node A) is associated with a package 1122 (Package A). In some embodiments, the node 1120 may be implemented as a tape node that is used to seal the package 1122 or it may be implemented as a label node that is used to label the package 1122; alternatively, the node 1120 may be implemented as a non-tape node that is inserted within the package 1122 or embedded in or otherwise attached to the interior or exterior of the package 1122. In the illustrated embodiment, the node 1120 includes a low power communications interface 1124 (e.g., a Bluetooth Low Energy communications interface). Another node 1126 (Node B), which is associated with another package 1130 (Package B), is similarly equipped with a compatible low power communications interface 1128 (e.g., a Bluetooth Low Energy communications interface).

In an example scenario, in accordance with the programmatic code stored in its memory, node 1126 (Node B) requires a connection to node 1120 (Node A) to perform a task that involves checking the battery life of Node A. Initially, Node B is unconnected to any other nodes. In accordance with the programmatic code stored in its memory, Node B periodically broadcasts advertising packets into the surrounding area. When the other node 1120 (Node A) is within range of Node B and is operating in a listening mode, Node A will extract the address of Node B and potentially other information (e.g., security information) from an advertising packet. If, according to its programmatic code, Node A determines that it is authorized to connect to Node B, Node A will attempt to pair with Node B. In this process, Node A and Node B determine each other's identities, capabilities, and services. For example, after successfully establishing a communication path 1132 with Node A (e.g., a Bluetooth Low Energy formatted communication path), Node B determines Node A's identity information (e.g., master node), Node A's capabilities include reporting its current battery life, and Node A's services include transmitting its current battery life to other nodes. In response to a request from Node B, Node A transmits an indication of its current battery life to Node B.

Figure 11B:
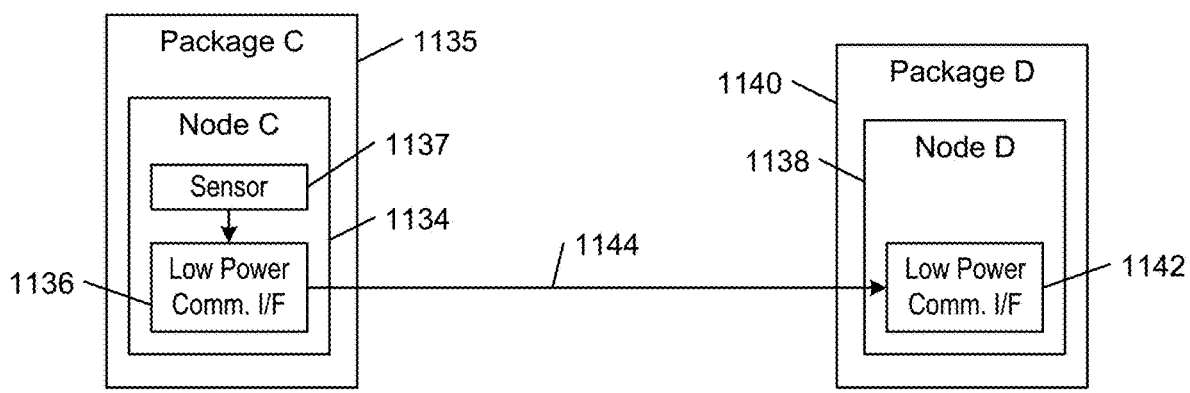
FIG. 11B shows a node (Node C) associated with a package (Package C), in embodiments.

Referring to FIG. 11B, a node 1134 (Node C) is associated with a package 1135 (Package C). In the illustrated embodiment, the Node C includes a low power communications interface 1136 (e.g., a Bluetooth Low Energy communications interface), and a sensor 1137 (e.g., a temperature sensor). Another node 1138 (Node D), which is associated with another package 1140 (Package D), is similarly equipped with a compatible low power communications interface 1142 (e.g., a Bluetooth Low-Energy communications interface).

In an example scenario, in accordance with the programmatic code stored in its memory, Node D requires a connection to Node C to perform a task that involves checking the temperature in the vicinity of Node C. Initially, Node D is unconnected to any other nodes. In accordance with the programmatic code stored in its memory, Node D periodically broadcasts advertising packets in the surrounding area. When Node C is within range of Node D and is operating in a listening mode, Node C will extract the address of Node D and potentially other information (e.g., security information) from the advertising packet. If, according to its programmatic code, Node C determines that it is authorized to connect to Node D, Node C will attempt to pair with Node D. In this process, Node C and Node D determine each other's identities, capabilities, and services. For example, after successfully establishing a communication path 1144 with Node C (e.g., a Bluetooth Low Energy formatted communication path), Node D determines Node C's identity information (e.g., a peripheral node), Node C's capabilities include retrieving temperature data, and Node C's services include transmitting temperature data to other nodes. In response to a request from Node D, Node C transmits its measured and/or locally processed temperature data to Node D.

Figure 11C:
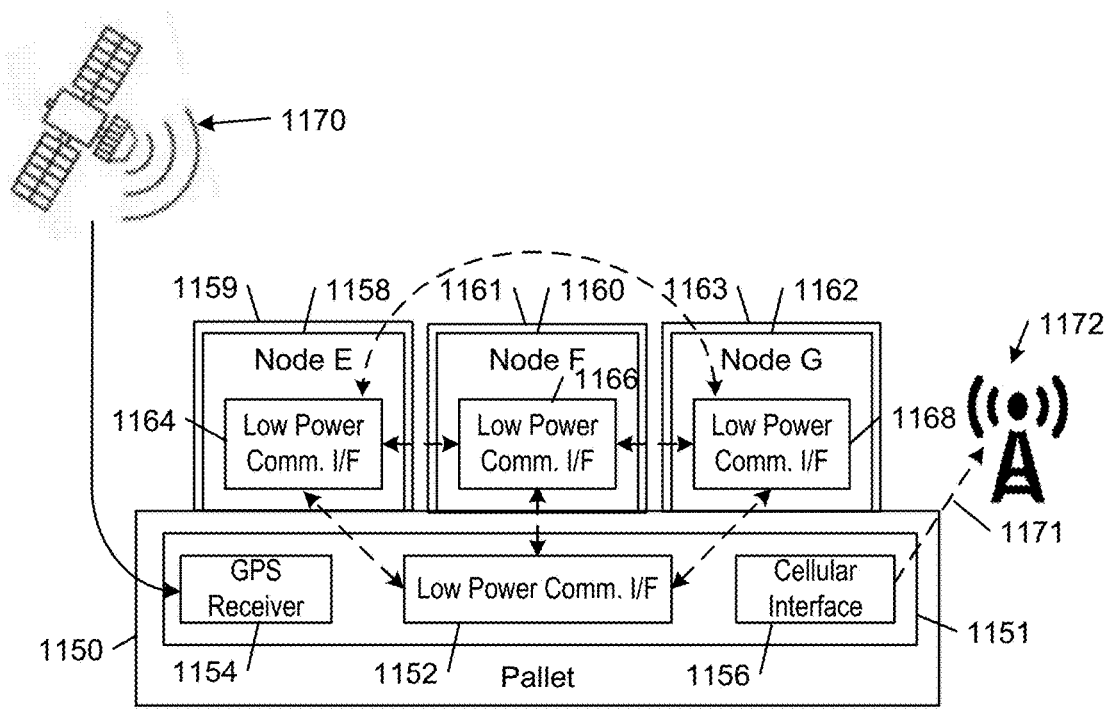
FIG. 11C shows a pallet associated with a master node that includes a low-power communications interface, a GPS receiver, and a cellular communications interface, in embodiments.

Referring to FIG. 11C, a pallet 1150 is associated with a master node 1151 that includes a low-power communications interface 1152, a GPS receiver 1154, and a cellular communications interface 1156. In some embodiments, the master node 1151 may be implemented as a tape node or a label node that is adhered to the pallet 1150. In other embodiments, the master node 1151 may be implemented as a non-tape node that is inserted within the body of the pallet 1150 or embedded in or otherwise attached to the interior or exterior of the pallet 1150.

The pallet 1150 provides a structure for grouping and containing packages 1159, 1161, 1163 each of which is associated with a respective peripheral node 1158, 1160, 1162 (Node E, Node F, and Node G). Each of the peripheral nodes 1158, 1160, 1162 includes a respective low power communications interface 1164, 1166, 1168 (e.g., Bluetooth Low Energy communications interface). In the illustrated embodiment, each of the nodes E, F, G, and the master node 1151 are connected to each of the other nodes over a respective low power communications path (shown by dashed lines).

In some embodiments, the packages 1159, 1161, 1163 are grouped together because they are related. For example, the packages 1159, 1161, 1163 may share the same shipping itinerary or a portion thereof. In an example scenario, the master pallet node 1151 scans for advertising packets that are broadcasted from the peripheral nodes 1158, 1160, 1162. In some examples, the peripheral nodes broadcast advertising packets during respective scheduled broadcast intervals. The master node 1151 can determine the presence of the packages 1159, 1161, 1163 in the vicinity of the pallet 1150 based on receipt of one or more advertising packets from each of the nodes E, F, and G. In some embodiments, in response to receipt of advertising packets broadcasted by the peripheral nodes 1158, 1160, 1162, the master node 1151 transmits respective requests to the server to associate the master node 1151 and the respective peripheral nodes 1158, 1160, 1162. In some examples, the master tape node requests authorization from the server to associate the master tape node and the peripheral tape nodes. If the corresponding packages 1159, 1161, 1163 are intended to be grouped together (e.g., they share the same itinerary or certain segments of the same itinerary), the server authorizes the master node 1151 to associate the peripheral nodes 1158, 1160, 1162 with one another as a grouped set of packages. In some embodiments, the server registers the master node and peripheral tape node identifiers with a group identifier. The server also may associate each node ID with a respective physical label ID that is affixed to the respective package.

In some embodiments, after an initial set of packages is assigned to a multi package group, the master node 1151 may identify another package arrives in the vicinity of the multi-package group. The master node may request authorization from the server to associate the other package with the existing multi-package group. If the server determines that the other package is intended to ship with the multi-package group, the server instructs the master node to merge one or more other packages with currently grouped set of packages. After all packages are grouped together, the server authorizes the multi-package group to ship. In some embodiments, this process may involve releasing the multi-package group from a containment area (e.g., customs holding area) in a shipment facility.

In some embodiments, the peripheral nodes 1158, 1160, 1162 include environmental sensors for obtaining information regarding environmental conditions in the vicinity of the associated packages 1159, 1161, 1163. Examples of such environmental sensors include temperature sensors, humidity sensors, acceleration sensors, vibration sensors, shock sensors, pressure sensors, altitude sensors, light sensors, and orientation sensors.

In the illustrated embodiment, the master node 1151 can determine its own location based on geolocation data transmitted by a satellite-based radio navigation system 1170 (e.g., GPS, GLONASS, and NAVSTAR) and received by the GPS receiver 1154 component of the master node 1151. In an alternative embodiment, the location of the master pallet node 1151 can be determined using cellular based navigation techniques that use mobile communication technologies (e.g., GSM, GPRS, CDMA, etc.) to implement one or more cell-based localization techniques. After the master node 1151 has ascertained its location, the distance of each of the packages 1159, 1161, 1163 from the master node 1151 can be estimated based on the average signal strength of the advertising packets that the master node 1151 receives from the respective peripheral node. The master node 1151 can then transmit its own location and the locations of the package nodes E, F, and G to a server over a cellular interface connection with a cellular network 1172. Other methods of determining the distance of each of the packages 1159, 1161, 1163 from the master node 1151, such as Received Signal-Strength Index (RSSI) based indoor localization techniques, also may be used.

In some embodiments, after determining its own location and the locations of the peripheral nodes, the master node 1151 reports the location data and the collected and optionally processed (e.g., either by the peripheral nodes peripheral nodes 1158, 1160, 1162 or the master node 1151) sensor data to a server over a cellular communication path 1171 on a cellular network 1172.

In some examples, nodes are able to autonomously detect logistics execution errors if packages that are supposed to travel together no longer travel together and raise an alert. For example, a node (e.g., the master node 1151 or one of the peripheral nodes 1158, 1160, 1162) alerts the server when the node determines that a particular package 1159 is being or has already been improperly separated from the group of packages. The node may determine that there has been an improper separation of the particular package 1159 in a variety of ways. For example, the associated peripheral node 1158 that is bound to the particular package 1159 may include an accelerometer that generates a signal in response to movement of the package from the pallet. In accordance with its intelligent agent program code, the associated peripheral node 1158 determines that the master node 1151 has not disassociated the particular package 1159 from the group and therefore broadcasts advertising packets to the master node, which causes the master node 1151 to monitor the average signal strength of the advertising packets and, if the master node 1151 determines that the signal strength is decreasing over time, the master node 1151 will issue an alert either locally (e.g., through a speaker component of the master node 1151) or to the server.

Figure 12:
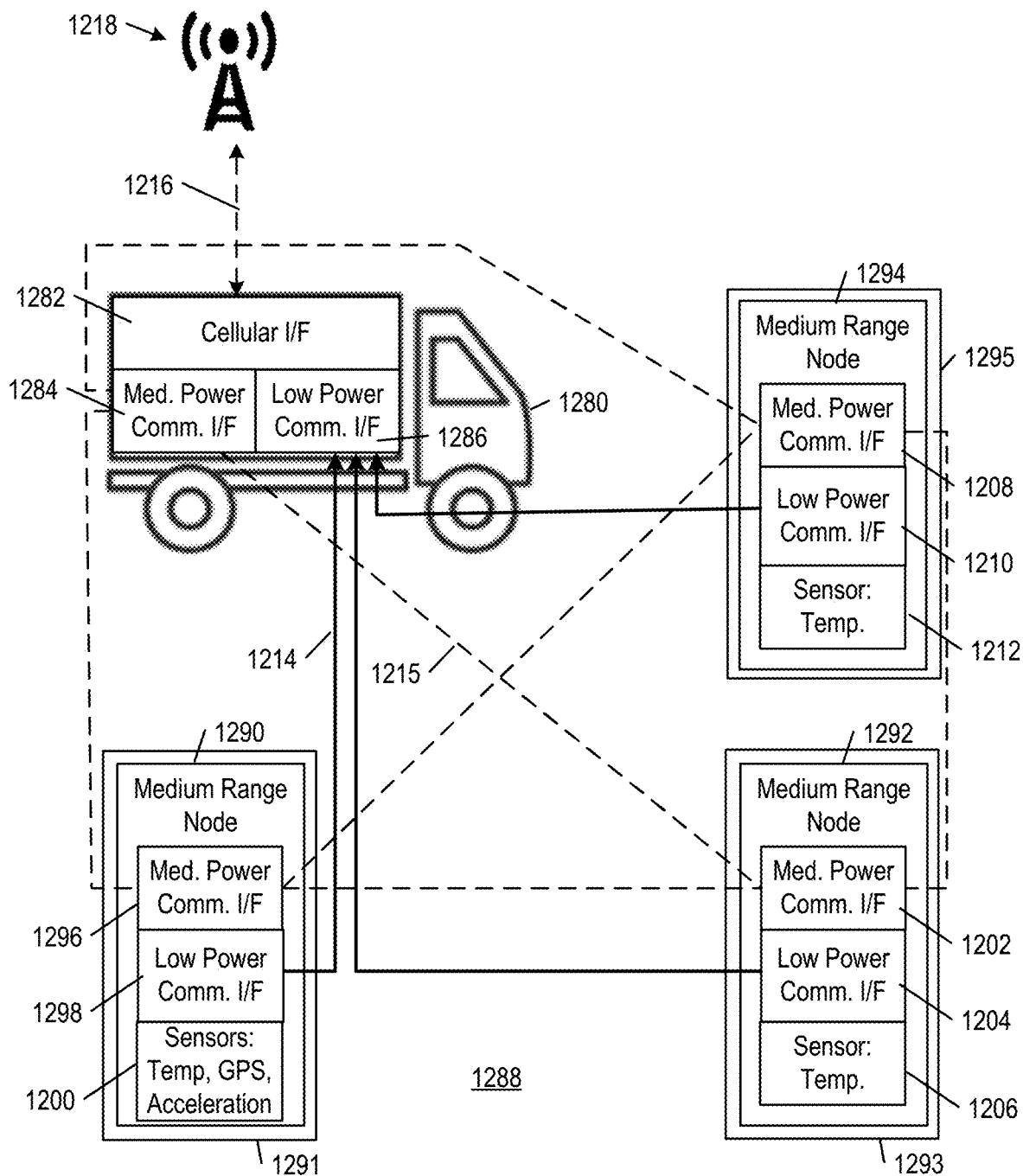
FIG. 12 is a schematic illustrating a truck configured as a mobile node, or mobile hub, with a cellular communications interface, a medium-power communications interface, and a low power communications interface, in embodiments.

FIG. 12 is a schematic illustrating a truck 1280 configured as a mobile node or mobile hub that includes a cellular communications interface 1282, a medium-power communications interface 1284, and a low power communications interface 1286. The communications interfaces 1280-1286 may be implemented on one or more tape and non-tape nodes. In an illustrative scenario, the truck 1280 visits a logistic storage facility, such as a warehouse 1288, to wirelessly obtain temperature data generated by temperature sensors in the medium range nodes 1290, 1292, 1294. The warehouse 1288 contains nodes 1290, 1292, and 1294 that are associated with respective logistic containers 1291, 1293, 1295. In the illustrated embodiment, each node 1290-1294 is a medium range node that includes a respective medium power communications interface 1296, 1202, 1208, a respective low power communications interface 1298, 1204, 1210 and one or more respective sensors 1200, 1206, 1212. In the illustrated embodiment, each of the package nodes 1290, 1292, 1294 and the truck 1280 is connected to each of the other ones of the package nodes through a respective medium power communications path (shown by dashed lines). In some embodiments, the medium power communications paths are LoRa formatted communication paths.

In some embodiments, the communications interfaces 1284 and 1286 (e.g., a LoRa communications interface and a Bluetooth Low Energy communications interface) on the node on the truck 1280 is programmed to broadcast advertisement packets to establish connections with other network nodes within range of the truck node. A warehouse 1288 includes medium range nodes 1290, 1292, 1294 that are associated with respective logistic containers 1291, 1293, 1295 (e.g., packages, boxes, pallets, and the like). When the truck node's low power interface 1286 is within range of any of the medium range nodes 1290, 1292, 1294 and one or more of the medium range nodes is operating in a listening mode, the medium range node will extract the address of truck node and potentially other information (e.g., security information) from the advertising packet. If, according to its programmatic code, the truck node determines that it is authorized to connect to one of the medium range nodes 1290, 1292, 1294, the truck node will attempt to pair with the medium range node. In this process, the truck node and the medium range node determine each other's identities, capabilities, and services. For example, after successfully establishing a communication path with the truck node (e.g., a Bluetooth Low Energy formatted communication path 1214 or a LoRa formatted communication path 1217), the truck node determines the identity information for the medium range node 1290 (e.g., a peripheral node), the medium range node's capabilities include retrieving temperature data, and the medium range node's services include transmitting temperature data to other nodes. Depending on the size of the warehouse 1288, the truck 1280 initially may communicate with the nodes 1290, 1292, 1294 using a low power communications interface (e.g., Bluetooth Low Energy interface). If any of the anticipated nodes fails to respond to repeated broadcasts of advertising packets by the truck 1280, the truck 1280 will try to communicate with the non-responsive nodes using a medium power communications interface (e.g., LoRa interface). In response to a request from the medium-power communication interface 1284, the medium range node 1290 transmits an indication of its measured temperature data to the truck node. The truck node repeats the process for each of the other medium range nodes 1292, 1294 that generate temperature measurement data in the warehouse 1288. The truck node reports the collected (and optionally processed, either by the medium range nodes 1290, 1292, 1294 or the truck node) temperature data to a server over a cellular communication path 1216 with a cellular network 1218.

Figure 13:
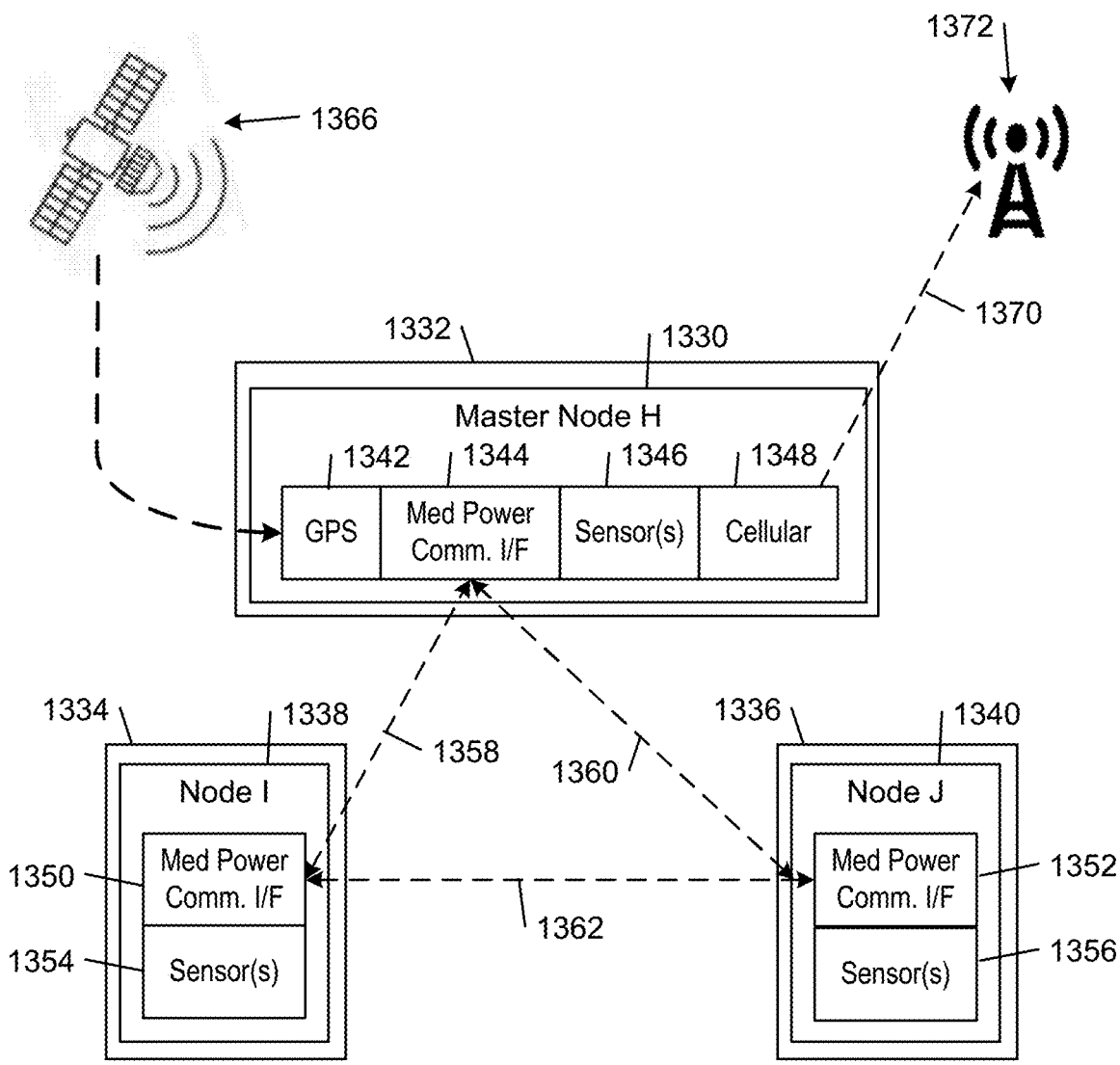
FIG. 13 is a schematic illustrating a master node associated with a logistic item that is grouped together with other logistic items associated with peripheral nodes, in embodiments.

FIG. 13 is a schematic illustrating a master node 1330 is associated with a logistic item 1332 (e.g., a package) and grouped together with other logistic items 1334, 1336 (e.g., packages) that are associated with respective peripheral nodes 1338, 1340. The master node 1330 includes a GPS receiver 1342, a medium power communications interface 1344, one or more sensors 1346, and a cellular communications interface 1348. Each of the peripheral nodes 1338, 1340 includes a respective medium power communications interface 1350, 1352 and one or more respective sensors 1354, 1356. In the illustrated embodiment, the peripheral and master nodes are connected to one another other over respective pairwise communications paths (shown by dashed lines). In some embodiments, the nodes 1330, 1338, 1340 communicate through respective LoRa communications interfaces over LoRa formatted communications paths 1358, 1360, 1362.

In the illustrated embodiment, the master and peripheral nodes 1330, 1338, 1340 include environmental sensors for obtaining information regarding environmental conditions in the vicinity of the associated logistic items 1332, 1334, 1336. Examples of such environmental sensors include temperature sensors, humidity sensors, acceleration sensors, vibration sensors, shock sensors, pressure sensors, altitude sensors, light sensors, and orientation sensors.

In accordance with the programmatic code stored in its memory, the master node 1330 periodically broadcasts advertising packets in the surrounding area. When the peripheral nodes 1338, 1340 are within range of master node 1330, and are operating in a listening mode, the peripheral nodes 1338, 1340 will extract the address of master node 1330 and potentially other information (e.g., security information) from the advertising packets. If, according to their respective programmatic code, the peripheral nodes 1338, 1340 determine that they are authorized to connect to the master node 1330, the peripheral nodes 1338, 1340 will attempt to pair with the master node 1330. In this process, the peripheral nodes 1338, 1340 and the master node 1330 determine each other's identities, capabilities, and services. For example, after successfully establishing a respective communication path 1358, 1360 with each of the peripheral nodes 1338, 1340 (e.g., a LoRa formatted communication path), the master node 1330 determines certain information about the peripheral nodes 1338, 1340, such as their identity information (e.g., peripheral nodes), their capabilities (e.g., measuring temperature data), and their services include transmitting temperature data to other nodes.

After establishing LoRa formatted communications paths 1358, 1360 with the peripheral nodes 1338, 1340, the master node 1330 transmits requests for the peripheral nodes 1338, 1340 to transmit their measured and/or locally processed temperature data to the master node 1330.

In the illustrated embodiment, the master node 1330 can determine its own location based on geolocation data transmitted by a satellite-based radio navigation system 1366 (e.g., GPS, GLONASS, and NAVSTAR) and received by the GPS receiver 1342 component of the master node 1330. In an alternative embodiment, the location of the master node 1330 can be determined using cellular based navigation techniques that use mobile communication technologies (e.g., GSM, GPRS, CDMA, etc.) to implement one or more cell-based localization techniques. After the master node 1330 has ascertained its location, the distance of each of the logistic items 1334, 1336 from the master node 1330 can be estimated based on the average signal strength of the advertising packets that the master node 1330 receives from the respective peripheral node. The master node 1330 can then transmit its own location and the locations of the package nodes H, J, and I to a server over a cellular interface connection with a cellular network 1372. Other methods of determining the distance of each of the logistic items 1334, 1336 from the master node 1330, such as Received Signal-Strength Index (RSSI) based indoor localization techniques, also may be used.

In some embodiments, after determining its own location and the locations of the peripheral nodes, the master node 1330 reports the location data, the collected and optionally processed (e.g., either by the peripheral nodes peripheral nodes 1338, 1340 or the master node 1330) sensor data to a server over a cellular communication path 1370 on a cellular network 1372.

Multi-Communication-Interface System for Fine Locationing

U.S. patent application Ser. No. 16/839,048, incorporated herein by reference in its entirety, and FIGS. 1A-1C of U.S. patent application Ser. No. 17/067,608, incorporated herein by reference in its entirety, teach how an RFID tag may be combined with a tape node and correlated together. FIGS. 17A and 17B of patent application Ser. No. 17/873,072, teach how a wireless transducing circuit of a tape node may also include an RFID reader.

As used herein, activating means either powering-on, such as applying power to or switching on, or transitioning from a sleep or low-power inactive state to an active or operational state; and deactivating means either powering-off, such as removing power to or switching off, or transitioning from an active or operational state to a sleep or low-power inactive state.

Figure 14:
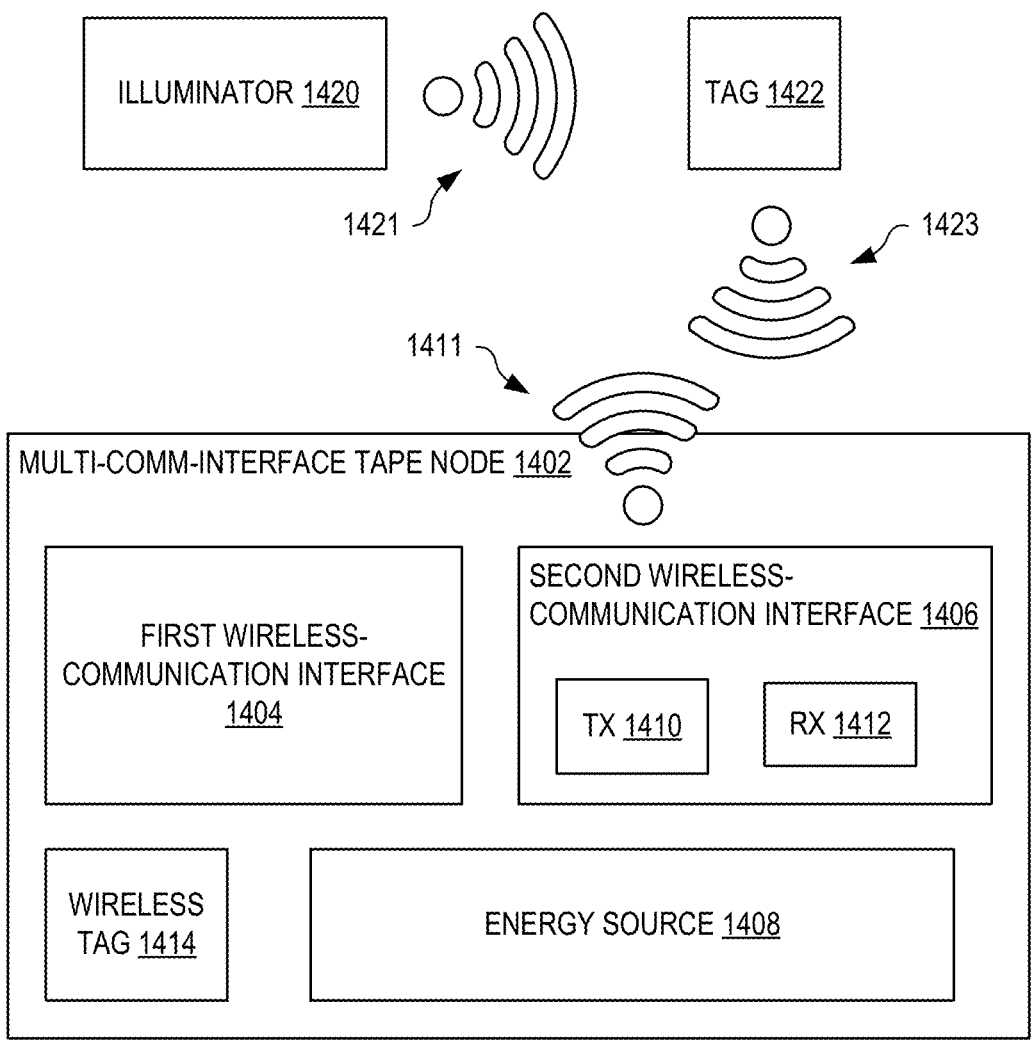
FIG. 14 is a schematic illustrating one example multi-communication-interface tape node that includes both a first wireless-communication interface and a second wireless-communication interface, in embodiments.

FIG. 14 is a schematic illustrating one example multi-communication-interface tape node 1402 that includes both a first wireless-communication interface 1404 (e.g., low power communication interface 652, FIG. 6A) and a second wireless-communication interface 1406 (e.g., RFID reader 1710 in FIGS. 17A and 17B of patent application Ser. No. 17/873,072). The first wireless-communication interface 1404 may operate according to a first communication protocol and the second wireless-communication interface may operate according to a second communication protocol that consumes more power than the first communication protocol. The discussion herein may refer to a specific embodiment where second wireless-communication interface 1406 is an "RFID reader" (e.g., "RFID reader 1406"). However, should be appreciated that, while in one embodiment, the second wireless-communication interface 1406 implements the second communication protocol as RFID-based, it is not limited to such.

Multi-communication-interface tape node 1402 is powered from an internal energy source 1408 (e.g., a one-time use battery, a rechargeable battery, etc.). First wireless-communication interface 1404 may implement one or more of a Bluetooth protocol, a cellular protocol, a Wi-Fi protocol, a Long Range (LoRa) protocol, a LoRaWAN protocol, a satellite communication protocol, a Zigbee protocol, an NFC protocol, an RF protocol, or some other wireless communications protocol. First wireless-communication interface 1404 consumes less power than second wireless-communication interface 1406, and its receiver may operate continuously without overly draining energy source 1408. However, second wireless-communication interface 1406 requires more power to operate than first wireless-communication interface 1404, and therefore cannot operate continuously without draining energy source 1408 too quickly for long-term lifespan of the multi-communication-interface tape node 1402.

In certain embodiments, second wireless-communication interface 1406 includes both a transmitter 1410 for transmitting an interrogation signal 1411 and a receiver 1412 for receiving tag response signals 1423. In any embodiment discussed herein, the transmitter 1410 may be an RFID transmitter 1410, the interrogation signal 1411 may be an RFID interrogation signal 1411, and the receiver may be an RFID receiver 1412, and the tag response signals 1423 may be RFID tag response signals 1423). In certain embodiments, transmitter 1410 is omitted from second wireless-communication interface 1406, whereby receiver 1412 receives wireless tag response signals caused by an illuminator signal 1421 of an external illuminator 1420. In any embodiment discussed herein, illuminator 1420 may be an RFID illuminator, and the illuminator signal 1421 may be an RFID illuminator signal. Accordingly, multi-communication-interface tape node 1402 may detect and interrogate nearby ID tags (e.g., RFID tags). In certain embodiments, multi-communication-interface tape node 1402 includes a circuit that activates second wireless-communication interface 1406 and/or receiver 1412 when a signal (e.g., interrogation signal 1421) is detected, and deactivates second wireless-communication interface 1406 and/or receiver 1412 when no interrogation signal is detected.

In other embodiments, where illuminator 1420 operates substantially continuously (or frequently) to detect wireless tags, multi-communication-interface tape node 1402 may deactivate first wireless-communication interface 1404 until receiver 1412 of second wireless-communication interface 1406 detects a wireless tag response signal 1423. For example, detecting, using receiver 1412, a response signal from an RFID tag that is interrogated by interrogation signal 1421 from illuminator 1420 causes multi-communication-interface tape node 1402 to activate first wireless-communication interface 1404 to enable Bluetooth communications.

Antennae and corresponding coverage area of second wireless-communication interface 1406 may be configured to have a more directional and/or smaller coverage area as compared to conventional wireless readers (e.g., off the shelf RFID readers). In certain embodiments, the coverage area of second wireless-communication interface 1406 is dynamically configurable by a user (e.g., an installer) using an interactive interface (e.g., using a mobile gateway. For example, based on the location of multi-communication-interface tape node 1402, a user may set the coverage area of second wireless-communication interface 1406/receiver 1412. Accordingly, second wireless-communication interface 1406 may provide fine locationing (e.g., more accuracy of location) of detected tags, as compared to conventional wireless readers. For example, second wireless-communication interface 1406 may have a granularity of one foot and may thereby be used to create or design any specific coverage area (e.g., a cone of operation) as needed within a specific environment.

Where an asset includes both a tape node and a wireless tag (e.g., a tape node with RFID inlay as taught by patent application Ser. No. 17/067,608, or a separate RFID tag), multi-communication-interface tape node 1402 may first detect the tape node (e.g., using Bluetooth/BLE) using the first wireless-communication interface, and then activate its second wireless-communication interface 1406 to read the wireless tag (e.g., activate the wireless-communication interface RFID reader 1406 to read an RFID tag). Accordingly, second wireless-communication interface 1406 is activated only as needed to conserver battery power of multi-communication-interface tape node 1402.

In certain embodiments, multi-communication-interface tape node 1402 may also include a wireless tag 1414, which may be an RFID-based tag.

Figure 15:
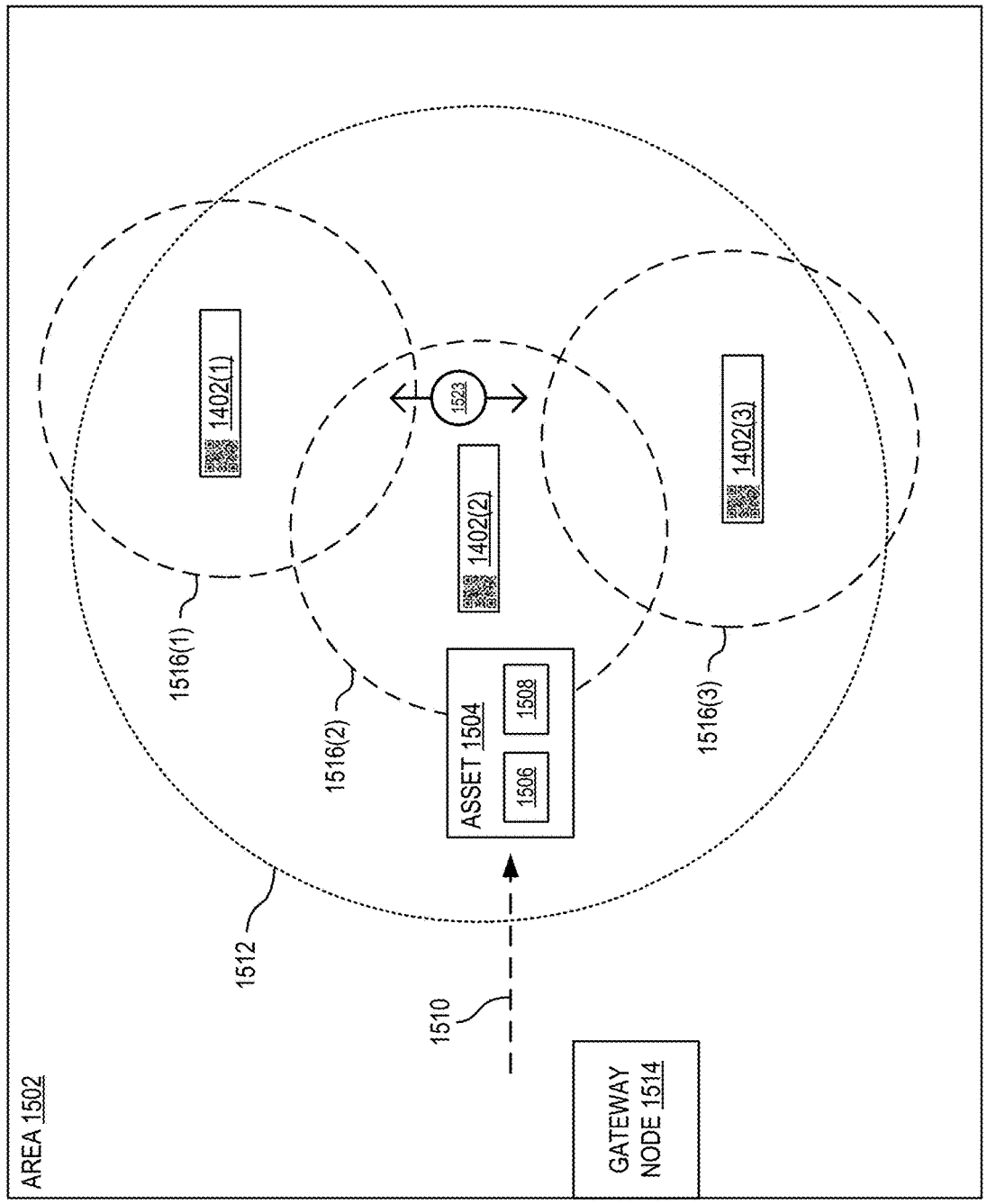
FIG. 15 is a schematic diagram illustrating operation of one example multi-communication-interface system for fine locationing, in embodiments.

FIG. 15 is a schematic diagram illustrating operation of one example multi-communication-interface system 1500 for fine locationing. System 1500 includes three multi-communication-interface tape nodes 1402(1)-(3) of FIG. 14 (which are RFID tape nodes in at least one embodiment), deployed at different locations within an area 1502 (e.g., a storage facility, a vehicle, a warehouse, etc.). More or fewer multi-communication-interface tape nodes 1402 may be deployed without departing from the scope hereof. During installation of multi-communication-interface tape nodes 1402, their locations are registered in a database (e.g., database 808 of servers 804 of FIG. 8). For example, a mobile gateway (e.g., mobile gateway 810, such as a smartphone or tablet) allows a user to register a location of each multi-communication-interface tape node 1402 when installed and initialized, where the mobile gateway retrieves a unique identifier of the tape node by reading a bar code on the tape node or by communicating directly with the tape node. The user may indicate the location by dropping a pin on a map/floor plan of the area, for example, or a current location determined by the mobile gateway during the installation of the tape node may be used.

In one example, the database (e.g., database 808 in the cloud) stores a facility map/layout that is accessible by the mobile gateway device (e.g., mobile gateway 810). Accordingly, during installation of each multi-communication-interface tape node 1402 and gateway node 1514, the mobile gateway defines the location of each device on the map. Each multi-communication-interface tape node 1402 and gateway node 1514 may also store at least part of the database and/or map and therefore learns of the location of other devices. However, multi-communication-interface tape node 1402 and gateway node 1514 may only use distance and bearing information between devices. In certain embodiments, the server (e.g., server 804) and/or gateway nodes (e.g., the mobile gateway and/or gateway node 1514) may perform fine locationing calculations based on the database information.

The database (e.g., in the cloud) stores the location in association with the unique identifier. Each multi-communication-interface tape node 1402 may also store its own location as determined at its installation and provided by the mobile gateway. The recorded location may be one or more of geographic coordinates, a room number, a vehicle number, etc., which may be provided to other wireless nodes. In certain embodiments, a local gateway node (e.g., gateway node 1514) may also store location information of nearby tape nodes. Since multi-communication-interface tape nodes 1402 relay information (e.g., RFID tag identifiers) to remote servers via the gateway node, the gateway node may use the locations of each multi-communication-interface tape node 1402 to perform the fine locationing. The gateway node may then provide the location to the database and/or to the asset tape directly. Alternatively, the gateway node may relay the information to the server, whereby an application (e.g., applications 806) running on the server may process the information together with multi-communication-interface tape nodes 1402 identifiers to perform fine locationing. Multi-communication-interface tape nodes 1402 form a mesh network, as described above (see network communications environment 800, FIG. 8), and may each communicate using first wireless-communication interface 1404. First wireless-communication interface 1404 within each multi-communication-interface tape node 1402 is active, and since it is relatively low power as compared to second wireless-communication interface 1406, drain on energy source 1408 is relatively low. However, since a power requirement of second wireless-communication interface 1406 is not insignificant, second wireless-communication interface 1406 within each multi-communication-interface tape node 1402 is deactivated when not needed to reduce power drain on energy source 1408.

An asset 1504 has an associated tape node 1506 (e.g., segment 640, FIG. 6A) and an associated wireless tag 1508 (e.g., RFID tag). In certain embodiments, as wireless tag 1508 may be incorporated (e.g., embedded) with tape node 1506 (such as discussed in patent application Ser. No. 17/067,608). In the scenario illustrated by FIG. 15, as asset 1504 enters, indicated by arrow 1510, area 1502, its tape node 1506 enters a reception area 1512 of wireless-communication interface 1404 of multi-communication-interface tape node 1402(2), which detects, using first wireless-communication interface 1404, a wireless signal (e.g., Bluetooth, BLE, etc.) from tape node 1506. Detection of this wireless signal is associated with an event of asset 1504 entering area 1502, and therefore detecting the wireless signal is a triggering event. In this example, the event (e.g., detection of the wireless signal from tape node 1506) indicates that asset 1504 is within area 1502. However, given that reception area 1512 of wireless-communication interface 1404 is large, relative to area 1502, use of wireless-communication interface 1404 to detect the wireless signal from tape node 1506 may not provide fine locationing within area 1502.

In response to the triggering event, multi-communication-interface tape node 1402(2) may (a) activate its second wireless-communication interface 1406 (which may be RFID-based), and/or (b) send a trigger event message 1523 (e.g., a broadcast using its first wireless-communication interface 1404) to other multi-communication-interface tape nodes 1402(1) and 1402(3) within area 1502, indicating the triggering event (e.g., the detected wireless signal). On receiving trigger event message 1523, each other multi-communication-interface tape node 1402(1) and (3) may activate its own second wireless-communication interface 1406 (which may be RFID-based, or otherwise higher-power consumption than the first wireless-communication interface 1404).

Advantageously, since second wireless-communication interface 1406 of each multi-communication-interface tape node 1402 is activated in response to the triggering event (wireless signal from the tape node), wireless tags on asset 1504 are not missed due to inactivation of the second wireless-communication interface. Further, activation of second wireless-communication interface 1406 of each multi-communication-interface tape node 1402 occurs only when needed, and therefore the second wireless-communication interface is not activated to detect changes in wireless tag inventory, but in response to an event (e.g., arrival of asset 1504 in area 1502) that may indicate change in wireless tag inventory within area 1502.

Each second wireless-communication interface 1406(1)-(3) detects wireless tags (e.g., wireless tag 1508) within its second wireless-communication interface receive area 1516(1)-(3) (shown as circles in this example), respectively, which is smaller than reception area 1512 of first wireless-communication interface 1404. Advantageously, when wireless tag 1508 is detected by multi-communication-interface tape node 1402, its location is associated with second wireless-communication interface receive area 1516, thereby providing fine locationing within area 1502.

After operating for a certain period, or after detecting no change in wireless tag inventory for a certain period, each multi-communication-interface tape node 1402 deactivates its second wireless-communication interface 1406, until a next triggering event occurs.

In certain embodiments, a gateway node 1514 (e.g., one of mobile gateway 810 and stationary gateway 814 of FIG. 8) is positioned near an entrance of area 1502 to detect the wireless signal from tape node 1506 of asset 1504 as it enters area 1502. In response to detecting the presence of tape node 1506, gateway node 1514 may send trigger event message 1523 to multi-communication-interface tape nodes 1402(1)-(3) within area 1502. Each multi-communication-interface tape node 1402 may report change in its detected wireless tag inventory to gateway node 1514, and thereby to other components of its network communication environment (e.g., network communications environment 800, FIG. 8).

In a first example, fine locationing of asset 1504 within area 1502 is determined by multi-communication-interface tape node 1402(1) based on signals detected by one or both of first wireless-communication interface 1404 and second wireless-communication interface 1406. In a second example, fine locationing of asset 1504 within area 1502 is determined by gateway node 1514 based on communicated data (e.g., signal strength (RSSI)) from one or more multi-communication-interface tape nodes 1402. In a third example, fine locationing of asset 1504 within area 1502 is determined by tape node 1506 of asset 1504 based on RSSI data relayed to tape node 1506 from at least one of multi-communication-interface tape nodes 1402 via first wireless-communication interface 1404. In a fourth example, fine locationing of asset 1504 within area 1502 is determined by multi-communication-interface tape nodes 1402 sharing, via first wireless-communication interface 1404, RSSI data from each second wireless-communication interface 1406 of multi-communication-interface tape nodes 1402. The versatility of fine location described herein is based on a liquid computing hierarchy of multi-communication-interface tape nodes 1402 and gateway node 1514 that is implemented via first wireless-communication interfaces 1404.

Figure 16:
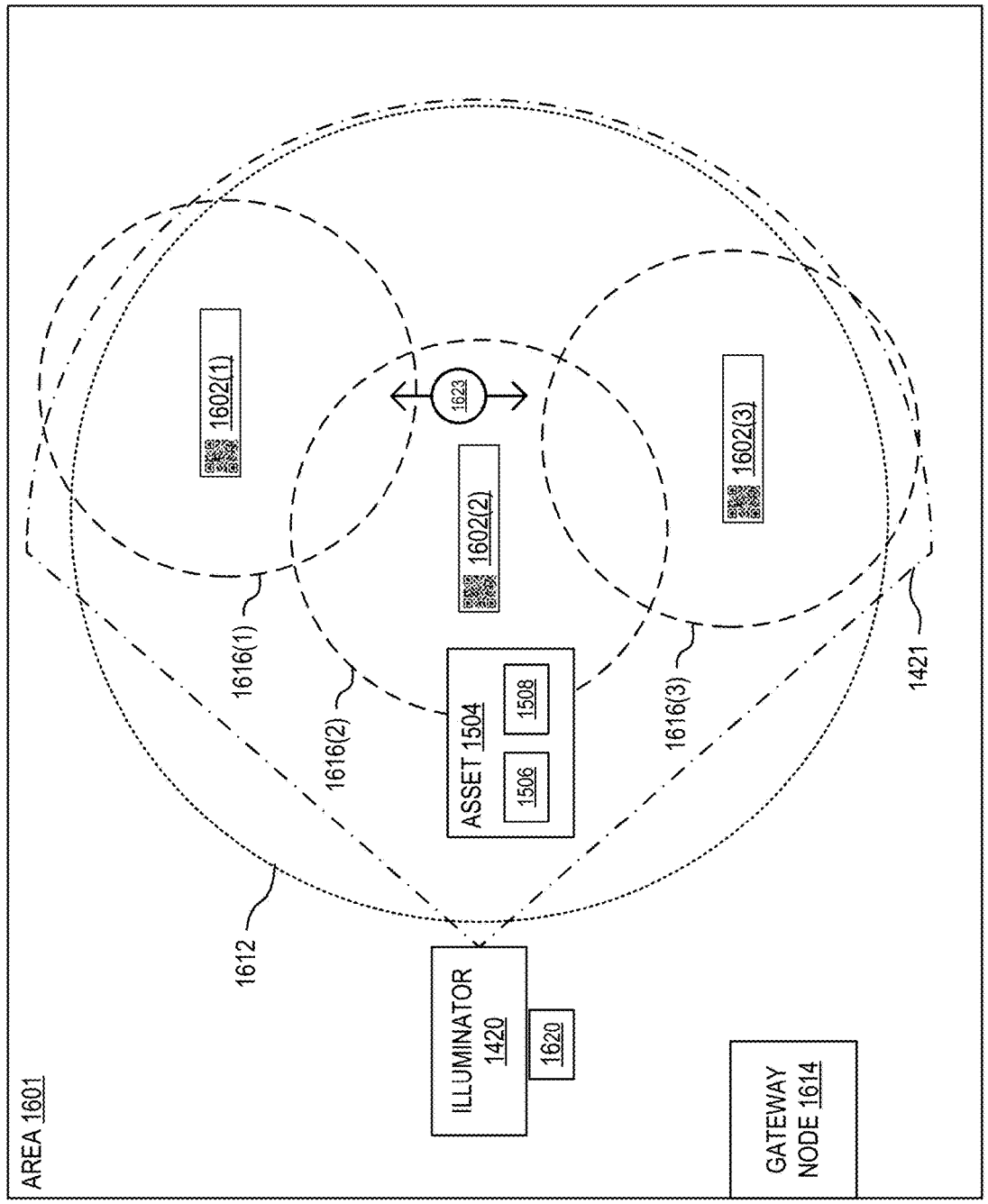
FIG. 16 is a schematic diagram illustrating operation of one example multi-communication-interface system for fine locationing, in embodiments.

FIG. 16 is a schematic diagram illustrating operation of one example multi-communication-interface system 1600 for fine locationing. System 1600 includes three multi-communication-interface tape nodes 1602(1)-(3) (similar to multi-communication-interface tape nodes 1402 of FIG. 14 but with transmitter 1410 of second wireless-communication interface 1406 omitted), deployed at different locations within an area 1601 (e.g., a storage facility, a vehicle, a warehouse, etc.), and a wireless illuminator 1420 that transmits an wireless interrogation signal (e.g., RFID illuminator signal 1421) to activate any wireless tag within at least part of area 1601. More or fewer multi-communication-interface tape nodes 1602 may be deployed without departing from the scope hereof. Area 1601 may also include a gateway node 1614 that is similar to gateway node 1514 of FIG. 15. Multi-communication-interface tape nodes 1602 form a mesh network, as described above, and may each communicate using at least first wireless-communication interface 1404. First wireless-communication interface 1404 within each multi-communication-interface tape node 1602 is active, and since it is relatively low power, drain on energy source 1408 is relatively low. Although power requirements of second wireless-communication interface 1406 without transmitter 1410 is less than power required by second wireless-communication interface 1406 using transmitter 1410, it is still not insignificant, and second wireless-communication interface 1406 within each multi-communication-interface tape node 1602 is deactivated to reduce power drain on energy source 1408.

An asset 1504, with associated tape node 1506 and wireless tag 1508, enters area 1601, its tape node 1506 enters a reception area 1612 of wireless-communication interface 1404 of multi-communication-interface tape node 1602(2), which detects a wireless signal from tape node 1506 as a triggering event. In response to the triggering event, multi-communication-interface tape node 1602(2) may (a) activate its receiver 1412, and/or (b) send a trigger event message 1623 (e.g., a broadcast using its wireless-communication interface 1404) to other multi-communication-interface tape nodes 1602(1) and 1602(3) within area 1601, indicating the triggering event. On receiving trigger event message 1623, each other multi-communication-interface tape node 1602(1) and (3) may activate its own RFID receiver 1412.

In certain embodiments, illuminator 1420 is hard wired to a power source and operates continuously to transmit an RFID interrogation signal, thereby causing any RFID tag (e.g., wireless tag 1508) within area 1601 to respond with an RFID response signal that, when in range, may be detected by receivers 1412 of multi-communication-interface tape nodes 1602(1)-(3), where the second wireless-communication interface 1406 of multi-communication-interface tape nodes 1602(1)-(3) are RFID-based. In other embodiments, illuminator 1420 is not active continuously and includes, or is controlled by, a tape node 1620 that also receives (directly or indirectly) trigger event message 1623 and activates illuminator 1420 to transmit the RFID interrogation signal. In other embodiments, tape node 1620 may be implemented as a Bluetooth operated power switch that is controlled from a different tape node (e.g., multi-communication-interface tape node 1602(2), or gateway node 1614). As discussed above, wireless protocols other than RFID may be implemented by illuminator 1420, resulting in said interrogation signal and response signal being based on said other wireless communication protocol. In certain embodiments, illuminator 1420 turns off when no asset tape nodes (e.g., tape node 1506) are detected within area 1601 (e.g., within coverage area 1612) of multi-communication-interface tape nodes 1602), since fine locationing of tape nodes within area 1601 is not needed when no assets are present. For example, illuminator 1420 is activated when asset 1504 enters area 1601 and is deactivated when asset 1504 is detected leaving area 1601. In certain embodiments, illuminator 1420 is deactivated upon receiving a report that the fine location of asset 1504 has been determined and that asset 1504 has not moved for at least a predetermined period. In this case, illuminator 1420 may be reactivated when movement of asset 1504 is detected (either by a sensor on asset 1504, a sensor in area 1601 like a light/IR sensor or time of flight sensor, or by detection through Bluetooth/RSSI locationing). In certain embodiments, illuminator 1420 is activated based on a request to find an asset (for example a missing asset) and is deactivated upon receiving a report/confirmation that the asset is located. In certain embodiments, illuminator 1420 is deactivated after a predefined timeout period. If the fine locationing was unsuccessful, a subsequent request to activate illuminator 1420 is resubmitted to the illuminator. In certain embodiments, multi-communication-interface tape nodes 1602 provide confirmation that the wireless tag response signal from wireless tag 1508 was successful received to illuminator 1420 (e.g., tape node 1620), especially where tape node 1620 is operating as a gateway node for the network communications environment 800 and/or tape node 1620 is to deactivate illuminator 1420 after wireless tag 1508 is successfully read.

Advantageously, since receiver 1410 of each multi-communication-interface tape node 1602 is activated in response to the triggering event (wireless signal from the tape node), wireless tags are not missed due to inactivation of second wireless-communication interface 1406. Further, activation of receiver 1410 of each multi-communication-interface tape node 1602 occurs only when needed, and therefore each second wireless-communication interface 1406 is not activated to detect changes in wireless tag inventory but are activated in response to an event (e.g., arrival of asset 1504 in area 1601) that may indicate change in wireless tag inventory within area 1601 could potentially occur.

Accordingly, in response to trigger event message 1623, each second wireless-communication interface 1406(1)-(3)

detects wireless tags (e.g., wireless tag 1508) within its coverage area 1616(1)-(3), respectively, which is smaller than reception area 1612 of first wireless-communication interface 1404. Advantageously, when wireless tag 1508 is detected by multi-communication-interface tape node 1602(1), its location is associated with the corresponding coverage area 1616, thereby providing fine locationing within area 1601.

After operating for a certain period, or after detecting no change in wireless tag inventory for a certain period, each multi-communication-interface tape node 1602 deactivates its second wireless-communication interface 1406, until a next triggering event occurs. Similarly, after a certain period, tape node 1620 may cause illuminator 1420 to deactivate.

In this embodiment, since multi-communication-interface tape nodes 1602 are not required to transmit an interrogation signal using second wireless-communication interface 1406, power usage of multi-communication-interface tape node 1602 is further reduced as compared to multi-communication-interface tape node 1402 of FIG. 15.

In certain embodiments, illuminator 1420/tape node 1620 may synchronize data with multi-communication-interface tape nodes 1602 and/or gateway node 1614 via first wireless-communication interfaces 1404 (e.g., Bluetooth protocol), where the synchronization data includes parameters for controlling second wireless-communication interface 1406 (e.g., RFID protocol) of multi-communication-interface tape nodes 1602. Illuminator 1420 may share the synchronization data with multi-communication-interface tape nodes 1602(1)-(3) and gateway node 1614 using first wireless-communication interface 1404 (e.g., Bluetooth), thereby enabling multi-communication-interface tape nodes 1602(1)-(3) and gateway node 1614 to receive and decode wireless response signal from wireless tag 1508. For example and without limitation, the synchronization data may include one or more of decryption keys, data for communication timing, frequency/wavelength parameters, credentials for authentication, authentication method, and any other parameter used by second wireless-communication interface 1406 for successful wireless communication. In one example of an embodiment where second wireless-communication interface 1406 implements the RFID protocol, illuminator 1420 may send a synchronization message defining a bit sequence used in illuminator signal 1421 with multi-communication-interface tape nodes 1602(1)-(3) and gateway node 1614. In another example of an embodiment where second wireless-communication interface 1406 implements the RFID protocol, each multi-communication-interface tape nodes 1602(1)-(3) and gateway node 1614 may send a bit sequence of received wireless tag response signal 1423 (e.g., a backscatter signal) to illuminator 1420 (and/or to other tape nodes) for decoding. Accordingly, one or more of illuminator 1420, multi-communication-interface tape nodes 1602(1)-(3), and gateway node 1614 may decode the wireless tag response signal 1423 from wireless tag 1508 to determine its unique wireless tag identifier.

Although coverage area 1612 of first wireless-communication interface 1404 is shown larger than coverage areas 1616 of receivers 1412, each coverage area 1612 and 1616 is dynamically configurable. As described above, coverage area 1616 of second wireless-communication interface 1406 and/or receiver 1412 is dynamically configurable by a user (e.g., an installer) using an interactive interface (e.g., using a mobile gateway. For example, based on the location of multi-communication-interface tape node 1402, a user may set the coverage area of second wireless-communication interface 1406/receiver 1412 to a physical area of an environment. Accordingly, second wireless-communication interface 1406 may provide fine locationing (e.g., more accuracy of location) of detected tags, as compared to conventional wireless readers. For example, second wireless-communication interface 1406 may have a granularity of one foot and may thereby be used to create or design any specific coverage area (e.g., a cone of operation) as needed within a specific environment.

Figure 17:
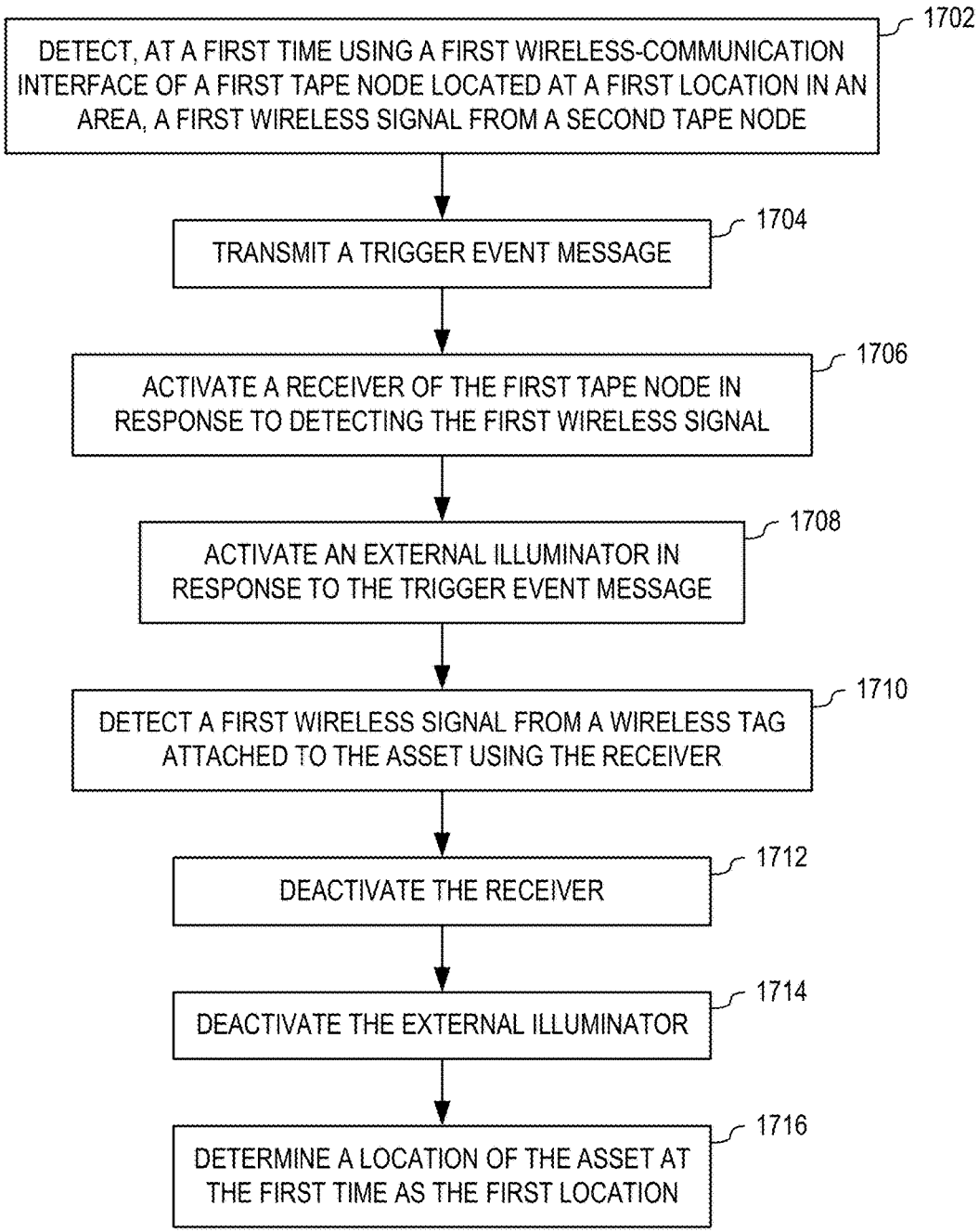
FIG. 17 is a flowchart illustrating one example method for fine locationing using a multi-communication-interface system, in embodiments.

FIG. 17 is a flowchart illustrating one example method 1700 for fine locationing using a multi-communication interface system. In certain embodiments, blocks 1702, 1704, 1706, 1710, 1712, and 1716 of method 1700 are implemented in multi-communication-interface tape node 1402 of FIG. 14 and/or multi-communication-interface tape node 1602 of FIG. 16, and blocks 1708 and 1714 are implemented by illuminator 1420 and/or tape node 1620 of FIG. 16.

In block 1702, method 1700 detects, at a first time using a first wireless-communication interface of a first tape node located at a first location in an area, a first wireless signal from a second tape node attached to an asset. In one example of block 1702, wireless-communication interface 1404 of multi-communication-interface tape node 1402(2) detects a Bluetooth wireless signal from tape node 1506 attached to asset 1504 as it enters area 1502. Wireless signals other than Bluetooth may be detected by first wireless-communication interface 1404 without departing from the scope hereof. Block 1704 may be optional. In block 1704, if included, method 1700 transmits a trigger event message. In one example of block 1704, multi-communication-interface tape node 1402(2) transmits trigger event message 1523 using its first wireless communication interface 1404 in response to detection of the wireless signal from tape node 1506 to one or more of gateway node 1514 and/or other tape nodes 1402.

In block 1706, method 1700 activates a receiver of the first tape node in response to detecting the first wireless signal. In one example of block 1706, in embodiments where multi-communication-interface tape node 1402(2) includes transmitter 1410, multi-communication-interface tape node 1402(2) activates both its transmitter 1410 and receiver 1412 of second wireless-communication interface 1406 in response to its first wireless-communication interface 1404 detecting the Bluetooth wireless signal from tape node 1506. The transmitter 1410 and receiver 1412 may be based on RFID protocol, or otherwise a wireless-communication interface requiring more power consumption than the first wireless-communication interface 1404. In another example of block 1706, in embodiments where transmitter 1410 is omitted (or not used) in multi-communication-interface tape node 1402(2), multi-communication-interface tape node 1402(2) activates its receiver 1412 in response to its first wireless-communication interface 1404 detecting the wireless signal (which may be Bluetooth-based) from tape node 1506. Block 1708 is included in embodiments where illuminator 1420 is activated to generate an interrogational signal (which may be RFID-based in at least one embodiment). In block 1708, if included, method 1700 activates an external illuminator in response to the trigger event message. In one example of block 1708, tape node 1620 receives trigger event message 1623 and activates illuminator 1420 associated therewith. In certain embodiments, where illuminator 1420 has a less limited and/or sustainable power source (e.g., line powered, large battery capacity, and/or uses energy harvesting such as solar power, wireless, etc.), illuminator 1420 may operate continuously, periodically, on a schedule (e.g., with time multiplexing) for finite periods, or operate without needing to be activated and deactivated by trigger event message 1623.

In block 1710, method 1700 detects a first signal from a wireless tag attached to the asset using the receiver. In one example of block 1710, multi-communication-interface tape node 1402(2) uses its receiver 1412 of the second wireless-communication interface 1406 to receive a response by wireless tag 1508 of asset 1504. In a specific embodiment of block 1710, the second wireless-communication interface 1406 and response received thereby from wireless tag 1508 are RFID-based. In block 1712, method 1700 deactivates the receiver. In one example of block 1712, multi-communication-interface tape node 1402(2) deactivates its receiver 1412 of second wireless-communication interface 1406.

Block 1714 is included in embodiments where illuminator 1420 is activated to generate an interrogational signal (which may be RFID in at least one embodiment), and thus is included when block 1708 is included. In block 1714, if included, method 1700 deactivates the illuminator. In one example of block 1714, tape node 1620 deactivates illuminator 1420 after a certain period.

In block 1716, method 1700 determines a location of the asset at the first time as the first location. In one example of block 1716, multi-communication-interface tape node 1402(2) determines that wireless tag 1508 is within receive area 1516(2) when its receiver 1412 receives the response from wireless tag 1508, and sends a message, via its wireless-communication interface 1404 to a gateway node (e.g., gateway node 1514) and/or a remote server (e.g., server(s) 804, FIG. 8). In another example of block 1716, multi-communication-interface tape node 1602(2) determines that wireless tag 1508 is within coverage area 1616(2) when its receiver 1412 receives the response from wireless tag 1508, and sends a message, via its wireless-communication interface 1404 to a gateway node (e.g., gateway node 1614) and/or a remote server (e.g., server(s) 804, FIG. 8). Method 1700 then returns to block 1702 to await a next event (e.g., detection of a next wireless signal from another tape node).

Multi-Path and Bleed-Through Resolution

Figure 18:
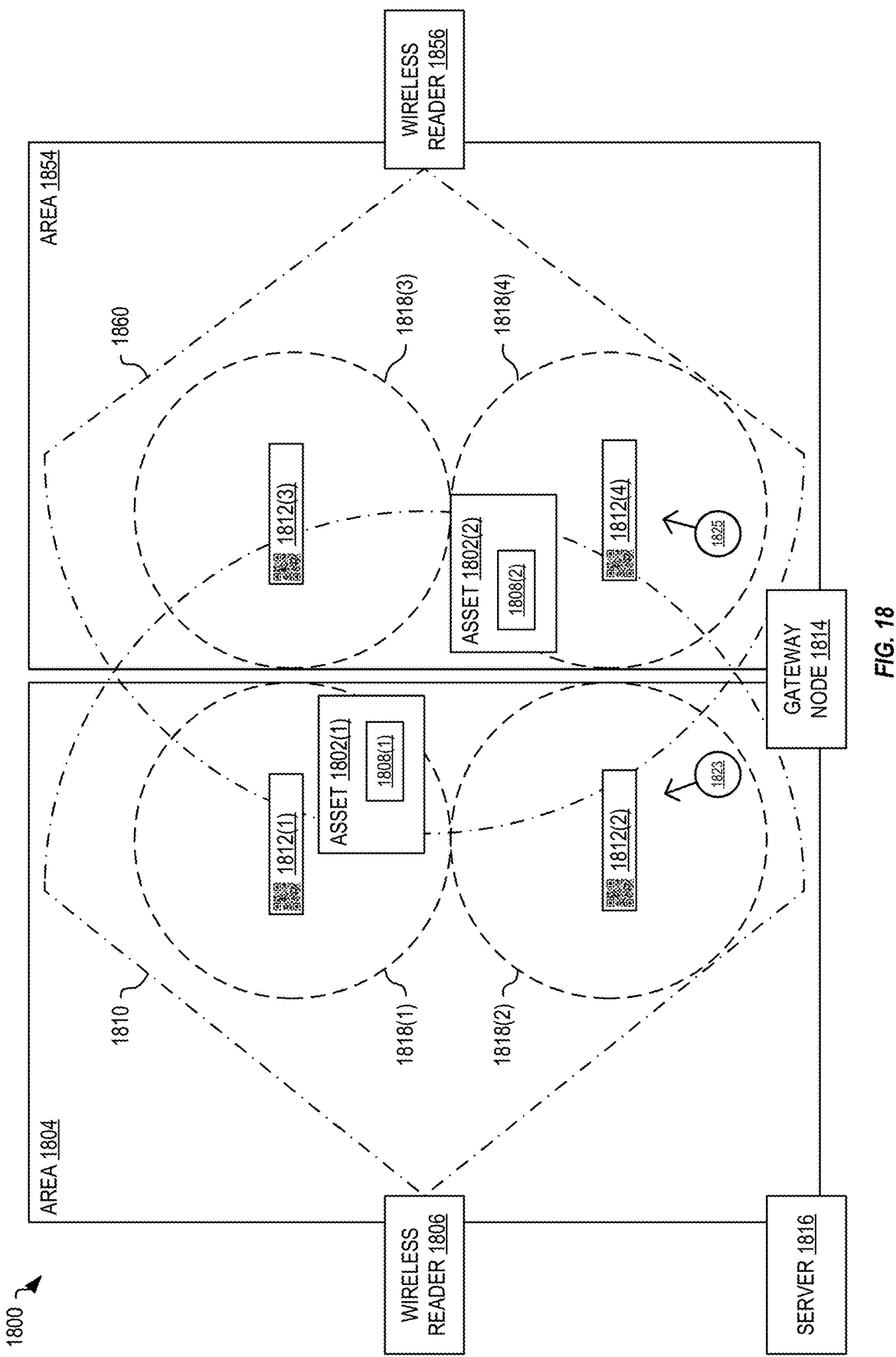
FIG. 18 is a schematic diagram illustrating one example multi-communication-interface system that eliminates false detection of RFID tags, in embodiments.

FIG. 18 is a schematic diagram illustrating one example multi-communication-interface system 1800 that eliminates false detection (e.g., bleed-through, multi-path detection) of wireless tags. In the example of FIG. 18, assets 1802 may be stored in two different areas 1804 and 1854 (e.g., rooms, storage areas, staging areas, etc.) that are adjacent to each other. Each area 1804, 1854, has a wireless reader 1806, 1856 (which, in embodiments may implement RFID-based wireless reading of wireless tags), respectively, for detecting wireless tags 1808 (which may be RFID-based) of assets 1802 within its corresponding area 1804, 1854. Wireless readers 1806 and 1856 may be off-the-shelf devices and have coverage areas 1810, 1860, respectively. Asset 1802(1) is within area 1804 and asset 1802(2) is within area 1854; however, both assets 1802(1) and 1802(2) are within both coverage areas 1810 and 1860. Accordingly, both assets 1802(1) and (2) are detected by wireless reader 1806 and asset 1802(2) is incorrectly assumed to be within area 1804, and both assets 1802(1) and (2) are detected by wireless reader 1856 and asset 1802(1) is incorrectly assumed to be within area 1854. Wireless reader 1806, 1856 and the wireless tags may be RFID based, or another wireless protocol such as a cellular protocol, a Wi-Fi protocol, a Long Range (LoRa) protocol, a LoRaWAN protocol, a satellite communication protocol, a Zigbee protocol, an NFC protocol, an RF protocol, or some other wireless communications protocol.

Advantageously, system 1800 may be deployed to resolve this problem. In the example of FIG. 18, system 1800 includes multi-communication-interface tape nodes 1812(1) and (2) that are deployed within area 1804 and multi-communication-interface tape nodes 1812(3) and (4) that are deployed within area 1854. Multi-communication-interface tape node 1812 may represent multi-communication-interface tape node 1602 of FIG. 16, each including one receiver 1412 and excluding (or not using) any transmitter 1410. System 1800 may include a gateway node 1814 that communicates with each multi-communication-interface tape node 1812, and optionally with an external server 1816 (e.g., a local control server/computer that operates wireless readers 1806 and 1856). In certain embodiments, where wireless readers 1806 and 1856 or server 1816 communicates with one of multi-communication-interface tape nodes 1812, the tape node may coordinate operation of wireless readers and other tape nodes 1812. In embodiments where the tape node includes long range communication, the tape node may also act as or replace gateway node 1814. For example, one of multi-communication-interface tape nodes 1812 may upload identification and location data to server 804 of network communications environment 800, provided it has sufficient battery power. In certain embodiments, multi-communication-interface tape nodes 1812 detect and use the interrogation signal from one of wireless readers 1806 and 1856 as a trigger to activate and perform the fine locationing of asset 1802. For example, each multi-communication-interface tape node 1812 periodically checks for the interrogation signal at a low enough frequency to conserve its battery power.

In certain embodiments, the multi-communication-interface tape node may include the passive wireless tag 1414 circuit that is powered by the interrogation signal and may be used to wake the multi-communication-interface tape node to activate and perform the fine locationing. In certain embodiments, gateway node 1814 may be combined with server 1816. In other embodiments, gateway node 1814 is supplemental to server 1816 to retrofit an existing wireless reader system.

As described above for multi-communication-interface tape node 1402 and 1602, each multi-communication-interface tape node 1812 is battery powered, thereby requiring minimal infrastructure for installation. For example, when implemented in the above-described adhesive tape platform form factor (e.g., see adhesive tape platform 330, FIG. 3), multi-communication-interface tape nodes may be adhered to a convenient surface (e.g., ceiling, walls, furniture, etc.). Battery power is conserved, as described above, by activating the receiver 1412 of each multi-communication-interface tape node 1812 as needed, and deactivating after use. Each multi-communication-interface tape node 1812(1)-(4) has a coverage area 1818(1)-(4), respectively, where coverage area 1818 is smaller than either of coverage areas 1810 or 1860. As shown, multi-communication-interface tape node 1812(1) and (2) are positioned such that coverage areas 1818(1) and (2) are within area 1804 and multi-communication-interface tape nodes 1812(3) and (4) are positioned such that coverage areas 1818(3) and (4) are within area 1854. Two multi-communication-interface tape nodes 1812 are shown withing each area 1804/1854 for clarity of illustration; however, more or fewer multi-communication-interface tape node 1812 may be used to effect coverage of each area 1804/1054 without departing from the scope hereof.

Figure 20:
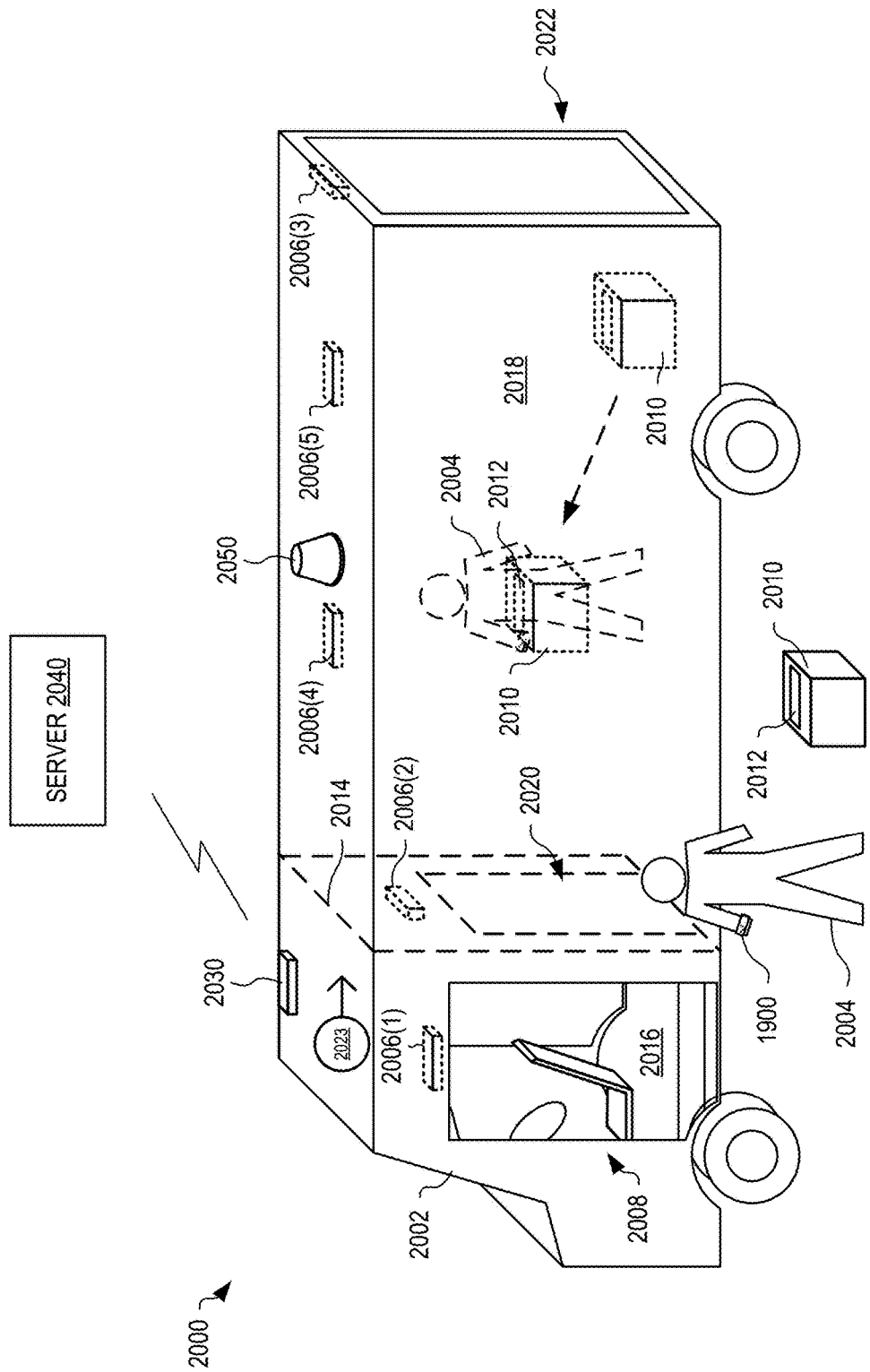
FIG. 20 is a schematic diagram illustrating example use of a multi-communication-interface system to provide fine locationing for a vehicle carrying an asset having at least an RFID tag, in embodiments.

Each multi-communication-interface tape node 1812 activates its receiver 1412 to detect wireless tags 1808 (which may be RFID based) within its coverage area 1818 based on detected events. In one embodiment, the event corresponds to when the wireless readers are activated to take inventory of their respective areas. In another embodiment, where wireless readers 1806/1856 operate substantially continuously, the event may be triggered when inventory within each area 1804/1854 is expected to change. For example, where area 1804 has a door, an external sensor may generate the event when the door opens or closes. FIG. 20 and associated description provides another example of a person causing the trigger event.

In one example of operation, wireless reader 1806 is activated to take inventory of wireless tags 1808 (and, in at least some embodiments, the assets 1802 associated therewith) within area 1804 and generates a wireless interrogation signal within coverage area 1810. The wireless interrogation signal may be RFID based, or another protocol such as a cellular protocol, a Wi-Fi protocol, a Long Range (LoRa) protocol, a LoRaWAN protocol, a satellite communication protocol, a Zigbee protocol, an NFC protocol, an RF protocol, or some other wireless communications protocol. Activation of wireless reader 1806 causes a trigger event for system 1800, whereby gateway node 1814 sends a trigger event message 1823 to multi-communication-interface tape nodes 1812(1) and (2). In response to trigger event message 1823, each of multi-communication-interface tape nodes 1812(1) and (2) activates its receiver 1412. Wireless tag 1808(1) responds to the wireless interrogation signal by generating a wireless response signal (which may be RFID based) that is detected by both wireless reader 1806 and multi-communication-interface tape node 1812(1) and wireless tag 1808(2) responds to the wireless interrogation signal by generating a wireless response signal that is detected by wireless reader 1806. Multi-communication-interface tape node 1812(1) sends a message to gateway node 1814 indicating a time and information (e.g., at least an ID, as an RFID ID in embodiments where wireless reader 1806 is RFID based) of wireless tag 1808(1). When no additional wireless response signals are detected after a certain period and/or when not change in responses are detected, multi-communication-interface tape nodes 1812(1) and (2) deactivate their wireless receivers 1412 to conserve battery power.

At the same time or at a different time, wireless reader 1856 is activated to take inventory of wireless tags 1808 (e.g., the assets 1802 associated therewith) within area 1854 and generates an wireless interrogation signal within coverage area 1860. Activation of wireless reader 1856 causes a trigger event for system 1800, whereby gateway node 1814 sends a trigger event message 1825 to multi-communication-interface tape nodes 1812(3) and (4). In response to trigger event message 1825, each of multi-communication-interface tape nodes 1812(3) and (4) activates its wireless receiver 1412. Wireless tag 1808(2) responds to the wireless interrogation signal by generating a wireless response signal that is detected by both wireless reader 1856 and multi-communication-interface tape node 1812(4) and wireless tag 1808(1) responds to the wireless interrogation signal by generating a wireless response signal that is detected by wireless reader 1856. Multi-communication-interface tape node 1812(4) sends a message to gateway node 1814 indicating a time and information (e.g., at least a wireless ID, which is an RFID ID when the wireless reader is RFID based) of wireless tag 1808(2). When no additional wireless response signals are detected after a certain period and/or when not change in responses are detected, multi-communication-interface tape nodes 1812(3) and (4) deactivate their wireless receivers 1412 to conserve battery power.

Gateway node 1814 may send information of wireless tags detected by multi-communication-interface tape nodes 1812(1)-(4) to server 1816, the reported information includes fine location information derived from multi-communication-interface tape node 1812(1) for wireless tag 1808(1) and derived from multi-communication-interface tape node 1812(4) for wireless tag 1808(2). Accordingly, server 1816 learns that wireless tag 1808(1) is in area 1804 and wireless tag 1808(2) is in area 1854.

Server 1816 may ignore wireless response signals detected by wireless reader 1806 and wireless reader 1856 and instead use wireless tag information reported by gateway node 1814. Alternatively, server 1816 may correlate information received from wireless reader 1806 and wireless reader 1856 with information received from gateway node 1814. Advantageously, multi-communication-interface tape nodes 1812 provide fine locationing that overcomes the bleed-through and multipath problems of wireless tag response signals.

Wearable RFID Reader

Figure 19:
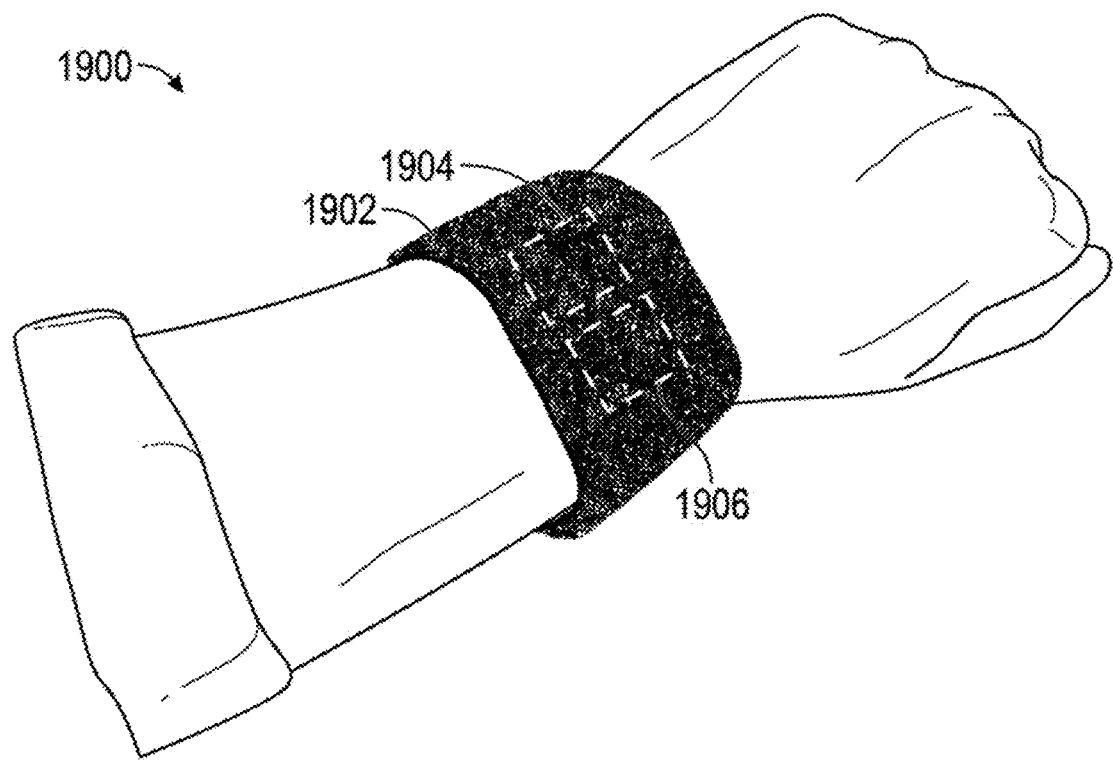
FIG. 19 shows one example wearable RFID tape node, in embodiments.

FIG. 19 shows one example wearable multi-communication-interface tape node 1900. Wearable multi-communication-interface tape node 1900 includes a band 1902 that supports a multi-communication-interface tape node 1904 and an optional wireless tag 1906. Band 1902 may be a latch-based, or hook-and-loop fastener based, and allows wearable multi-communication-interface tape node 1900 to be secured around a wrist of the user, for example. In certain embodiments, wearable multi-communication-interface tape node 1900 is a tape (e.g., disposable paper and/or plastic wrist band) that uses adhesive. Advantageously, band 1902 may adjust to any size of body part. Without departing from the scope hereof, wearable multi-communication-interface tape node 1900 may have other forms, including any one or more of: a pendant, a lapel tag/clip, a belt clip, a smart badge, and a necklace, a mobile device (e.g., smartphone, tablet, etc.), a multi-communication-interface tape node 1402 adhered to a mobile device), a master tape node 866 attached to an RFID reader, etc. Multi-communication-interface tape node 1904 may include components and functionality similar to multi-communication-interface tape node 1402 of FIG. 14. For example, multi-communication-interface tape node 1904 includes at least one first wireless-communication interface 1410 and a second wireless-communication interface 1412. In certain embodiments, multi-communication-interface tape node 1904 also include wireless tag 1414. For the following examples, second wireless-communication interface 1412 includes both transmitter 1410 and receiver 1412.

Advantageously, wearable multi-communication-interface tape node 1900 implements wireless reader functionality that may be worn by the user. In embodiments, the wireless reader functionality is RFID based. The at least one first wireless-communication interface 1404 may implement one or more of a Bluetooth protocol, a cellular protocol, a Wi-Fi protocol, a Long Range (LoRa) protocol, a LoRaWAN protocol, a satellite communication protocol, a Zigbee protocol, an NFC protocol, an RF protocol, or some other wireless communications protocol. Wearable multi-communication-interface tape node 1900 is powered by a battery (or similar power source) and accordingly benefits from the event driven activation of its second wireless-communication interface 1408, as described above. Further, since first wireless-communication interface 1404 may use Bluetooth or BLE, this may also provide accurate locationing of operator 2004 that enables wearable multi-communication-interface tape node 1900 to detect trigger events indicative of when reader 1410 should be enabled and/or disabled.

In one example of operation, wearable multi-communication-interface tape node 1900 uses its second wireless-communication interface 1406 to read at least one wireless tag and wirelessly communicate with other tape nodes and wireless nodes, such as infrastructure tape nodes (e.g., a tape node that acts as a gateway node in a fixed location) and gateway nodes (e.g., a tape node that acts as a gateway node) of network communications environment 800. Wearable multi-communication-interface tape node 1900 may receive location data from the infrastructure tape nodes and/or gateway nodes.

Accordingly, network communications environment 800 may receive data from wearable multi-communication-interface tape node 1900 indicating RFID tag identifiers scanned by the wearable multi-communication-interface tape node and may also receive location of wearable multi-communication-interface tape node 1900 based on communication between wearable multi-communication-interface tape node 1900 and a gateway node. In certain embodiments, the infrastructure tape node may have an inlay (e.g., a wireless tag, or an RFID wireless tag), whereby reading of the infrastructure tape node's wireless tag provides a location of wearable multi-communication-interface tape node 1900 based on the location of the infrastructure tape node.

Wearable multi-communication-interface tape node 1900 may include switches and/or sensors that detect when wearable multi-communication-interface tape node 1900 is being worn and/or when wearable multi-communication-interface tape node 1900 has been removed or taken off. In certain embodiments, when wearable multi-communication-interface tape node 1900 detects that it has been removed, it deactivates itself, there by preserving battery power when not in use. In certain embodiment, wearable multi-communication-interface tape node 1900 may automatically (re) activate itself when switches and/or sensors indicate that wearable multi-communication-interface tape node 1900 is being worn.

In certain embodiments, wearable multi-communication-interface tape node 1900 may detect and track when human operator interacts with other tape nodes, gateway nodes, and other wireless nodes of network communications environment 800, FIG. 8.

In certain embodiments, wearable multi-communication-interface tape node 1900 may also operate as a gateway node (e.g., similar to one of mobile gateway 810 and stationary gateway 814 of FIG. 8) and may include multiple wireless-communication interfaces for different protocols (e.g., one or more of medium-power wireless-communication interface 672', medium-power wireless-communication interface 672", and high-power wireless-communication interface 682", with reference to FIGS. 6B-6C).

Vehicle

FIG. 20 is a schematic diagram illustrating example use of a multi-communication-interface system 2000 to provide fine locationing for a vehicle 2002 (e.g., a package car) carrying an asset 2010 having at least a wireless tag 2012 (which, in embodiments, may be RFID based). Asset 2010 may also have an attached multi-communication-interface tape node, or single communication interface tape node, as described above, however, the system 2000 enhances operation where asset 2010 has wireless tag 2012 and no tape node. Although shown as a truck, vehicle 2002 may represent any storage building, warehouse, or type of apparatus used to transport assets, including a trailer, a shipping container, a sailing vessel, a rail wagon, plane, and so on. Vehicle 2002 is used by an operator 2004 wearing wearable multi-communication-interface tape node 1900 of FIG. 19. System 200 may detect both tape node identifier (e.g., using Bluetooth/BLE communication) and wireless tag identifiers (e.g., using second wireless-communication interface 1406), and may correlate any results based thereon.

System 2000 includes a plurality of multi-communication-interface tape nodes 2006 deployed at doorways of vehicle 2002. Multi-communication-interface tape nodes 2006 may represent multi-communication-interface tape node 1402 of FIG. 14. Multi-communication-interface tape node 2006(1) is positioned at a doorway 2008 (e.g., inside and above the doorway as shown) of vehicle 2002. Antennae and/or coverage area of multi-communication-interface tape node 2006(1) is configured to be limited to doorway 2008, thereby multi-communication-interface tape node 2006(1) operates as a geofence and/or curtain to detect tape nodes and/or wireless tags (e.g., RFID tags) passing through doorway 2008. In the example of FIG. 20, vehicle 2002 also has an internal bulkhead 2014 that separates a cab area 2016 from a freight area 2018 with an internal doorway 2020. A multi-communication-interface tape node 2006(2) is positioned near doorway 2020 and its antennae and/or coverage area are configured as a geofence and/or curtain to detect tape nodes and/or wireless tags (e.g., RFID tags) passing through doorway 2020. Vehicle 2002 also has a rear doorway 2022 that provides access (e.g., loading and unloading) to freight area 2018. A multi-communication-interface tape node 2006(3) is positioned near doorway 2022 and its antennae and/or coverage area are configured as a geofence and/or curtain to detect tape nodes and/or wireless tags (e.g., RFID tags) passing through doorway 2022.

Where operator 2004 is wearing wearable multi-communication-interface tape node 1900, when operator 2004 passes through doorway 2008, multi-communication-interface tape node 2006(1) detects (e.g., using first wireless interface 1404, such as Bluetooth/BLE messaging in a specific embodiment) wearable multi-communication-interface tape node 1900 and generates a trigger event message 2023. Where operator 2004 is not wearing wearable multi-communication-interface tape node 1900 but is wearing or carrying a wireless tag (e.g., a smart badge, etc.), multi-communication-interface tape node 2006(1) detects (e.g., using second wireless interface 1406, such as RFID in a specific embodiment) the wireless tag as operator 2004 passes through doorway 2008. Similarly, multi-communication-interface tape node 2006(2) detects when operator 2004 passes through doorway 2020, and multi-communication-interface tape node 2006(3) may detect when operator 2004 passes through doorway 2022. Trigger event message 2023 may indicate a location (e.g., doorway 2008), a time and an ID (e.g., wearable multi-communication-interface tape node 1900).

In certain embodiments, one or more of multi-communication-interface tape nodes 2006(1)-(3) may also determine a direction of movement of wearable multi-communication-interface tape node 1900 (e.g., operator 2004) by using two Bluetooth curtains (e.g., Bluetooth detection cones or coverage areas), using an additional tape node as needed. In other embodiments, one or more of multi-communication-interface tape nodes 2006(1)-(3) may also determine a direction of movement of operator 2004 based on other devices worn or carried by operator 2004. For example, where operator 2004 carries mobile gateway 810 (e.g., a smartphone, tablet, etc.; see FIG. 8), one or more of multicommunication-interface tape nodes 2006(1)-(3) may detect or receive movement information of mobile gateway 810.

In certain embodiments, trigger event message 2023 may also indicate a movement direction (e.g., into, out of) when the corresponding multi-communication-interface tape node 2006 determines such information (e.g., using Bluetooth/BLE ranging etc.) Additional multi-communication-interface tape nodes may be deployed at other doors (e.g., opposite-side front door, middle side doors, etc.) to generate trigger event messages 2023 when tape nodes and/or wireless tags are detected passing through the door. Accordingly, multi-communication-interface tape nodes 2006(1)-(3) generate trigger event messages 2023 when any tape node, mobile gateway, or wireless tag passes through any doorway 2008, 2020, 2022 of vehicle 2002.

In certain embodiments, vehicle 2002 may operate like a Faraday cage (e.g., where walls of vehicle 2002 are at least partially made of metal) and prevent wireless signals from existing or entering freight area 2018. Accordingly, multi-communication-interface tape nodes 2006 within freight area 2018 may detect when operator 2004 opens a door to freight area 2018 and wireless signals from wearable multi-communication-interface tape node 1900 and/or other devices carried by operator 2004 are detectable. Cab area 2016 may operate similarly to detect when operator 2004 opens a door to enter cab area 2016.

Multi-communication-interface tape nodes 2006(4) and 2006(5) are positioned on a ceiling of freight area 2018 and have coverage areas for detecting tape nodes and/or wireless tags (e.g., RFID tags) within freight area 2018. The number and location of multi-communication-interface tape nodes 2006 within freight area 2018 may be selected to provide a required coverage and locationing resolution for assets stored within freight area 2018. For example, multi-communication-interface tape nodes 2006 may be positioned on shelves or racks within freight area 2018 to detect assets positioned on the shelves or racks. Multi-communication-interface tape nodes 2006(4) and (5) may receive a trigger event message from may not generate trigger events. As noted above, to conserve battery power, second wireless-communication interface 1406 of multi-communication-interface tape nodes 2006 are not activated until needed. Trigger event messages 2023 generated by multi-communication-interface tape node 2006(1)-(3) are used to activate second wireless-communication interface 1406 of each multi-communication-interface tape nodes 2006(4)-(5), causing each multi-communication-interface tape nodes 2006(4)-(5) to take inventory of wireless tags 2012 within freight area 2018. After a certain period, or when no changes in inventory are detected, each multi-communication-interface tape nodes 2006(4)-(5) deactivates it second wireless-communication interface 1406. Advantageously, through use of trigger event messages, battery life of multi-communication-interface tape nodes 2006 is not drained unnecessarily since multi-communication-interface tape nodes 2006 are triggered only when inventory could have changed. In the prior art, RFID readers run continuously or periodically. When run periodically, the prior art RFID reader cannot detect inventory changes during inactive periods and is therefore cannot guarantee immediate detection of inventory changes. When run continuously, the prior art RFID reader has a short battery lifespan. In certain embodiments, multi-communication-interface tape nodes 2006(4) and (5) do not include transmitters 1410. Instead, an external illuminator, similar to illuminator 1420, is included within freight area 2018 and activated in response to trigger events. Accordingly, multi-communication-interface tape nodes 2006(4) and (5) detect wireless response signals from wireless tags (similar to the response signals discussed above) within freight area 2018 that are activated by illuminator signal from the illuminator.

In an alternative embodiment, wearable multi-communication-interface tape node 1900 detects, using Bluetooth/BLE, RFID tape node 2006(2) when it passes through doorway 2020 as operator 2004 enters freight area 2018 and activates its second wireless-communication interface 1406 and/or generates trigger event message 2023. Wearable multi-communication-interface tape node 1900 may also determine when operator 2004 exits freight area 2018 by detecting, using Bluetooth/BLE, multi-communication-interface tape node 2006(2), and deactivate its second wireless-communication interface 1406.

Where an operator uses a handheld device (e.g., a mobile phone, tablet, RFID reader, etc.), multi-communication-interface tape nodes 2006 may also detect presence of the handheld device. For example, where operator 2004 does not wear wearable multi-communication-interface tape node 1900 but carries a smartphone, system 2000 may detect presence of the smartphone to generate the trigger events and/or trigger event messages discussed herein.

In one example of operation, vehicle 2002 stops and multi-communication-interface tape node 2006(2) detects wearable multi-communication-interface tape node 1900, or another device (e.g., tape node, smart badge, mobile gateway, smartphone, tablet, wireless tag, etc.) worn or carried by operator 2004, as operator 2004 enters freight area 2018 through doorway 2020 and generates trigger event message 2023 indicative of operator 2004 entry to freight area 2018. Since operator 2004 is within freight area 2018, multi-communication-interface tape nodes 2006(4) and 2006(5) do not activate their second wireless-communication interfaces 1406. However, when worn by operator 2004, wearable multi-communication-interface tape node 1900 activates its second wireless-communication interface 1406 and detects wireless tag 2012 as operator 2004 collects asset 2010 for delivery. Coverage area for second wireless-communication interface 1406 of wearable multi-communication-interface tape node 1900 is limited (e.g., between one- and three-feet radius, and/or directionally) and therefore detects only wireless tag 2012 of asset 2010 as it is handled by operator 2004. When operator 2004 does not wear wearable multi-communication-interface tape node 1900, operator 2004 may use a handheld device (e.g., a handheld RFID reader, smartphone, etc.) for detecting wireless tag 2012 as asset 2010 is collected for delivery. Multi-communication-interface tape node 2006(2) detects wearable multi-communication-interface tape node 1900, or another device worn or carried by operator 2004, again as operator 2004 leaves freight area 2018 via doorway 2020 and generated trigger event message 2023 indicative of operator 2004 exit of freight area 2018. In response to receiving trigger event message 2023, multi-communication-interface tape nodes 2006(4) and 2006(5) activate their second wireless-communication interface 1406 and take inventory of wireless tags within freight area 2018.

As operator 2004 carries asset 2010 out through doorway 2008, multi-communication-interface tape node 2006(1) detects (e.g., using Bluetooth/BLE) wearable multi-communication-interface tape node 1900, or another device worn or carried by operator 2004, exiting vehicle 2002 and generates another trigger event message 2023 indicative of operator 2004 exiting doorway 2008. Multi-communication-interface tape node2006(1) may also activate its second wireless-communication interface 1406 in response to the event and detects wireless tag 2012. Multi-communication-interface tape node2006(1) may send an inventory message to a mobile gateway node 2030 deployed with vehicle 2002 and/or a server 2040 (e.g., server(s) 804, FIG. 8, or other cloud entity) that may validate delivery of asset 2010 with a location of vehicle 2002 (e.g., based on a GPS location determined by mobile gateway node 2030). Advantageously, system 2000 may detect when asset 2010 is being delivered to the wrong location and may also detect when other assets/packages are being delivered in error to a current location. In certain embodiments, multi-communication-interface tape node 2006 may be configured to operate as a gateway node for network communications environment 800, FIG. 8.

Since wearable multi-communication-interface tape node 1900 detects the user holding asset 2010 (e.g., by detecting wireless tag 2012, and optionally corresponding movement of the wireless tag 2012 and the multi-communication-interface tape node 1900, and/or proximity between multi-communication-interface tape node 1900 and wireless tag 2012), system 2000 may determine when asset 2010 is removed from freight area 2018 by operator 2004, thereby distinguishing when operator 2004 only moves asset 2010 within freight area 2018. Accordingly, by tracking assets entering and exiting freight area 2018, system 2000 tracks changes in asset inventory of freight area 2018.

Trigger events may be further qualified by system 2000. For example, gateway node 2030 may inhibit trigger events when vehicle 2002 is moving (e.g., detected using GPS or other locationing techniques), since inventory is not expected to change while vehicle 2002 is in motion. In certain embodiments, starting and stopping of vehicle 2002 may cause trigger events. If they exit cab and re-enter cab without opening bulkhead or cargo door, system can determine that the driver did not add assets (such as packages) to the truck. Gateway node 2030 may include intelligence to determine when wireless tag inventory is needed. For example, when operator 2004 exits and re-enters cab area 2016 but does enter freight area 2018 (either through doorway 2020 or doorway 2022), system 2000 may determine that operator 2004 did not pick-up assets/packages to add to the inventory of vehicle 2002, and therefore wireless tag inventory detection is not required.

Continuing with this example scenario, as operator 2004 returns to vehicle 2002, multi-communication-interface tape node 2006(1) detects wearable multi-communication-interface tape node 1900 entering through doorway 2008, sends trigger event message 2023, and activates its second wireless-communication interface 1406 (and optionally the second wireless-communication interface 1406 of one or more of other multi-communication-interface tape nodes 2006 associated with vehicle 2002. If operator 2004 has picked up any assets/packages from the current location, multi-communication-interface tape node 2006(1) reads any corresponding wireless tags as they enter vehicle 2002. When operator 2004 enters freight area 2018, with or without the picked-up assets/packages, multi-communication-interface tape node 2006(2) detects wearable RFID tape node 1900 entering freight area 2018 through doorway 2020 and sends trigger event message 2023 indicative of operator 2004 entering freight area 2018. In certain embodiment, in response to trigger event message 2023, each of multi-communication-interface tape node 2006(4) and 2006(5) activate their second wireless-communication interface 1406 to take inventory of wireless tags within freight area 2018, deactivating their RFID readers when the inventory taking is complete. In one example, when operator enters through doorway 2008, multi-communication-interface tape nodes 2006 are activated to take inventory of wireless tags 2012 to determine whether operator 2004 is bringing an asset onto vehicle 2002 and to determine whether any asset went missing (e.g., fell off) while operator 2004 was gone. Since the inventory is determined in real-time based on events occurring at vehicle 2002, system 2000 may send operator 2004 a timely notification (e.g., via phone/tablet/wearable device) of any unexpected inventory violations (e.g., a package being carried should not be loaded onto vehicle 2002). In another example, when operator 2004 exits vehicle 2002, system 2000 may take inventory to detect when an asset being removed from vehicle 2002 is a violation and send operator 2004 a timely notification to verify packages being carried.

Similarly, by comparing a first inventory of assets taken when operator 2004 enters vehicle 2002 with a second inventory taken when operator 2004 leaves vehicle 2002, system 2000 may notify operator 2004 when they exist with the same asset (e.g., did not leave the asset on vehicle 2002).

In certain embodiments, where vehicle 2002 includes an alarm 2050 (e.g., visual and/or auditory alarm such as a siren, flashing lights, and/or a speaker), system 220 may activate alarm 2050 when a rule violation is detected. In certain embodiments, alarm 2050 is activated to notifying operator 2004 when detected inventory is determined to be incorrect. In another example, system 2000 may activate alarm 2050 when asset 2010 is compromised.

Multi-communication-interface tape node2006(2) may then detect operator 2004 exiting freight area 2018, generating trigger event message 2023 indicative of operator 2004 exiting through doorway 2020. In certain embodiment, in response to trigger event message 2023, each of multi-communication-interface tape nodes 2006(4) and 2006(5) activate their second wireless-communication interfaces 1406 to take inventory of wireless tags within freight area 2018, deactivating their second wireless-communication interfaces 1406 when the inventory taking is complete. Advantageously, multi-communication-interface tape nodes 2006 operate their second wireless-communication interfaces 1406 only as needed, thereby conserving battery power.

Gateway node 2030 and/or server 2040 may correlate identified multi-communication-interface tape nodes (e.g., Bluetooth identifiers of tape nodes) with wireless tag identifiers (e.g., RFID IDs) of wireless tags associated with assets (e.g., asset 2010) detected by multi-communication-interface tape nodes 2006(4) and 2006(5) to validate inventory within freight area 2018. Further, gateway node 2030 and/or server 2040 may correlate identified multi-communication-interface tape nodes (e.g., Bluetooth identifiers of tape nodes) with wireless tag identifiers (e.g., RFID IDs) of wireless tags inlayed with other tape nodes. Gateway node 2030 and/or server 2040 may determine that a multi-communication-interface tape node has failed (e.g., battery drained) when a wireless tag identifier is detected but a corresponding Bluetooth identifier (or another non-Bluetooth based ID captured using first wireless-communication interface 1404) was not detected. In certain embodiments, gateway node 2030 and/or multi-communication-interface tape nodes 2006(4) and (5) receive a manifest of wireless tag identifiers that are expected to be read. For example, the manifest may define, for each multi-communication-interface tape node 2006(4) and (5), whether wireless tags are expected be in its coverage area. When no wireless tags are expected to be in the coverage area of any of multi-communication-interface tape nodes 2006(4) and (5), that multi-communication-interface tape node may not activate its second wireless-communication interface 1406, thereby conserving battery power and extending its life.

Wireless tag identifier inventory may improve reliability of asset tracking over use of tape node Bluetooth identifier tracking alone, particularly where wireless tag identifiers and Bluetooth identifiers (or another non-Bluetooth based ID captured using first wireless-communication interface 1404) are correlated. Further, use of wireless tag tracking may also increase security where a ping rate of second wireless-communication interfaces 1406 is increased in response to certain detected events.

In certain embodiments, multi-communication-interface tape nodes 2006(4) and (5) may deactivate their second wireless-communication interfaces 1406 when they also detect a Bluetooth signal (or other non-Bluetooth based signal captured using first wireless-communication interface 1404) of wearable multi-communication-interface tape node 1900, since this indicated that operator 2004 is within freight area 2018 and inventory may change. Accordingly, multi-communication-interface tape nodes 2006(4) and (5) may wait until operator 2004 leaves freight area 2018 before activating their second wireless-communication interfaces 1406 to take inventory of wireless tags within freight area 2018.

In certain embodiments, other sensors may be used to generate trigger events. For example, the trigger event may be generated in response to one or more of: a signal from an infrared sensor, a vibration sensor, a light sensor, a capacitive sensor, or a signal from some other type of sensor.

Trigger events, detected by the mesh network of multi-communication-interface tape nodes 2006 may also be used to activate other detectors and/or devices. For example, trigger events may also be used to activate barcode readers, cameras, and so on.

System 2000 may use event-based logic, as described above, to selectively activate RFID readers 1406 and other wireless communication devices for detection and fine locationing of assets 2010. Wearable multi-communication-interface tape node 1900 provides an RFID detection solution when RFID infrastructure does not already exist. Advantageously, multi-communication-interface tape nodes 2006 are battery powered and easily deployed without the need for wiring and because RFID tag detection is event driven, using intelligent logic, RFID readers are activated when change in inventory is expected, and not activated to detect change.

Figure 21:
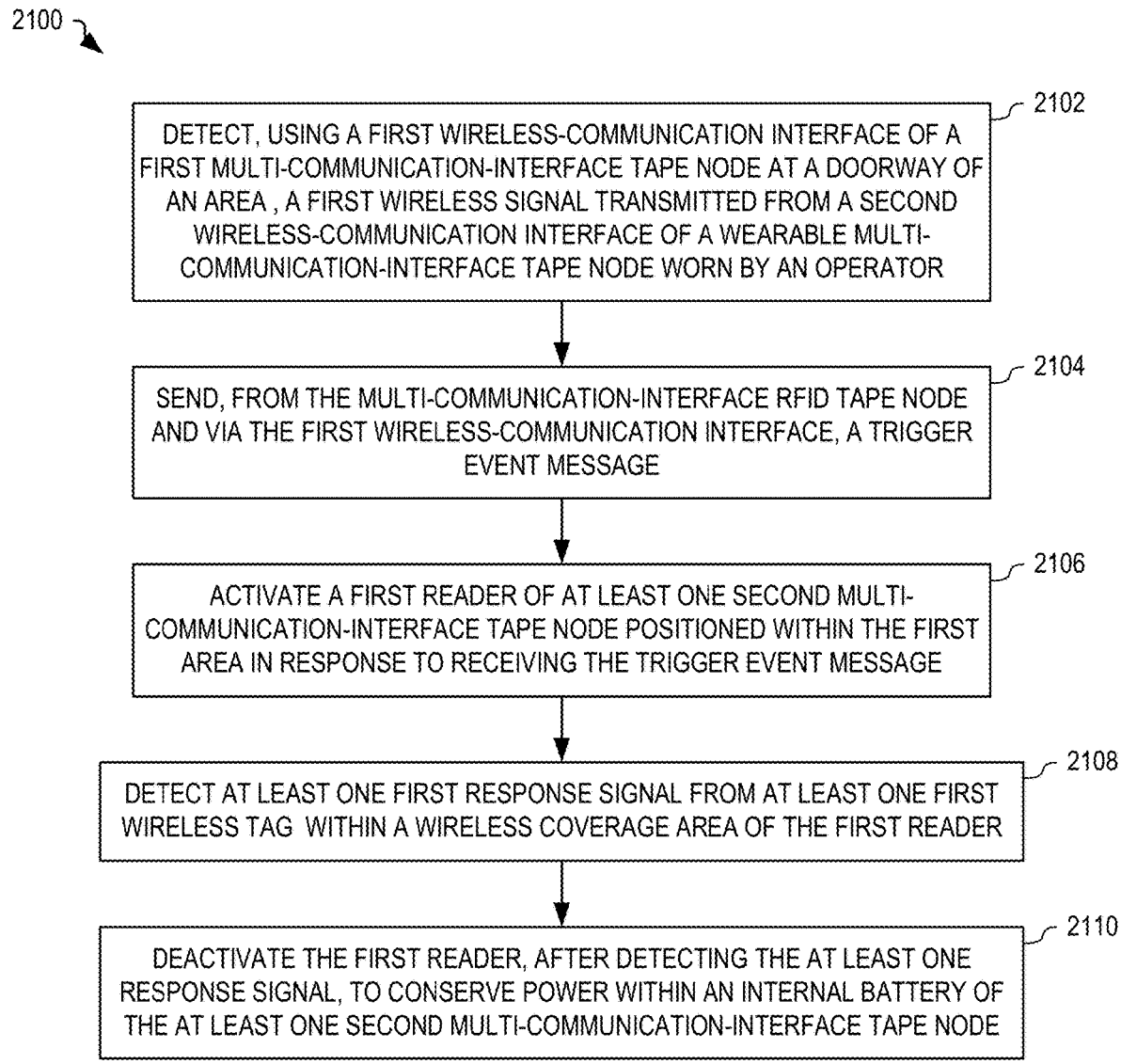
FIG. 21 is a flowchart illustrating one example method 2100 for fine locationing using a multi-communication-interface system, in embodiments.

FIG. 21 is a flowchart illustrating one example method 2100 for fine locationing using a multi-communication-interface system (e.g., system 2000 of FIG. 20). Method 2100 is implemented by one or more of multi-communication-interface tape nodes 2006, gateway node 2030, and server 2040 of FIG. 20 for example.

In block 2102, method 2100 detects, using a first wireless-communication interface of a first multi-communication-interface tape node at a first doorway of a first area, a first wireless signal transmitted from a second wireless-communication interface of a wearable multi-communication-interface tape node worn by an operator. In one example of block 2102, multi-communication-interface tape node 2006(2) detects a Bluetooth wireless signal (or other non-Bluetooth based signal captured using first wireless-communication interface 1404) transmitted by wearable multi-communication-interface tape node 1900 worn by operator 2004 as operator 2004 moves into freight area 2018 via doorway 2020. In block 2104, method 2100 sends, from the first multi-communication-interface tape node and via the first wireless-communication interface, a trigger event message. In one example of block 2104, RFID tape node 2006(2) transmits trigger event message 2023 using its first wireless-communication interface 1404 (e.g., via Bluetooth).

In block 2106, method 2100 activates a second wireless-communication interface of at least one second multi-communication-interface tape node positioned within the first area in response to receiving the trigger event message. In one example of block 2106, multi-communication-interface tape node 2006(4) receives trigger event message 2023 using Bluetooth via its first wireless-communication interface 1404 (or other non-Bluetooth based signals captured using first wireless-communication interface 1404) and activates its second wireless-communication interface 1406. In block 2108, method 2100 detects at least one first wireless response signal (which may be RFID based in at least one embodiment) from at least one first wireless tag within a wireless coverage area of the second wireless-communication interface. In one example of block 2108, second wireless-communication interface 1406 of multi-communication-interface tape 2006(4) detects a wireless response signal from wireless tag 2012 positioned within a wireless coverage area of the second wireless-communication interface 1406.

In block 2110, method 2100 deactivates the second wireless-communication interface, after detecting the at least one wireless response signal, to conserve power within an internal battery of the second multi-communication-interface tape n. In one example of block 2110, multi-communication-interface tape 2006(4) deactivates its second wireless-communication interface 1406 after detecting the wireless response signal from wireless tag 2012 to conserver power within energy source 1408. In certain embodiments, multi-communication-interface tape 2006 deactivates its second wireless-communication interface 1406 after a predetermined period. In other embodiments, multi-communication-interface tape 2006 deactivates its second wireless-communication interface 1406 when the determined inventory is unchanged (e.g., when an inventory of assets 2010 detected within vehicle 2002 is the same as a previous inventory, indicating that no assets were added or removed after operator 2004 enters or exits. In other embodiments, multi-communication-interface tape 2006 deactivates its second wireless-communication interface 1406 when operator 2004 (e.g., wearable multi-communication-interface tape node 1900) has exited vehicle 2002 and/or when system 2000 determines that doors of vehicle 2002 have been closed for a predefined period.

Figure 22:
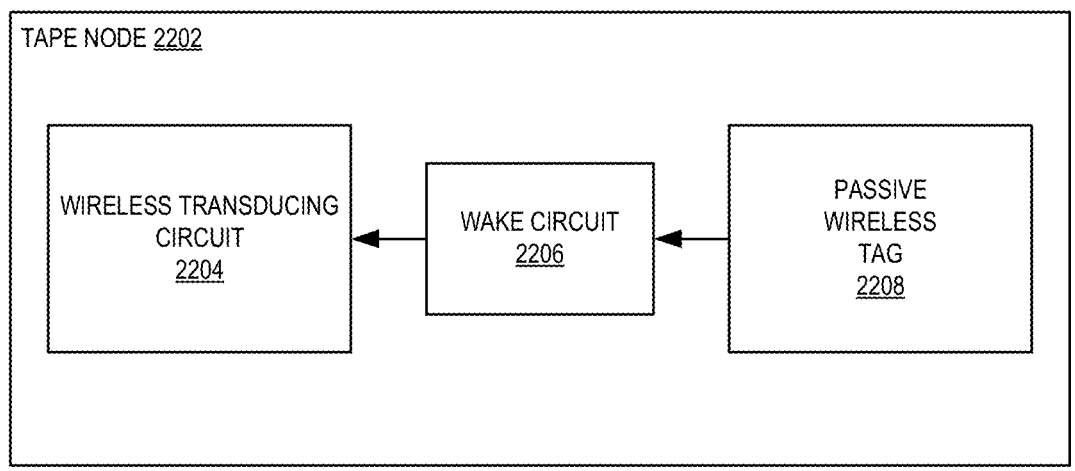
FIG. 22 is a block diagram showing one example multi-communication-interface tape node with a wake circuit operated by an embedded wireless tag, in embodiments.

FIG. 22 is a block diagram showing one example tagged tape node 2202 with a wake circuit 2206 operated by an embedded wireless tag 2208. Wake circuit 2206 may be similar to wake circuit 775 of FIG. 7A that delivers power from energy source 776 to tracking circuit 778. However, wake circuit 2206 is triggered by passive wireless tag 2208.

Tagged tape node 2202 may be similar to any of segments 640, 670, and 680 of FIGS. 6A-6C, server(s) 804 and gateways 810, 812, and 814 of FIG. 8 and wireless transducing circuit 2204 may represents wireless transducing circuit 410 of FIG. 4. Wake circuit 2206 activates wireless transducing circuit 2204 and may provide an input to trigger wireless transducing circuit 2204 (e.g., an interrupt line to awaken a processor of wireless transducing circuit 2204) or connect power from a power source (e.g., a battery) to activate wireless transducing circuit 2204. Passive wireless tag 2208 may represent a passive RFID tag that provides an electrical input to wake circuit 2206.

In this scenario, wireless transducing circuit 2204 may deactivate (e.g., transition to a low power or inactive state) when a particular function is completed, thereby conserving its battery power. Passive wireless tag 2208 is inactive until awakened by an interrogation signal (e.g., an RFID interrogation signal), when awakened by the interrogation signal, passive wireless tag 2208 triggers wake circuit 2206, which in turn activates wireless transducing circuit 2204.

Wireless transducing circuit 2204 may only deactivate itself in certain situations and/or locations. For example, where tape node 2202 is attached to an asset for tracking purposes, wireless transducing circuit 2204 may determine that it (and the asset) is located in a storage area that includes a wireless tag reader (e.g., an external RFID reader that may be line powered) that periodically interrogates wireless tags in the storage area. Advantageously, wireless transducing circuit 2204 may deactivate to conserver its battery power until it is reawakened by the reader interrogating its passive wireless tag 2208, thereby allowing wireless transducing circuit 2204 to enable tracking and communication (e.g., Bluetooth). For example, where the storage area has controlled access (e.g., door sensors), the door opening triggers the wireless tag reader to take inventory of wireless tags in the storage area. Accordingly, in determining that it is located in the storage area, wireless transducing circuit 2204 deactivates itself and is only reactivated when the wireless tag reader is activated by the door opening.

Figure 23:
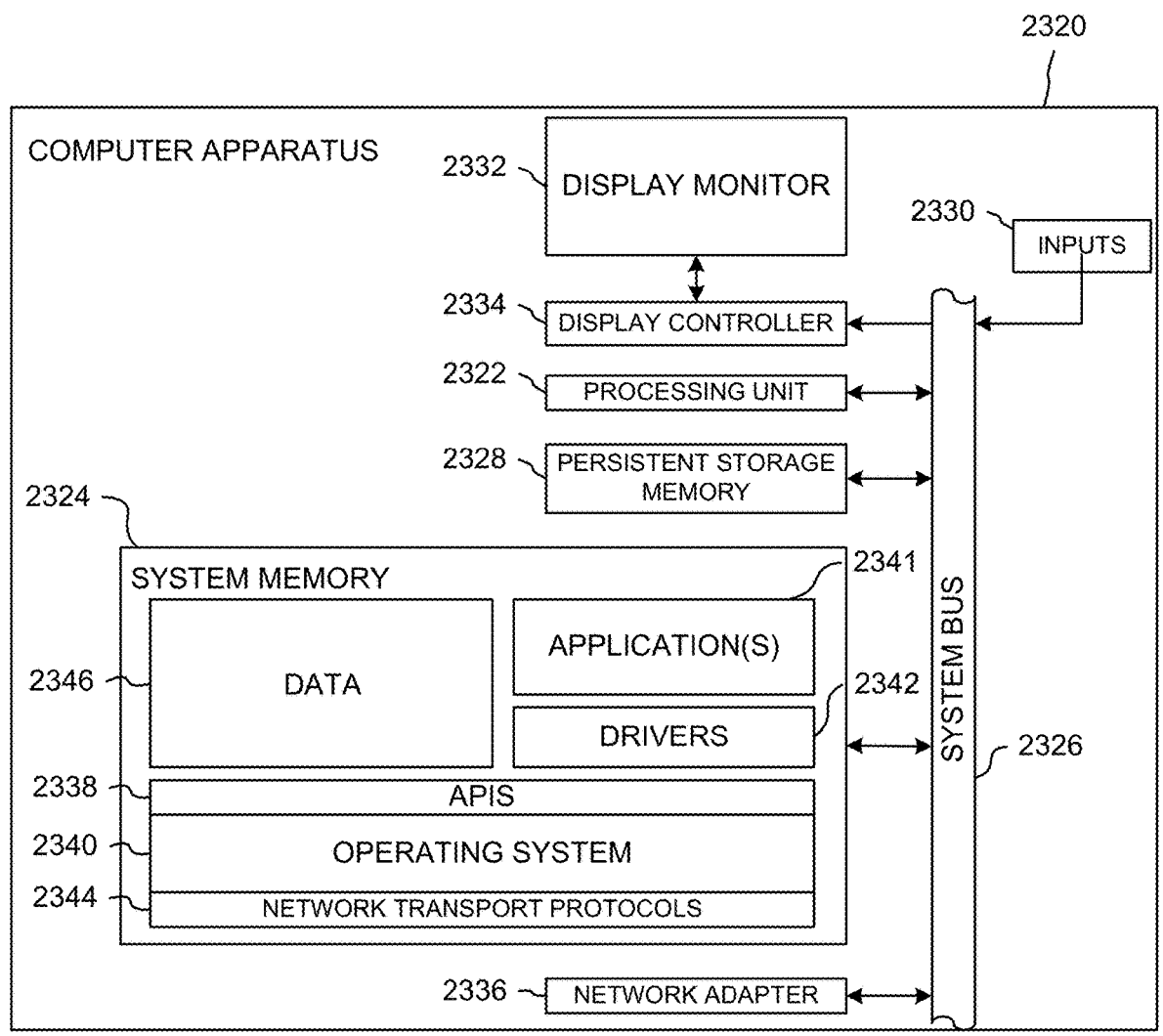
FIG. 23 shows one example computer apparatus that, either alone or in combination with one or more other computing apparatus, is operable to implement one or more of the computer systems described in this specification, in embodiments.

FIG. 23 shows an example embodiment of computer apparatus 2320 that, either alone or in combination with one or more other computing apparatus, is operable to implement one or more of the computer systems described in this specification. For example, computer apparatus 2320 may represent any of: wireless transducing circuit 410 of FIG. 4, segments 640, 670, and 680 of FIGS. 6A-6C, server(s) 804 and gateways 810, 812, and 814 of FIG. 8, server(s) 904 of FIG. 9, and any other computer implemented devices disclosed herein. The computer apparatus 2320 includes a processing unit 2322, a system memory 2324, and a system bus 2326 that couples the processing unit 2322 to the various components of the computer apparatus 2320. The processing unit 2322 may include one or more data processors, each of which may be in the form of any one of various commercially available computer processors. The system memory 2324 includes one or more computer-readable media that typically are associated with a software application addressing space that defines the addresses that are available to software applications. The system memory 2324 may include a read only memory (ROM) that stores a basic input/output system (BIOS) that contains start-up routines for the computer apparatus 2320, and a random-access memory (RAM). The system bus 2326 may be a memory bus, a peripheral bus, or a local bus, and may be compatible with any of a variety of bus protocols, including PCI, VESA, Microchannel, ISA, and EISA. The computer apparatus 2320 also includes a persistent storage memory 2328 (e.g., a hard drive, a floppy drive, a CD ROM drive, magnetic tape drives, flash memory devices, and digital video disks) that is connected to the system bus 2326 and contains one or more computer-readable media disks that provide non-volatile or persistent storage for data, data structures and computer-executable instructions.

A user may interact (e.g., input commands or data) with the computer apparatus 2320 using one or more input devices 2330 (e.g., one or more keyboards, computer mice, microphones, cameras, joysticks, physical motion sensors, and touch pads). Information may be presented through a graphical user interface (GUI) that is presented to the user on a display monitor 2332, which is controlled by a display controller 2334. The computer apparatus 2320 also may include other input/output hardware (e.g., peripheral output devices, such as speakers and a printer). The computer apparatus 2320 connects to other network nodes through a network adapter 2336 (also referred to as a "network interface card" or NIC).

A number of program modules may be stored in the system memory 2324, including application programming interfaces 2338 (APIs), an operating system (OS) 2340 (e.g., the Windows® operating system available from Microsoft Corporation of Redmond, Washington U.S.A.), software applications 2341 including one or more software applications programming the computer apparatus 2320 to perform one or more of the steps, tasks, operations, or processes of the positioning and/or tracking systems described herein, drivers 2342 (e.g., a GUI driver), network transport protocols 2344, and data 2346 (e.g., input data, output data, program data, a registry, and configuration settings).

Combination of Features

Features described above as well as those claimed below may be combined in various ways without departing from the scope hereof. The following enumerated examples illustrate some possible, non-limiting combinations:

(A1) A method for fine locationing using a multi-communication-interface system includes: detecting, at a first time using a first wireless-communication interface of a first multi-communication-interface tape node located at a first location in an area, a first wireless signal from a second tape node; activating a first receiver of a second wireless-communication interface of the first multi-communication-interface tape node in response to detecting the first wireless signal; receiving, using the first receiver, a first response signal from a first wireless tag in response to an interrogation signal; deactivating the first receiver; and determining a location of the first wireless tag at the first time as the first location.

(A2) The embodiment (A1) further including receiving, via the first wireless-communication interface, a bit sequence of the interrogation signal; and decoding the first response signal based on the bit sequence.

(A3) In either of embodiments (A1) or (A2), the first wireless-communication interface having a first coverage area greater than a second coverage areas of the first receiver.

(A4) In any of embodiments (A1)-(A3), the first wireless-communication interface implementing a Bluetooth protocol and the second wireless-communication interface implementing an RFID protocol.

(A5) Any of embodiments (A1)-(A4) further including decoding a wireless tag identifier from the first response signal; and correlating the wireless tag identifier to a manifest of wireless tag identifiers associated with the area.

(A6) In any of embodiments (A1)-(A5), the interrogation signal being generated by an external illuminator independent of the first multi-communication-interface tape node.

(A7) Any of embodiments (A1)-(A6) further including activating the external illuminator in response to detecting the first wireless signal.

(A8) Any of embodiments (A1)-(A7) further including activating a transmitter of the second wireless-communication interface in response to detecting the first wireless signal, the transmitter generating the interrogation signal.

(A9) Any of embodiments (A1)-(A8) further including sending a trigger event message from the first multi-communication-interface tape node via the first wireless-communication interface in response to detecting the first wireless signal.

(A10) The embodiment (A9) further including activating a second receiver of a second multi-communication-interface tape node located at a second location in the area, different from the first location, in response to the second multi-communication-interface tape node receiving the trigger event message; detecting, at a second time and using the second receiver, a second response signal transmitted by a second wireless tag in response to the interrogation signal; deactivating the second receiver; and determining a location of the second wireless tag as the second location at the second time.

(A11) In the embodiment (A10), the first multi-communication-interface tape node and the second multi-communication-interface tape node being deployed within the area to resolve bleed-through and multi-path wireless tag detection errors.

(A12) In any of embodiments (A10)-(A11), the first location and the second location being selected such that coverage areas of the first multi-communication-interface tape node and the second multi-communication-interface tape node are within the area, wherein the first multi-communication-interface tape node and the second multi-communication-interface tape node are used collectively to detect only wireless tags within the area.

(A13) In any of embodiments (A10)-(A12), each of a coverage area of the first wireless-communication interface is dynamically configurable by one or more of user interaction and directives from a gateway node.

(A14) In any of embodiments (A10)-(A13), each of a coverage area of the second wireless-communication interface is dynamically configurable by one or more of user interaction and directives from a gateway node.

(A15) In any of embodiments (A10)-(A14), the first multi-communication-interface tape node and the second multi-communication-interface tape node are associated with each other or are associated with the same asset.

(B1) A method for fine locationing using a multi-communication-interface system includes: detecting, using a first wireless-communication interface of a first multi-communication-interface tape node at a first doorway of a first area, a first wireless signal transmitted from a second wireless-communication interface of a wearable multi-communication-interface tape node worn by an operator; sending, from the first multi-communication-interface tape node and via the first wireless-communication interface, a trigger event message; activating a first reader of at least one second multi-communication-interface tape node positioned within the first area in response to receiving the trigger event message; detecting at least one first response signal from at least one first wireless tag within a coverage area of the first reader; and deactivating the first reader, after detecting the at least one first response signal, to conserve power within an internal battery of the at least one second multi-communication-interface tape node.

(B2) In embodiments of (B1), the first multi-communication-interface tape node having a second coverage area that is restricted to the first doorway, the second coverage area forming a curtain at the first doorway to detect the first wireless signal only when the wearable multi-communication-interface tape node is at the first doorway.

(B3) The embodiment (B2) further including determining a direction of movement of the wearable multi-communication-interface tape node based on the first wireless signal.

(B4) Any of embodiments (B1)-(B3) further including activating a second reader of the wearable multi-communication-interface tape node in response to the wearable multi-communication-interface tape node receiving the trigger event message; and detecting, using the second reader, a second response signal from a wireless tag attached to an asset being carried by the operator.

(B5) The embodiment (B4) further including decoding a wireless tag identifier from the second response signal; and validating the wireless tag identifier based on a manifest.

(B6) Any of embodiments (B1)-(B5) further including activating a second reader of the first multi-communication-interface tape node in response to detecting the first wireless signal; and detecting, using the second reader, a second response signal from a second wireless tag attached to an asset being carried by the operator.

(B7) The embodiment (B6) further including decoding a wireless tag identifier from the second response signal; and validating the wireless tag identifier based on a manifest.

(B8) In any of embodiments (B1)-(B7), the first area being a freight area of a vehicle and the first doorway being a bulkhead door between a cab area and the freight area of the vehicle.

(C1) A multi-communication-interface tape node powered from an internal battery includes: a first wireless-communication interface implementing a first wireless protocol; a second wireless-communication interface implementing a second wireless protocol that consumes more power than the first wireless protocol when operational, the second wireless-communication interface having a transmitter and a receiver; a processor; and memory storing machine-readable instructions that, when executed by the processor, cause the processor to: detect a trigger event using the first wireless-communication interface; transition the second wireless-communication interface from an off state to an on state; receive a wireless response signal from a wireless tag via the receiver; decode a wireless identifier from the wireless response signal; and transition the second wireless-communication interface from the on state to the off state to conserve power in the internal battery.

(C2) In embodiments of (C1), the transmitter transmitting a wireless interrogation signal when the second wireless-communication interface is activated.

(C3) In either of embodiments (C1) or (C2), the multi-communication-interface tape node having an adhesive tape platform form factor that facilitates rapid deployment.

(C4) In any of embodiments (C1)-(C3), the second wireless-communication interface having a wireless coverage area configurable with a resolution of less than one foot.

(C5) In any of embodiments (C1)-(C4), the memory storing further machine-readable instructions that, when executed by the processor, further cause the processor to collaborate with at least one other multi-communication-interface tape node to improve locationing within an area that includes the multi-communication-interface tape node and the at least one other multi-communication-interface tape node.

(C6) In any of embodiments (C1)-(C5), the first wireless protocol being Bluetooth and the second wireless protocol being RFID based.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A method for fine locationing using a multi-communication-interface system, comprising:
   detecting, at a first time using a first wireless-communication interface of a first multi-communication-interface tape node located at a first location in an area, a first wireless signal from a second tape node;
   activating a first receiver of a second wireless-communication interface of the first multi-communication-interface tape node in response to detecting the first wireless signal;
   receiving, using the first receiver, a first response signal from a first wireless tag in response to an interrogation signal;
   deactivating the first receiver; and
   determining a location of the first wireless tag at the first time as the first location.

2. The method of claim 1, further comprising:
   receiving, via the first wireless-communication interface, a bit sequence of the interrogation signal; and
   decoding the first response signal based on the bit sequence.

3. The method of claim 1, the first wireless-communication interface implementing a Bluetooth protocol and the second wireless-communication interface implementing an RFID protocol.

4. The method of claim 1, the deactivating the first receiver further comprising:
   decoding a wireless tag identifier from the first response signal; and
   correlating the wireless tag identifier to a manifest of wireless tag identifiers associated with the area.

5. The method of claim 1, the interrogation signal being generated by an external illuminator independent of the first multi-communication-interface tape node.

6. The method of claim 1, further comprising activating a transmitter of the second wireless-communication interface in response to detecting the first wireless signal, the transmitter generating the interrogation signal.

7. The method of claim 1, further comprising:
   sending a trigger event message from the first multi-communication-interface tape node via the first wireless-communication interface in response to detecting the first wireless signal;
   activating a second receiver of a second multi-communication-interface tape node located at a second location in the area, different from the first location, in response to the second multi-communication-interface tape node receiving the trigger event message;
   detecting, at a second time and using the second receiver, a second response signal transmitted by a second wireless tag in response to the interrogation signal;
   deactivating the second receiver; and
   determining a location of the second wireless tag as the second location at the second time.

8. The method of claim 7, the first multi-communication-interface tape node and the second multi-communication-interface tape node being deployed within the area to resolve bleed-through and multi-path wireless tag detection errors.

9. The method of claim 8, the first location and the second location being selected such that coverage areas of the first multi-communication-interface tape node and the second multi-communication-interface tape node are within the area, wherein the first multi-communication-interface tape node and the second multi-communication-interface tape node are used collectively to detect only wireless tags within the area.

10. The method of claim 9, wherein each of a coverage area of the first wireless-communication interface and a coverage area of the second wireless-communication interface is dynamically configurable by one or more of user interaction and directives from a gateway node.

11. A method for fine locationing using a multi-communication-interface system, comprising:
    detecting, using a first wireless-communication interface of a first multi-communication-interface tape node at a first doorway of a first area, a first wireless signal transmitted from a second wireless-communication interface of a wearable multi-communication-interface tape node worn by an operator;
    sending, from the first multi-communication-interface tape node and via the first wireless-communication interface, a trigger event message;
    activating a first reader of at least one second multi-communication-interface tape node positioned within the first area in response to receiving the trigger event message;
    detecting at least one first response signal from at least one first wireless tag within a coverage area of the first reader; and
    deactivating the first reader, after detecting the at least one first response signal, to conserve power within an internal battery of the at least one second multi-communication-interface tape node.

12. The method of claim 11, the first multi-communication-interface tape node having a second coverage area that is restricted to the first doorway, the second coverage area forming a curtain at the first doorway to detect the first wireless signal only when the wearable multi-communication-interface tape node is at the first doorway.

13. The method of claim 12, further comprising determining a direction of movement of the wearable multi-communication-interface tape node based on the first wireless signal.

14. The method of claim 11, further comprising:
    activating a second reader of the wearable multi-communication-interface tape node in response to the wearable multi-communication-interface tape node receiving the trigger event message; and
    detecting, using the second reader, a second response signal from a wireless tag attached to an asset being carried by the operator.

15. The method of claim 14, further comprising:
    decoding a wireless tag identifier from the second response signal; and
    validating the wireless tag identifier based on a manifest.

16. The method of claim 11, the first area being a freight area of a vehicle and the first doorway being a bulkhead door between a cab area and the freight area of the vehicle.

17. A multi-communication-interface tape node powered from an internal battery, comprising:
    a first wireless-communication interface implementing a first wireless protocol;
    a second wireless-communication interface implementing a second wireless protocol that consumes more power than the first wireless protocol when operational, the second wireless-communication interface having a transmitter and a receiver;
    a processor; and
    memory storing machine-readable instructions that, when executed by the processor, cause the processor to:

detect a trigger event using the first wireless-communication interface;

transition the second wireless-communication interface from an off state to an on state;

receive a wireless response signal from a wireless tag via the receiver;

decode a wireless identifier from the wireless response signal; and transition the second wireless-communication interface from the on state to the off state to conserve power in the internal battery.

18. The multi-communication-interface tape node of claim 17, the transmitter transmitting a wireless interrogation signal when the second wireless-communication interface is activated.

19. The multi-communication-interface tape node of claim 17, the multi-communication-interface tape node having an adhesive tape platform form factor that facilitates rapid deployment.

20. The multi-communication-interface tape node of claim 17, the second wireless-communication interface having a wireless coverage area configurable with a resolution of less than one foot.

21. The multi-communication-interface tape node of claim 17, the first wireless protocol being Bluetooth and the second wireless protocol being RFID based.

* * * * *